US012261497B2

(12) United States Patent
Jefferies et al.

(10) Patent No.: US 12,261,497 B2
(45) Date of Patent: Mar. 25, 2025

(54) HIGH-POWER MOTOR FOR A BODY-GRIP POWER TOOL

(71) Applicant: Black & Decker Inc., New Britain, CT (US)

(72) Inventors: Dustin Jefferies, Baltimore, MD (US); David J. Smith, Columbia, MD (US); Marcus E. E. Rydin, Baltimore, MD (US); Justin H. Ayers, Jarrettsville, MD (US); Sumiteru Mori, Baltimore, MD (US); John B. Fogle, White Hall, MD (US); Kristopher Cochran, Middle River, MD (US)

(73) Assignee: Black & Decker Inc., New Britain, CT (US)

( * ) Notice: Subject to any disclaimer, the term of this patent is extended or adjusted under 35 U.S.C. 154(b) by 383 days.

(21) Appl. No.: 17/590,016

(22) Filed: Feb. 1, 2022

(65) Prior Publication Data

US 2022/0247270 A1    Aug. 4, 2022

Related U.S. Application Data

(60) Provisional application No. 63/266,197, filed on Dec. 30, 2021, provisional application No. 63/144,802, filed on Feb. 2, 2021.

(51) Int. Cl.
*H02K 3/52* (2006.01)
*F16C 17/02* (2006.01)
(Continued)

(52) U.S. Cl.
CPC ............. *H02K 3/522* (2013.01); *F16C 17/02* (2013.01); *F16C 35/06* (2013.01); *H02K 1/2706* (2013.01);
(Continued)

(58) Field of Classification Search
CPC ........ H02K 3/522; H02K 11/33; H02K 11/38; H02K 1/2706; H02K 5/06; H02K 7/083; H02K 21/16
(Continued)

(56) References Cited

U.S. PATENT DOCUMENTS 1,476,005 A    12/1923   Osher
1,488,786 A     4/1924   Grant
(Continued)

FOREIGN PATENT DOCUMENTS

CN         2909674 Y      6/2007
CN       201226467 Y      4/2009
(Continued)

OTHER PUBLICATIONS

EP EESR dated, Aug. 11, 2022 in corresponding EP application No. 22154528.8.
(Continued)

*Primary Examiner* — Jose A Gonzalez Quinones
(74) *Attorney, Agent, or Firm* — Amir R. Rohani

(57) ABSTRACT

A power tool is provided including a housing having a grip portion with a grip circumference of smaller than or equal to approximately 120 mm; and a brushless direct-current (BLDC) motor at least partially disposed within the grip portion of the housing and configured to output a maximum power output of at least 450 watts. The motor includes a stator including a stator core and stator windings; and a rotor rotatably received within the stator and including a rotor shaft extending along a longitudinal axis and a series of permanent magnet rings mounted sequentially along the longitudinal axis and surrounding the rotor shaft, each permanent magnet including a plurality of magnetic poles.

12 Claims, 71 Drawing Sheets

(51) Int. Cl.
*F16C 35/06* (2006.01)
*H02K 1/2706* (2022.01)
*H02K 5/06* (2006.01)
*H02K 5/173* (2006.01)
*H02K 7/08* (2006.01)
*H02K 7/14* (2006.01)
*H02K 11/00* (2016.01)
*H02K 11/215* (2016.01)
*H02K 11/33* (2016.01)
*H02K 11/38* (2016.01)
*H02K 21/16* (2006.01)
*B25F 5/00* (2006.01)
*B25F 5/02* (2006.01)

(52) U.S. Cl.
CPC ............ *H02K 5/06* (2013.01); *H02K 5/1732* (2013.01); *H02K 7/083* (2013.01); *H02K 7/145* (2013.01); *H02K 11/0094* (2013.01); *H02K 11/215* (2016.01); *H02K 11/33* (2016.01); *H02K 11/38* (2016.01); *H02K 21/16* (2013.01); *B25F 5/001* (2013.01); *B25F 5/02* (2013.01); *F16C 2380/26* (2013.01); *H02K 2203/03* (2013.01); *H02K 2211/03* (2013.01); *H02K 2213/03* (2013.01)

(58) Field of Classification Search
USPC .......... 310/156.08, 156.11, 156.21, 216.032, 310/154.33
See application file for complete search history.

(56) References Cited

U.S. PATENT DOCUMENTS

| | | |
|---|---|---|
| 2,225,967 A | 12/1940 | Samuel |
| 2,264,033 A | 11/1941 | Joseph |
| 2,342,319 A | 2/1944 | Joseph |
| 2,963,598 A | 12/1960 | Kent |
| 3,035,191 A | 5/1962 | Kent |
| 3,176,379 A | 4/1965 | Brown |
| 3,432,703 A | 3/1969 | Sheps |
| 3,531,670 A | 9/1970 | Loudon |
| 4,350,914 A | 9/1982 | Searle |
| 4,433,261 A | 2/1984 | Nashiki et al. |
| 4,549,341 A | 10/1985 | Kasabian |
| 4,558,245 A | 12/1985 | Glasauer et al. |
| 4,564,780 A | 1/1986 | Nel |
| 4,625,135 A | 11/1986 | Kasabian |
| 4,633,113 A | 12/1986 | Patel |
| 4,674,178 A | 6/1987 | Patel |
| 4,716,648 A | 1/1988 | Nel |
| 4,729,160 A | 3/1988 | Brown |
| 4,900,963 A | 2/1990 | Feigel |
| 4,905,423 A | 3/1990 | Van Laere |
| 4,930,201 A | 6/1990 | Brown |
| 4,954,736 A | 9/1990 | Kawamoto et al. |
| 5,040,286 A | 8/1991 | Stark |
| 5,144,735 A | 9/1992 | Stark |
| 5,175,461 A | 12/1992 | Zigler et al. |
| 5,218,254 A | 6/1993 | Someya |
| 5,237,737 A | 8/1993 | Zigler et al. |
| 5,345,129 A | 9/1994 | Molnar |
| 5,397,951 A | 3/1995 | Uchida et al. |
| 5,457,870 A | 10/1995 | Canders |
| 5,485,045 A | 1/1996 | Canders et al. |
| 5,627,423 A | 5/1997 | Marioni |
| 5,629,575 A | 5/1997 | Cazal et al. |
| 5,881,447 A | 3/1999 | Molnar |
| 5,881,448 A | 3/1999 | Molnar |
| 5,929,611 A | 7/1999 | Scott et al. |
| 5,977,671 A | 11/1999 | Kim |
| 6,034,511 A | 3/2000 | Scott et al. |
| 6,084,330 A | 7/2000 | Fisher et al. |
| 6,271,638 B1 | 8/2001 | Erdman et al. |
| 6,348,752 B1 | 2/2002 | Erdman et al. |
| 6,414,408 B1 | 7/2002 | Erdman et al. |
| 6,479,957 B1 | 11/2002 | Erdman et al. |
| 6,710,475 B2 | 3/2004 | Nishida |
| 6,710,504 B2 | 3/2004 | Ohiwa et al. |
| 6,713,907 B2 | 3/2004 | Matsumoto |
| 6,815,851 B2 | 11/2004 | Nishikata et al. |
| 6,891,292 B2 | 5/2005 | Raster et al. |
| 6,924,570 B2 | 8/2005 | DeFilippis et al. |
| 6,946,760 B2 | 9/2005 | Crapo et al. |
| 7,067,948 B2 | 6/2006 | Yamaguchi et al. |
| 7,078,843 B2 | 7/2006 | Du et al. |
| 7,146,706 B2 | 12/2006 | Du et al. |
| 7,196,445 B2 | 3/2007 | Yamaguchi et al. |
| 7,205,696 B2 | 4/2007 | Du et al. |
| 7,211,914 B2 | 5/2007 | Hofmann et al. |
| 7,211,920 B2 | 5/2007 | Du et al. |
| 7,233,091 B2 | 6/2007 | Du et al. |
| 7,273,159 B2 | 9/2007 | Brotto |
| 7,497,275 B2 | 3/2009 | Brotto |
| 7,528,520 B2 | 5/2009 | Du et al. |
| 7,541,710 B2 | 6/2009 | Nemoto et al. |
| 7,592,728 B2 | 9/2009 | Jones et al. |
| 7,608,963 B2 | 10/2009 | Jones et al. |
| 7,687,957 B2 | 3/2010 | Ochiai et al. |
| 7,687,964 B2 | 3/2010 | Du et al. |
| 7,692,348 B2 | 4/2010 | Gruenhagen |
| 7,741,747 B2 | 6/2010 | Yamamura et al. |
| 7,777,375 B2 | 8/2010 | Pellegrino et al. |
| 7,791,232 B2 | 9/2010 | Purohit et al. |
| 7,847,457 B2 | 12/2010 | Achor |
| 7,868,496 B2 | 1/2011 | Fujii et al. |
| 7,893,583 B2 | 2/2011 | Du et al. |
| 7,928,622 B2 | 4/2011 | Okubo |
| 7,965,009 B2 | 6/2011 | Miyashita et al. |
| 7,994,675 B2 | 8/2011 | Jones et al. |
| 8,207,647 B2 | 6/2012 | Du et al. |
| 8,253,285 B2 | 8/2012 | Yoshida et al. |
| 8,291,574 B2 | 10/2012 | Achor |
| 8,413,315 B2 | 4/2013 | Yamamura et al. |
| 8,415,843 B2 | 4/2013 | Li et al. |
| 8,541,913 B2 | 9/2013 | Yoshida et al. |
| 8,546,986 B2 | 10/2013 | Marchitto et al. |
| 8,558,420 B2 | 10/2013 | Du et al. |
| 8,653,707 B2 | 2/2014 | Furukawa et al. |
| 8,756,794 B2 | 6/2014 | Lons et al. |
| 8,933,604 B2 | 1/2015 | Lons et al. |
| 8,987,964 B2 | 3/2015 | Achor |
| 8,994,245 B2 | 3/2015 | Kori et al. |
| 9,048,699 B2 | 6/2015 | Oomori et al. |
| 9,219,392 B2 | 12/2015 | Sahara et al. |
| 9,322,399 B2 | 4/2016 | Sagalovskiiy et al. |
| 9,391,491 B2 | 7/2016 | Yoshida et al. |
| 9,538,686 B2 | 1/2017 | Sturm et al. |
| 9,627,932 B2 | 4/2017 | Jang et al. |
| 9,662,760 B2 | 5/2017 | Schuele et al. |
| 9,755,466 B2 | 9/2017 | Ions et al. |
| 9,755,490 B2 | 9/2017 | Inuzuka |
| 9,859,759 B2 | 1/2018 | Jang et al. |
| 9,979,245 B2 | 5/2018 | Maeda |
| 9,985,487 B2 | 5/2018 | Park et al. |
| 10,158,268 B2 | 12/2018 | Fujii et al. |
| 10,181,766 B2 | 1/2019 | Haga et al. |
| 10,193,422 B2 | 1/2019 | Kouda et al. |
| 10,205,363 B2 | 2/2019 | Li et al. |
| 10,205,365 B2 | 2/2019 | Beyerl et al. |
| 10,218,230 B2 | 2/2019 | Lu et al. |
| 10,218,239 B2 | 2/2019 | Li et al. |
| 10,224,772 B2 | 3/2019 | Siebald |
| 10,226,849 B2 | 3/2019 | Privett, Jr. et al. |
| 10,236,740 B2 | 3/2019 | Kimpara |
| 10,256,686 B2 | 4/2019 | Sedlak et al. |
| 10,263,488 B2 | 4/2019 | Yang et al. |
| 10,272,558 B2 | 4/2019 | Christophersen et al. |
| 10,284,064 B2 | 5/2019 | Li et al. |
| 10,298,093 B2 | 5/2019 | Ando et al. |
| 10,298,098 B2 | 5/2019 | Niwa |
| 10,315,686 B2 | 6/2019 | Wada |
| 10,320,262 B2 | 6/2019 | Griffen |

(56) References Cited

U.S. PATENT DOCUMENTS

| | | |
|---|---|---|
| 10,348,158 B2 | 7/2019 | Niwa et al. |
| 10,381,893 B2 | 8/2019 | Saki et al. |
| 10,404,136 B2 | 9/2019 | Oktavec et al. |
| 10,432,065 B2 | 10/2019 | Beyerl et al. |
| 10,439,468 B2 | 10/2019 | Kim |
| 10,477,128 B2 | 11/2019 | Bhutani et al. |
| 10,479,398 B2 | 11/2019 | Urimoto et al. |
| 10,491,057 B2 | 11/2019 | Seki et al. |
| 10,494,014 B2 | 12/2019 | Yamashita et al. |
| 10,505,414 B2 | 12/2019 | Ions et al. |
| 10,523,081 B2 | 12/2019 | Smith et al. |
| 10,587,163 B2 | 3/2020 | Crosby et al. |
| 10,608,500 B2 | 3/2020 | Nagahama |
| 10,673,305 B2 | 6/2020 | Beyerl et al. |
| 10,693,332 B2 | 6/2020 | Jelden et al. |
| 10,727,715 B2 | 7/2020 | Crosby et al. |
| 10,756,586 B2 | 8/2020 | Lons et al. |
| 10,770,936 B2 | 9/2020 | Gieras |
| 10,770,948 B2 | 9/2020 | Hwang et al. |
| 10,786,894 B2 | 9/2020 | Coates et al. |
| 10,821,591 B2 | 11/2020 | Verbrugge et al. |
| 10,897,178 B2 | 1/2021 | Furukawa et al. |
| 10,931,167 B2 | 2/2021 | Beyerl et al. |
| 10,992,194 B2 | 4/2021 | Horng et al. |
| 11,025,127 B2 | 6/2021 | Hwang et al. |
| 11,027,405 B2 | 6/2021 | Zhang et al. |
| 11,043,874 B2 | 6/2021 | Nishimura et al. |
| 11,141,851 B2 | 10/2021 | Verbrugge et al. |
| 11,211,846 B2 | 12/2021 | Niwa et al. |
| 11,245,296 B2 | 2/2022 | Higashi |
| 11,355,988 B2 | 6/2022 | Shiraishi et al. |
| 2005/0200576 A1 | 9/2005 | Kimura et al. |
| 2005/0241346 A1 | 11/2005 | Choi |
| 2007/0080597 A1 | 4/2007 | Suzuki et al. |
| 2007/0159013 A1 | 7/2007 | Maruyama et al. |
| 2007/0240892 A1 | 10/2007 | Brotto et al. |
| 2007/0247010 A1 | 10/2007 | Ichizaki |
| 2010/0170690 A1 | 7/2010 | Rieker et al. |
| 2011/0171887 A1* | 7/2011 | Tanimoto .............. H02K 5/207 310/50 |
| 2012/0187782 A1 | 7/2012 | Esenwein |
| 2014/0062234 A1 | 3/2014 | Tamura |
| 2014/0077649 A1 | 3/2014 | Roos |
| 2014/0090862 A1 | 4/2014 | Beutel et al. |
| 2014/0359969 A1 | 12/2014 | Kim et al. |
| 2015/0042183 A1 | 2/2015 | Oktavec et al. |
| 2015/0061472 A1 | 3/2015 | Leng |
| 2015/0069864 A1 | 3/2015 | Nagahama et al. |
| 2016/0336838 A1 | 11/2016 | Kouda et al. |
| 2017/0101996 A1 | 4/2017 | Zhou et al. |
| 2017/0106521 A1 | 4/2017 | Kelleher et al. |
| 2017/0163118 A1 | 6/2017 | Kimpara |
| 2017/0302133 A1 | 10/2017 | Ehrsam et al. |
| 2018/0262092 A1 | 9/2018 | Beyerl et al. |
| 2019/0140496 A1 | 5/2019 | Hong |
| 2019/0152014 A1 | 5/2019 | Privett et al. |
| 2019/0222075 A1 | 7/2019 | Lu et al. |
| 2019/0273421 A1 | 9/2019 | Velderman et al. |
| 2019/0296603 A1 | 9/2019 | Mahler et al. |
| 2019/0356201 A1 | 11/2019 | Li et al. |
| 2019/0358769 A1 | 11/2019 | Miyazawa et al. |
| 2020/0177034 A1 | 6/2020 | Beyerl |
| 2020/0215666 A1 | 7/2020 | Schultz |
| 2020/0215668 A1 | 7/2020 | Duncan et al. |
| 2020/0343780 A1 | 10/2020 | Fogle et al. |
| 2020/0343789 A1 | 10/2020 | Fogle et al. |
| 2020/0412202 A1 | 12/2020 | Beyerl et al. |
| 2021/0028666 A1 | 1/2021 | Feng et al. |
| 2021/0187707 A1 | 6/2021 | Smith et al. |
| 2021/0194319 A1 | 6/2021 | Smith et al. |
| 2021/0194320 A1 | 6/2021 | Smith et al. |
| 2021/0194321 A1 | 6/2021 | Jefferies et al. |
| 2021/0194341 A1 | 6/2021 | Billings et al. |
| 2021/0257884 A1 | 8/2021 | Jia et al. |
| 2021/0283762 A1 | 9/2021 | Kusumoto et al. |
| 2021/0296955 A1 | 9/2021 | Yamada et al. |
| 2022/0029506 A1 | 1/2022 | Verbrugge et al. |
| 2022/0247258 A1 | 8/2022 | Jefferies et al. |
| 2022/0247269 A1 | 8/2022 | Jefferies et al. |

FOREIGN PATENT DOCUMENTS

| | | | |
|---|---|---|---|
| CN | 101752937 B | 6/2011 | |
| CN | 202142920 U | 2/2012 | |
| CN | 202749921 U | 2/2013 | |
| CN | 203481976 U | 3/2014 | |
| CN | 204068472 U | 12/2014 | |
| CN | 204145111 U | 2/2015 | |
| CN | 104426262 A | 3/2015 | |
| CN | 104917318 A | 9/2015 | |
| CN | 105896866 A | 8/2016 | |
| CN | 206004512 U | 3/2017 | |
| CN | 206099702 U | 4/2017 | |
| CN | 107800213 A | 3/2018 | |
| CN | 207283285 U | 4/2018 | |
| CN | 109067129 A | 12/2018 | |
| CN | 109347227 A | 2/2019 | |
| CN | 209435002 U | 9/2019 | |
| CN | 209545298 U | 10/2019 | |
| CN | 209692566 U | 11/2019 | |
| CN | 110661394 A | 1/2020 | |
| CN | 209963842 U | 1/2020 | |
| CN | 210610337 U | 5/2020 | |
| CN | 210693627 U | 6/2020 | |
| CN | 211296520 U | 8/2020 | |
| CN | 211729513 U | 10/2020 | |
| CN | 211981678 U | 11/2020 | |
| CN | 112385600 A | 2/2021 | |
| CN | 212627399 U | 2/2021 | |
| CN | 110994844 B | 1/2022 | |
| DE | 3611978 C2 | 7/1993 | |
| DE | 10057838 A1 * | 5/2002 | ............. H02K 1/278 |
| DE | 10224951 A1 | 1/2004 | |
| DE | 102004034176 A1 | 2/2006 | |
| DE | 102004035382 A1 | 3/2006 | |
| DE | 102005036558 A1 | 6/2006 | |
| DE | 60209752 T2 | 11/2006 | |
| DE | 102006011426 A1 | 9/2007 | |
| DE | 102006049117 A1 | 4/2008 | |
| DE | 202008002092 U1 | 4/2008 | |
| DE | 102007039550 A1 | 2/2009 | |
| DE | 102008020779 A1 | 11/2009 | |
| DE | 102008025512 A1 | 12/2009 | |
| DE | 102008064159 B3 | 1/2010 | |
| DE | 202011003752 U1 | 1/2012 | |
| DE | 102011110752 A1 | 3/2012 | |
| DE | 102008064161 B4 | 9/2013 | |
| DE | 102013103813 A1 | 10/2013 | |
| DE | 102012013740 A1 | 1/2014 | |
| DE | 202010017376 U1 | 1/2014 | |
| DE | 102012016088 A1 | 2/2014 | |
| DE | 102012016803 A1 | 2/2014 | |
| DE | 212012000140 U1 | 2/2014 | |
| DE | 102012217906 A1 | 4/2014 | |
| DE | 102012221750 A1 | 5/2014 | |
| DE | 102013018737 A1 | 5/2014 | |
| DE | 102010031193 B4 | 6/2014 | |
| DE | 102013219450 A1 | 3/2015 | |
| DE | 102014226132 A1 | 7/2015 | |
| DE | 102014201490 A1 | 8/2015 | |
| DE | 102014208760 A1 | 11/2015 | |
| DE | 102015014628 A1 | 5/2016 | |
| DE | 102015003468 B4 | 9/2016 | |
| DE | 102016121210 A1 | 5/2017 | |
| DE | 102016222990 A1 | 6/2017 | |
| DE | 102017108971 A1 | 11/2017 | |
| DE | 112016001510 T5 | 3/2018 | |
| DE | 102013009954 B4 | 8/2018 | |
| DE | 202018103648 U1 | 9/2018 | |
| DE | 102018200077 A1 | 10/2018 | |
| DE | 102018005142 A1 | 1/2019 | |
| DE | 102017216094 A1 | 3/2019 | |
| DE | 102018105738 A1 | 9/2019 | |
| DE | 102018116930 A1 | 1/2020 | |

(56) References Cited

FOREIGN PATENT DOCUMENTS

| | | |
|---|---|---|
| DE | 112018002325 T5 | 1/2020 |
| DE | 102018215646 A1 | 3/2020 |
| DE | 102019127055 A1 | 4/2020 |
| DE | 102019200213 A1 | 5/2020 |
| DE | 102019102320 A1 | 7/2020 |
| DE | 102019111333 A1 | 11/2020 |
| DE | 102019111334 A1 | 11/2020 |
| DE | 102019111335 A1 | 11/2020 |
| DE | 102019213574 A1 | 3/2021 |
| DE | 102021103631 A1 | 9/2021 |
| EP | 1135841 B1 | 6/2002 |
| EP | 0929765 B1 | 9/2004 |
| EP | 1241771 B1 | 4/2005 |
| EP | 1082801 B1 | 9/2005 |
| EP | 1573879 A2 | 9/2005 |
| EP | 1578003 A1 | 9/2005 |
| EP | 1601088 A2 | 11/2005 |
| EP | 1395758 B1 | 3/2006 |
| EP | 1664560 A1 | 6/2006 |
| EP | 1722456 A1 | 11/2006 |
| EP | 1166425 B1 | 2/2007 |
| EP | 1622241 B1 | 2/2007 |
| EP | 1793471 A1 | 6/2007 |
| EP | 1890844 A1 | 2/2008 |
| EP | 1522749 B1 | 3/2008 |
| EP | 1659672 B1 | 4/2008 |
| EP | 1938440 A1 | 7/2008 |
| EP | 1670121 B1 | 11/2008 |
| EP | 2020733 A2 | 2/2009 |
| EP | 1388922 B1 | 10/2009 |
| EP | 1907798 B1 | 12/2009 |
| EP | 1715565 B1 | 11/2010 |
| EP | 2158403 B1 | 11/2010 |
| EP | 2582015 A1 | 4/2013 |
| EP | 1546586 B1 | 5/2014 |
| EP | 1703140 B1 | 5/2014 |
| EP | 1880462 B1 | 2/2015 |
| EP | 2189055 B1 | 4/2015 |
| EP | 2228179 B1 | 8/2015 |
| EP | 2919368 A2 | 9/2015 |
| EP | 2934817 A1 | 10/2015 |
| EP | 2391480 B1 | 11/2015 |
| EP | 2944015 A2 | 11/2015 |
| EP | 2845299 B1 | 5/2016 |
| EP | 3032708 | 6/2016 |
| EP | 3089328 B1 | 4/2017 |
| EP | 3157713 A1 | 4/2017 |
| EP | 3162511 A1 | 5/2017 |
| EP | 2384855 B1 | 6/2017 |
| EP | 3211489 A1 | 8/2017 |
| EP | 3243259 A1 | 11/2017 |
| EP | 3285966 A1 | 2/2018 |
| EP | 3297140 A1 | 3/2018 |
| EP | 2849316 B1 | 7/2018 |
| EP | 2945260 B1 | 8/2018 |
| EP | 2998073 B1 | 9/2018 |
| EP | 3163718 B1 | 9/2018 |
| EP | 2744627 B1 | 10/2018 |
| EP | 3203618 B1 | 11/2018 |
| EP | 3404805 A1 | 11/2018 |
| EP | 2451059 B1 | 1/2019 |
| EP | 1384307 B1 | 3/2019 |
| EP | 2195910 B1 | 5/2019 |
| EP | 2682214 B1 | 6/2019 |
| EP | 3285370 B1 | 6/2019 |
| EP | 3290157 B1 | 7/2019 |
| EP | 2632035 B1 | 8/2019 |
| EP | 3531538 A1 | 8/2019 |
| EP | 2903141 B1 | 9/2019 |
| EP | 3534504 A1 | 9/2019 |
| EP | 2744083 B1 | 10/2019 |
| EP | 3547503 A1 | 10/2019 |
| EP | 3580832 A1 | 12/2019 |
| EP | 3296065 B1 | 3/2020 |
| EP | 3345283 B1 | 3/2020 |
| EP | 2600502 B1 | 4/2020 |
| EP | 3641105 A1 | 4/2020 |
| EP | 3385035 B1 | 5/2020 |
| EP | 3411939 B1 | 5/2020 |
| EP | 3659747 A1 | 6/2020 |
| EP | 3670095 A1 | 6/2020 |
| EP | 2242907 B1 | 7/2020 |
| EP | 3298679 B1 | 7/2020 |
| EP | 3062419 | 9/2020 |
| EP | 3439148 B1 | 9/2020 |
| EP | 2969332 B1 | 10/2020 |
| EP | 3751723 A1 | 12/2020 |
| EP | 3790168 A1 | 3/2021 |
| EP | 3790171 A1 | 3/2021 |
| EP | 3387737 B1 | 4/2021 |
| EP | 3477776 B1 | 7/2021 |
| EP | 3054566 | 8/2021 |
| EP | 3316453 B1 | 8/2021 |
| EP | 2672609 B1 | 11/2021 |
| EP | 3171494 B1 | 11/2021 |
| EP | 3436221 B1 | 12/2021 |
| EP | 3479967 B1 | 1/2022 |
| IN | 201509106 U | 6/2010 |
| JP | 3042636 B2 | 5/2000 |
| JP | 2001169486 A | 6/2001 |
| JP | 2002153026 A * | 5/2002 |
| JP | 2004274838 A | 9/2004 |
| JP | 2004304945 A | 10/2004 |
| JP | 2008193858 A | 8/2008 |
| JP | 2009033927 A * | 2/2009 ............. H02K 1/278 |
| JP | 4437031 B2 | 3/2010 |
| JP | 2010119192 A | 5/2010 |
| JP | 2011244542 A | 12/2011 |
| JP | 2012029350 A | 2/2012 |
| JP | 5171307 B2 | 3/2013 |
| JP | 2013116025 A | 6/2013 |
| JP | 6268845 B2 | 8/2013 |
| JP | 2014121104 A | 6/2014 |
| JP | 5801216 B2 | 10/2015 |
| JP | 5872807 B2 | 3/2016 |
| JP | 5960541 B2 | 8/2016 |
| JP | 2019068593 A | 4/2019 |
| JP | 6517127 B2 | 5/2019 |
| JP | 6638310 B2 | 1/2020 |
| JP | 6695241 B2 | 5/2020 |
| KR | 0134787 B1 | 4/1998 |
| KR | 100287851 B1 | 5/2001 |
| KR | 100671709 B1 | 1/2007 |
| KR | 20070059306 A * | 6/2007 |
| KR | 100816373 B1 | 3/2008 |
| KR | 101462786 B1 | 11/2014 |
| KR | 101569432 B1 | 11/2015 |
| KR | 102022005 B1 | 9/2019 |
| KR | 102029713 B1 | 10/2019 |
| WO | WO-9311596 A1 * | 6/1993 ............. H02K 1/278 |
| WO | 2008059736 A1 | 5/2008 |
| WO | 2016155723 A2 | 10/2016 |
| WO | 2016167488 A1 | 10/2016 |
| WO | 2016189245 A1 | 12/2016 |
| WO | 2017094689 A1 | 6/2017 |
| WO | 2017104431 A1 | 6/2017 |
| WO | 2017118516 A1 | 7/2017 |
| WO | 2017175534 A1 | 10/2017 |
| WO | 2017206923 A1 | 12/2017 |
| WO | 2018010699 A1 | 1/2018 |
| WO | 2018038246 A1 | 3/2018 |
| WO | 2018113028 A1 | 6/2018 |
| WO | 2018143449 A1 | 8/2018 |
| WO | 2019023379 A1 | 1/2019 |
| WO | 2019073195 A1 | 4/2019 |
| WO | 2019096223 A1 | 5/2019 |
| WO | 2019120143 A1 | 6/2019 |
| WO | 2019147919 A1 | 8/2019 |
| WO | 2019151395 A1 | 8/2019 |
| WO | 2019167522 A1 | 9/2019 |
| WO | 2019169842 A1 | 9/2019 |
| WO | 2019192822 A1 | 10/2019 |
| WO | 2020003696 A1 | 1/2020 |
| WO | 2020013078 A1 | 1/2020 |

(56) References Cited

FOREIGN PATENT DOCUMENTS

| WO | 2020039682 A1 | 2/2020 |
| WO | 2020073549 A1 | 4/2020 |
| WO | 2020100042 A1 | 5/2020 |
| WO | 2020122462 A1 | 6/2020 |
| WO | 2020126076 A1 | 6/2020 |
| WO | 2021000940 A1 | 1/2021 |
| WO | 2021005883 A1 | 1/2021 |
| WO | 2021018063 A1 | 2/2021 |
| WO | 2021018064 A1 | 2/2021 |
| WO | 2021078251 A1 | 4/2021 |
| WO | 2021115207 A1 | 6/2021 |
| WO | 2021140381 A1 | 7/2021 |
| WO | 2021143415 A1 | 7/2021 |
| WO | 2021248362 A1 | 12/2021 |

OTHER PUBLICATIONS

US 10848032, Nov. 24, 2020, Makita Corp, (Withdrawn).
EP EESR dated, Jun. 6, 2022 in corresponding EP application No. 22154529.6.
EP EESR dated, Jul. 1, 2022 in corresponding EP application No. 22154530.4.
EP EESR dated, Jul. 1, 2022 in corresponding EP application No. 22154531.2.
EP EESR dated, Jul. 1, 2022 in corresponding EP application No. 22154533.8.
EP EESR dated, Jul. 1, 2022 in corresponding EP application No. 22154534.6.

\* cited by examiner

HIGH-POWER MOTOR FOR A BODY-GRIP POWER TOOL

RELATED APPLICATION

This patent application claims the benefit of U.S. Provisional Patent Application No. 63/144,802 filed Feb. 2, 2021, and U.S. Provisional Patent Application No. 63/266,197 filed Dec. 30, 2021.

FIELD

This disclosure relates to a brushless motor assembly for a rotary tool, and particularly to a compact brushless motor assembly for use in a gripping portion of a body grip power tool.

BACKGROUND

Brushless direct-current (DC) motors have been used in power tool applications for over a decade. While BLDC motors provide many size and power output advantages over universal and permanent magnet DC motors, it is always desired to manufacture more compact motors while providing the same or higher power output. While known brushless DC motor designs are capable of outputting high power from a DC power source such as a battery pack to perform many power tool applications such as grinding, cutting, drilling, etc., such motors typically have a diameter greater than or equal to 40 mm, making them unsuitable for placement in a gripping handle of a power tool.

U.S. Pat. No. 8,816,544 is an example of a brushless motor for a grinding tool sized to be received within a gripping portion of the tool. However, this motor uses an alternating-current (AC) power source and is incapable of producing the same output levels from a smaller-voltage DC power source. Further, the motor utilizes a segmented stator design to form the stator windings, which is expensive and prone to high noise and vibration in high torque applications. What is needed is a brushless DC motor formed of a single-piece stator and including a small diameter, yet capable of producing a high power output needed for power tool applications.

SUMMARY

According to an embodiment of the invention, a power tool is provided including a housing having a grip portion with a grip circumference of smaller than or equal to approximately 120 mm; and a brushless direct-current (BLDC) motor at least partially disposed within the grip portion of the housing and configured to output a maximum power output of at least 450 watts. The motor includes a stator including a stator core and stator windings; and a rotor rotatably received within the stator and including a rotor shaft extending along a longitudinal axis and a series of permanent magnet rings mounted sequentially along the longitudinal axis and surrounding the rotor shaft, each permanent magnet including a plurality of magnetic poles.

In an embodiment, the rotor includes an outer diameter in the range of approximately 13 mm to 16 mm and a length that is at least 1.4 times greater than the outer diameter.

In an embodiment, the rotor further comprises a plurality of rotor core segments securely mounted in series on the rotor shaft, the permanent magnet rings being respectively mounted on the rotor core segments.

In an embodiment, each rotor core segment is provided with at least two annular alignment members including flexible material mounted proximate two ends of the rotor core segment between the rotor core segment and the corresponding permanent magnet ring.

In an embodiment, each rotor core segment includes annular grooves, wherein an adhesive material is disposed within the annular grooves for retention of the corresponding permanent magnet ring.

In an embodiment, the permanent magnet rings are securely mounted directly on the rotor shaft.

In an embodiment, the rotor shaft includes a stepped construction including a first portion surrounded by the magnet rings and having a first diameter, and a second portion not surrounded by the magnet rings and having a second diameter, wherein the first diameter is greater than the second diameter.

In an embodiment, a rotor bearing is mounted on the second portion of the rotor shaft, and a circuit board is electrically coupled to the stator windings and includes conductive traces facilitating interconnections between the stator windings. In an embodiment, the rotor bearing is located between the permanent magnet rings and the circuit board along the longitudinal axis.

In an embodiment, a front bearing is mounted on the rotor shaft forward of the rotor assembly.

According to an embodiment of the invention, a power tool is provided including a housing and a brushless direct-current (BLDC) motor disposed within the housing. The motor includes a stator including a stator core and stator windings; and a rotor rotatably received within the stator and including a rotor shaft extending along a longitudinal axis and permanent magnets. The rotor shaft includes a stepped construction including a first portion inside the stator assembly having a first diameter and a second portion outside the stator assembly having a second diameter. The first diameter is greater than the second diameter and the permanent magnets are mounted directly on the first portion of the rotor shaft.

In an embodiment, a magnet ring integrally is provided that includes the permanent magnets. The magnet ring has an inner diameter that is approximately equivalent to the first diameter of the rotor shaft so as to be securely mounted on the first portion of the rotor shaft.

In an embodiment, the magnet ring comprises a plurality of magnet rings mounted in series on the first portion of the rotor shaft.

In an embodiment, a rotor bearing is mounted on the second portion of the rotor shaft, and a circuit board is electrically coupled to the stator windings. The circuit board includes conductive traces facilitating interconnections between the stator windings, and the rotor bearing is located between the permanent magnet rings and the circuit board.

In an embodiment, a sense magnet is mounted on the second portion of the rotor shaft, and the circuit board includes Hall sensors in magnetic interface with the sense magnet.

According to an embodiment of the invention, a power tool is provided including a housing and a brushless direct-current (BLDC) motor disposed within the housing. The motor includes a stator including a stator core and stator windings; a rotor rotatably received within the stator and including a rotor shaft extending along a longitudinal axis and permanent magnets; and a bearing bridge including a center pocket formed around the rotor shaft. A rotor bearing mounted on the rotor shaft is securely received within the center pocket. A circuit board is electrically coupled to the stator windings and includes conductive traces facilitating interconnections between the stator windings. The rotor bearing is located between the permanent magnets and the circuit board along the longitudinal axis.

In an embodiment, the motor further includes an end insulator configured to electrically insulate the stator core from the stator windings and including an annular body extending away from the stator core. The bearing bridge is received at least partially within the end insulator.

In an embodiment, the stator windings are wound from a continuous magnet wire having cross-over portions extending between the adjacent stator windings, where the cross-over portions are guided in contact with the end insulator to be electrically coupled to the circuit board. In an embodiment, a radial plane formed through the rotor bearing intersects the cross-over portions.

In an embodiment, the motor further includes stator terminals mounted on the end insulator and oriented circumferentially outward of an end of the bearing pocket. The stator terminals include first portions arranged to receive the cross-over portions of the magnet wire and second portions arranged to be secured to the circuit board to electrically couple the cross-over portions of to the circuit board.

In an embodiment, a radial plane formed through the rotor bearing intersects the annular body of the end insulator.

In an embodiment, the motor further includes a sense magnet mounted on the second portion of the rotor shaft, where the circuit board includes Hall sensors in magnetic interface with the sense magnet.

BRIEF DESCRIPTION OF THE DRAWINGS

The drawings described herein are for illustration purposes only and are not intended to limit the scope of this disclosure in any way.

DETAILED DESCRIPTION

Figure 1:
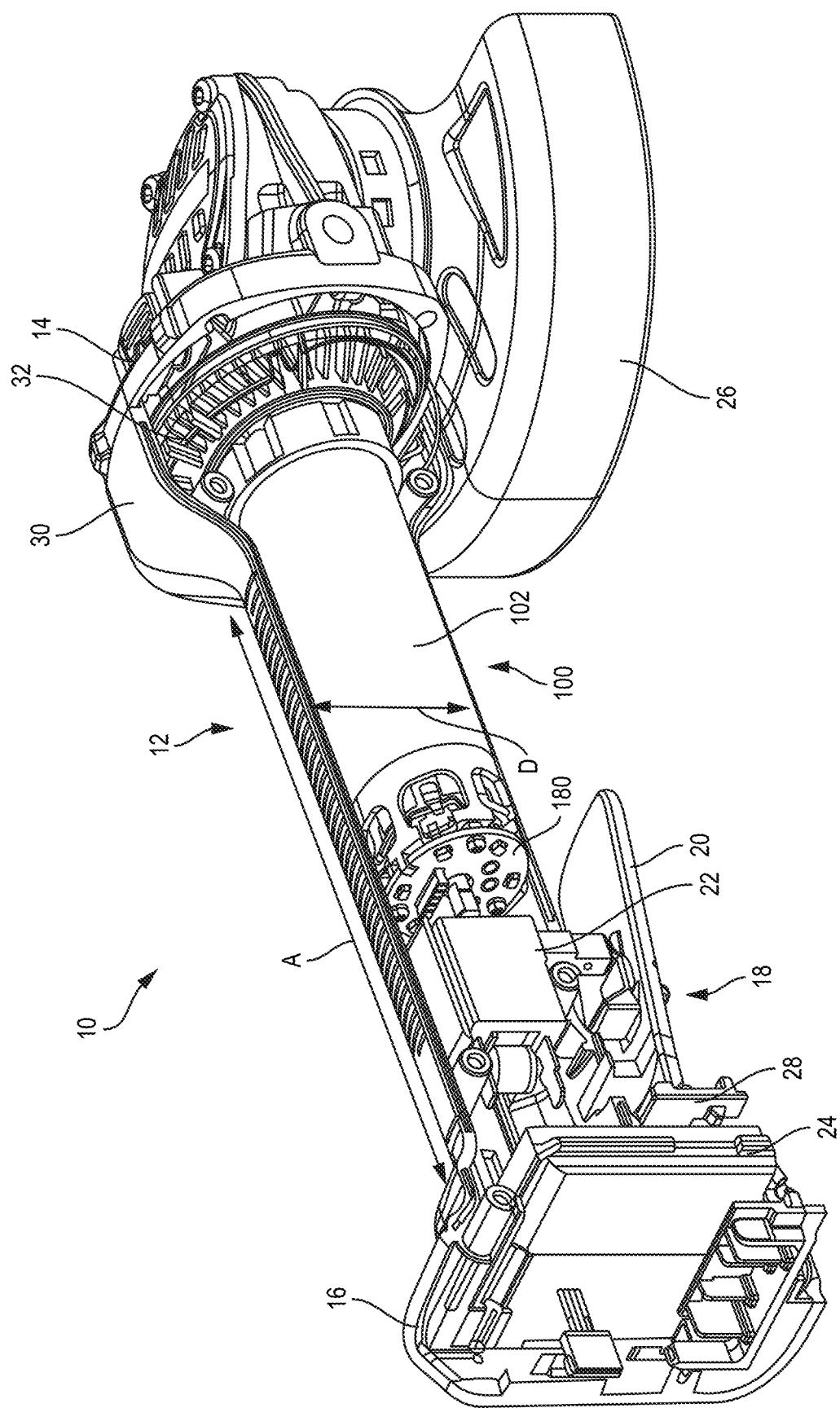
FIG. 1 depicts a perspective view of a power tool including a brushless DC (BLDC) motor, according to an embodiment.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

FIG. 1 depicts a perspective view of a power tool 10 including an elongate housing 12 that houses a brushless direct-current (BLDC) motor 100, a gear case 14 mounted forward of the housing 12, and a battery receptacle 16 formed at the foot of the housing 12 opposite the gear case 14. In this view, the housing 12 is made of a pair of clamshells, one of which is removed to expose the BLDC motor 100 and associated components disposed within the housing 12, according to an embodiment.

In an embodiment, battery receptacle 16 is configured to receive a removable and rechargeable power tool battery pack therein. The battery pack, not shown in this figure, may be, for example a lithium-ion battery pack having a nominal voltage of 18V.

In an embodiment, power tool 10 further includes a trigger assembly 18 mounted on the housing 12 and includes a paddle switch 20 engageable by a user and a switch assembly 22 disposed within the housing 12. In an embodiment, switch assembly 22 may include a mechanical contact switch, a logic switch, or a combination thereof, arranged to activate or deactivate supply of power from the battery pack.

In addition, in an embodiment, power tool 10 includes a control module 24, which in this example is disposed near the battery receptacle 16. In an embodiment, control module 24 includes a programmable controller, such as a microcontroller device, not shown in this figure, mounted on a printed circuit board. The controller includes code that controls supply of electric power to the motor according to various criteria, such as load, speed, and power requirements. In an embodiment, control module 24 may further include a series of power switches, also not shown, configured as a three-phase inverter circuit, controlled by the controller for driving the motor 100. Details of the controller and power switcher are beyond the scope of this disclosure. Reference is made, by way of example, to U.S. Pat. Nos. 10,680,494; 10,615,733; and 10,693,344, all of which are incorporated herein by reference in their entireties, as various examples of motor control and drive configurations.

In an embodiment, the power tool 10 is an angle grinder by way of example, though it should be understood that the principles described herein may be utilized in various other power tools such as a cutout tool, a polisher, a wrench, a drill, an impact driver, a hammer drill, a circular saw, a reciprocating saw, a band saw, a nailer, etc.

In an embodiment, the gear case 14 receives a motor shaft that is rotatable with the motor 100 and includes a series of gears and supports an output spindle driven In an embodiment, the output spindle may be oriented perpendicularly to the motor shaft. In an embodiment, the gear case 14 may additionally include a spindle lock engageable by a user to prevent rotation of the output spindle while the user is mounting a grinding or cutting wheel onto the output spindle. In an embodiment, the gear case 14 may also include a retention flange configured to apply a biasing force to the grinding or cutting wheel for increased security, as described in U.S. patent application Ser. No. 17/412,448 filed on Aug. 26, 2021, which is incorporated herein by reference in its entirety. In an embodiment a guard 26 may be mounted on a collar portion of the gear case 14 around the grinding or cutting accessory.

In an embodiment, the power tool 10 is designed as a body-grip power tool with the housing 12 being sized to fit into a hand grip of a user with relative ease even in the area around the motor 100. As such, in an embodiment, the housing 12 has a maximum diameter D of approximately 35 to 45 mm, preferably approximately 37 to 43 mm, more preferably at most 40 mm, around most of the length of the motor 100. In an embodiment, this maximum diameter D is extends along length A of the housing 12, beginning proximate the battery receptacle 16 and a pivoting connection point 28 of a distal end of the paddle switch 20, to a frontal end 30 of the housing 12 formed around a fan baffle 32 radially containing a motor fan (not shown) and a front end of the motor 100. In an embodiment, the front end 26 of the housing 12 includes a larger diameter than the remainder the housing 12 by a factor of approximately 1.7 to 2. It should be understood, however, that in some applications, the rear of the gear case 14, and thus the front end 26 of the housing 12, include a diameter that is approximately equal to or up to 20% greater than the diameter of the remainder of the housing 12. In an embodiment, the housing 12 includes a maximum diameter D along at least 80% of the entire length of the motor 100, preferably along at least 85% of the entire length of the motor 100.

Figure 2:
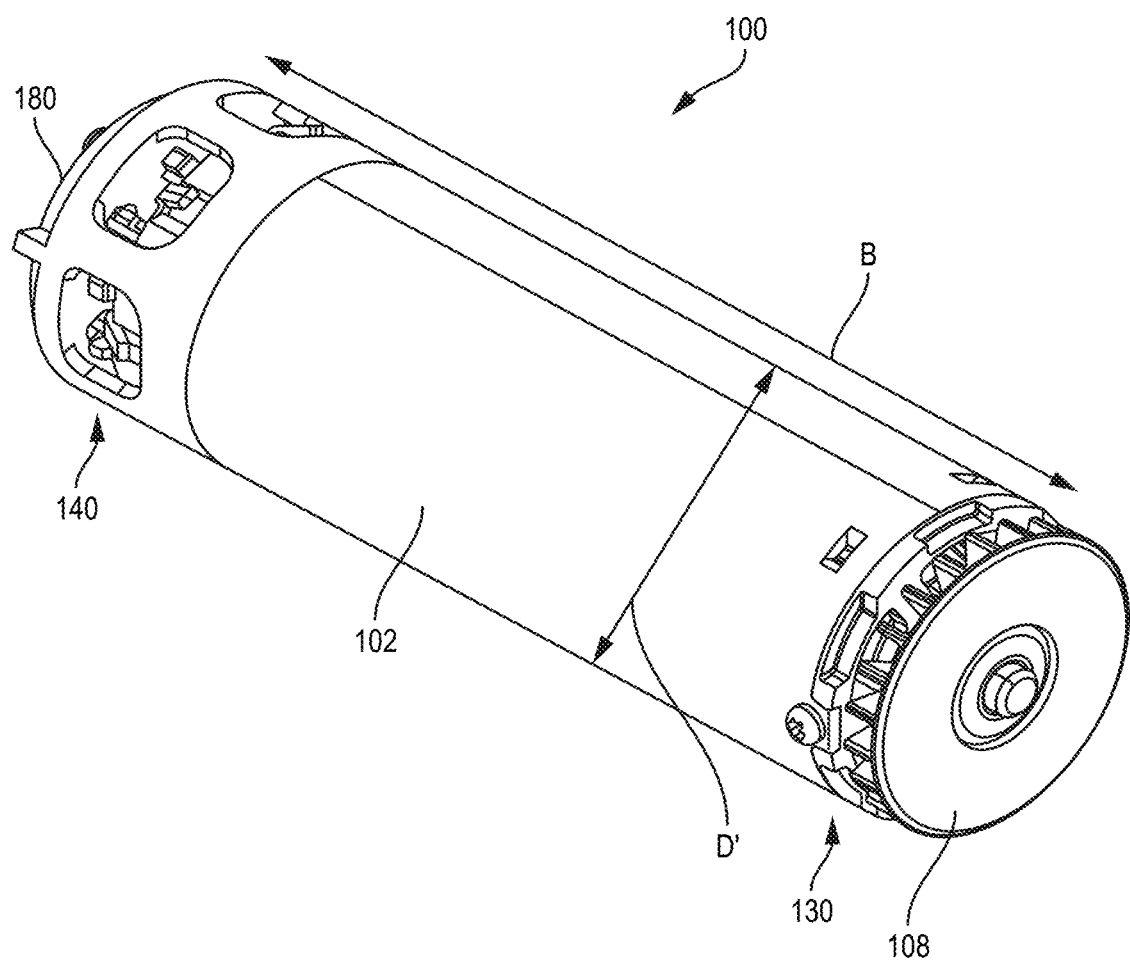
FIG. 2 depicts a perspective view of a BLDC motor, according to an embodiment.
Figure 3:
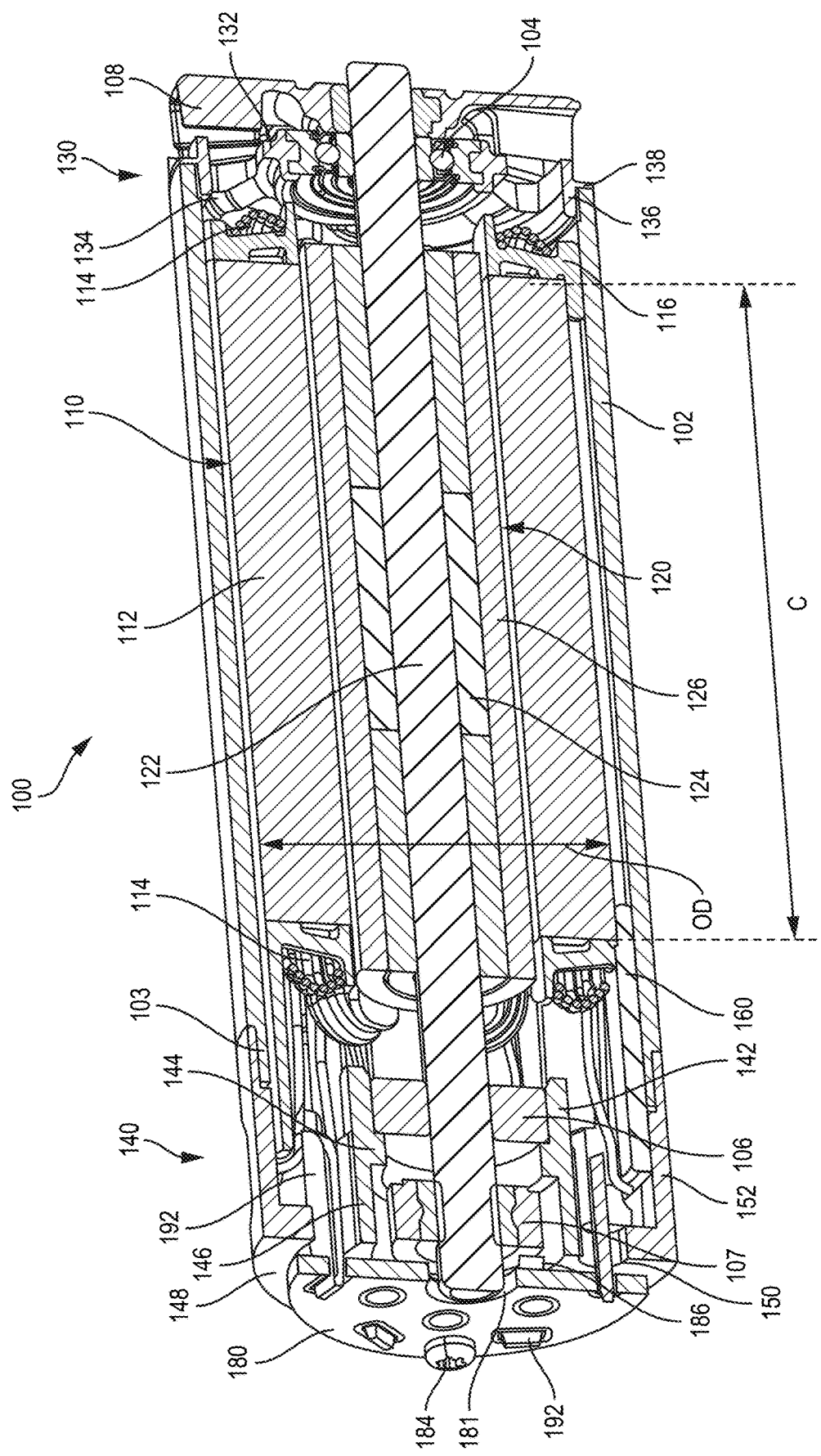
FIG. 3 depicts a cross-sectional view of the BLDC motor, according to an embodiment.

FIG. 2 depicts a perspective view of the brushless DC (BLDC) motor 100, according to an embodiment. FIG. 3 depicts a cross-sectional view of the motor 100, according to an embodiment.

In an embodiment, the motor 100 includes a motor housing (or motor can) 102 having a substantially cylindrical body and two open ends that supports the components of the motor 100 described below. In an embodiment, the motor can 102 may be made of steel or other metal to provide a reliable mounting structure for the motor components. The motor 100 further includes a stator assembly 110 and a rotor assembly 120 mounted on a rotor shaft 122.

In an embodiment, stator assembly 110 is securely received within the inner diameter of the motor can 102 and includes a stator core 112, which may be formed of a series of laminated steel members, and a series of stator windings 114 supported by the stator core 112. In an embodiment, the rotor assembly 120 includes one or more rotor core segments 124 mounted on the rotor shaft 122 in series, each rotor core segment 124 supporting a series of permanent magnets or a permanent magnet ring 126 mounted on its outer surface. In an embodiment, the rotor assembly 120 is disposed within the stator assembly 110. As stator windings 114 are energized in a controlled sequence, the magnetic interaction between the stator windings 114 and the permanent magnets 126 causes the rotation of the rotor assembly 120 relative to the stator assembly 110. For details on constructional and operational principles of the stator and the rotor, reference is made to U.S. Pat. No. 10,923,989, and US Patent Publication No. 2021/0194320, both of which are incorporated herein by reference in their entireties.

In an embodiment, stator assembly 110 further includes a front end insulator 116 mounted on an axial end of the stator core 112 to insulate the stator windings 114 from the stator core 122. Specifically, front end insulator 116 includes a series of teeth corresponding to the teeth of the stator core 112, and the stator windings 114 are wound around the teeth of the front end insulator 116 to avoid direct contact with the metal part of the stator core 112. Reference is made to U.S. Pat. No. 10,328,566, as an example of a stator end insulator construction.

In addition, stator assembly 110 further includes a rear end insulator 160, herein referred to as a routing insulator. Routing insulator 160 is mounted on the other axial end of the stator core 112 opposite the front end insulator 116, and similarly acts to insulate the stator windings 114 from the stator core 122. However, routing insulator 160 has a greater axial length than the front end insulator 116, and it includes features for routing the magnet wire between stator windings 114 and supporting additional components associated with the stator windings 114, as will be described later in detail. In an embodiment, routing insulator 160 extends beyond the rear axial end of the motor can 102.

In an embodiment, motor 100 additionally includes a front bearing support structure (also referred to as front bearing bridge 130), and a rear bearing support structure (also referred to as rear bearing bridge) 140, mounted on the two axial ends of the motor can 102 adjacent two ends of the stator assembly 110. These features will be described below in detail.

In an embodiment, the motor 100 has an overall total length B, as defined from a front end of the front bearing bridge 130 to a rear end of the rear bearing bridge 140, of approximately 100 mm to 130 mm, preferably approximately 110 mm to 120 mm. In an embodiment, the stator assembly 110 has length C, as defined by the length of the stator core 112, of approximately 45 mm to 75 mm, preferably approximately 55 mm to 65 mm, and more preferably no greater than 60 mm. As such, the difference between the overall total length B of the motor and the length C of the stator assembly 110 is approximately 45 mm to 65 mm, preferably approximately 50 mm to 60 mm. In an embodiment, length B is greater than length C by approximately 52% to 63%

In an embodiment, the motor 100 also has a diameter D', as defined by the outer diameter of the motor can 102, of approximately 31 mm to 36 mm, preferably approximately 33 mm to 35 mm, preferably no more than 34 mm. The stator assembly 110 further includes an outer diameter OD, as defined by the outer diameter of the stator core 112, of approximately 27 mm to 34 mm, preferably approximately 28 mm to 33 mm, preferably approximately 29 mm to 32 mm. These dimensions allow for the motor 100 to fit into the small girth of the housing 12 of the power tool 10 while producing enough power for grinding or cutting applications. In an embodiment, the motor 100 is configured to produce maximum long duration power output of at least approximately 450 watts.

In an embodiment, the length B of the motor 100 is at least approximately 50%, more preferably 55%, and even more preferably 60%, of the overall length of the tool housing 12 including frontal end 30 and the battery receptacle 16.

In an embodiment, stator assembly 110 may include a segmented design, where a series of (for example, six) discrete core segments are separately wound and then joined together to form the stator core 112. This configuration is particularly suitable for a small-diameter stator assembly 110, where each segment may be wound to the desired number of turns prior to forming the stator core 112. This configuration, however, has drawbacks associated with cost of manufacturing, reliability, noise and vibration, and cogging torque.

Alternatively, and preferably, stator core 112 is formed with a non-segmented annular body and a series of inwardly-projecting teeth on which the stator windings 114 are wound. Stator core 112 may be a solid-core unit made as a single piece. Alternatively, stator core 112 may be made of laminated steel sheets placed together and interlocked to form a uniform body.

A challenge associated with a non-segmented stator core having a small diameter of, e.g., 36 mm or less is the winding process of the stator windings 114, particularly if a high slot fill is needed to produce a high power density. The winding process may be particularly challenging where the length of the stator is large to compensate for the smaller diameter.

Figure 4:
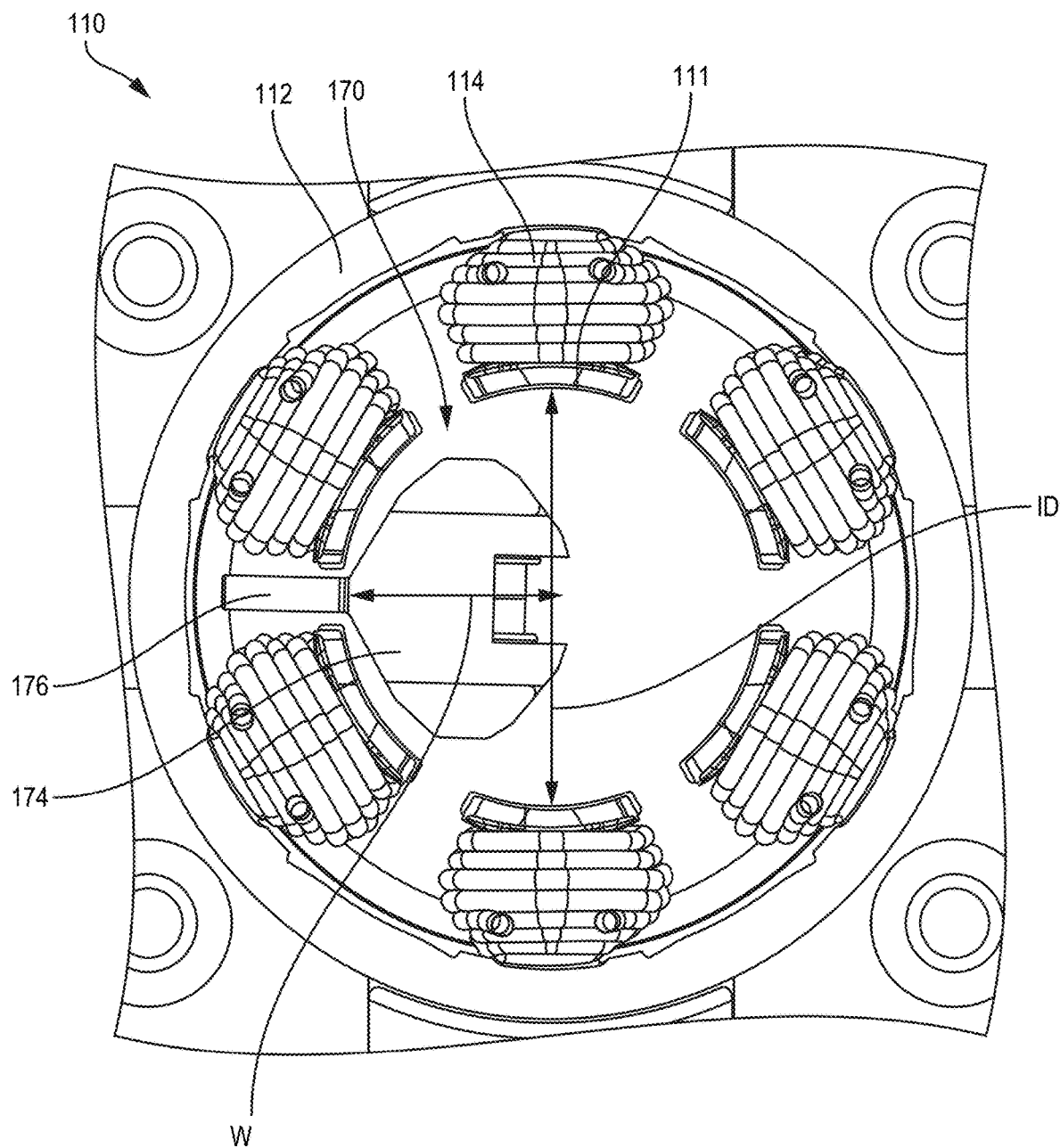
FIG. 4 depicts an axial view of a stator assembly of the BLDC motor during a winding process, according to an embodiment.
Figures 5, 6:
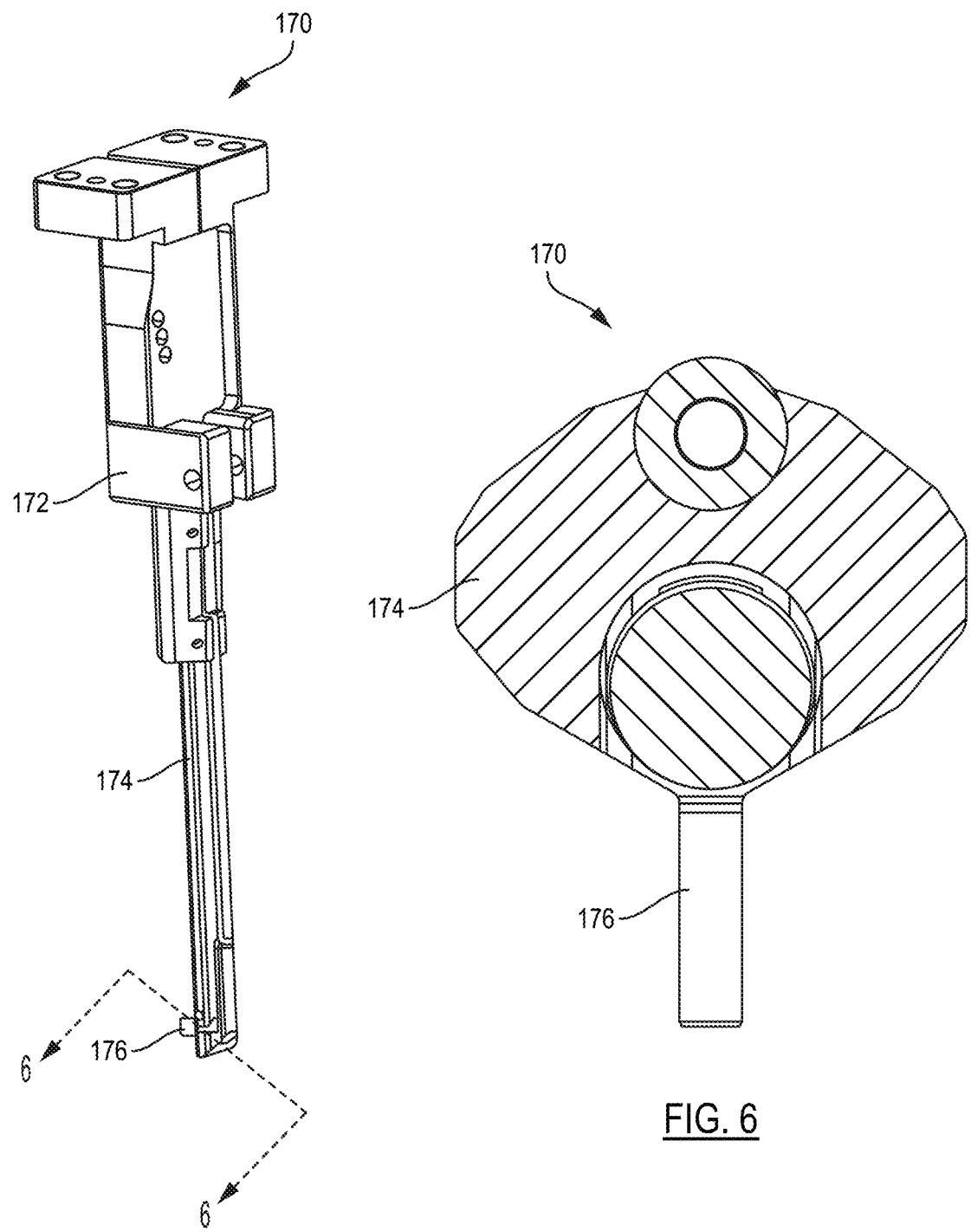
FIG. 5 depicts a perspective view of a winding nozzle for winding the stator assembly, according to an embodiment.
FIG. 6 depicts a cross-sectional view of the winding nozzle, according to an embodiment.

FIG. 4 depicts an axial view of the stator assembly 110 during the winding process of the stator windings 114. In this figure, a winding nozzle 170 is provided for winding the stator windings 114, according to an embodiment. FIG. 5 depicts a perspective view of the winding nozzle 170. FIG. 6 depicts a cross-sectional view of the winding nozzle alone the plane A-A.

In an embodiment, the winding nozzle 170 includes a main body 172, details of which are beyond the scope of this disclosure. Main body 172 is located outside the body of the stator core 112 during the winding process to feed the magnet wire for the winding. The winding nozzle 170 further includes a winding arm 174 extending from the main body 172 and sized to fit inside the inner diameter (ID) of the stator assembly 110 as defined by the distance between opposing inner teeth 111 of the stator core 112. A nozzle head 176 is disposed at the end of the winding arm 174 that is received within the stator slots for winding the magnet wire to form the stator windings 114.

In an embodiment, as discussed above, the outer diameter (OD) of the stator core 112 is approximately 27 mm to 34 mm, leaving an inner diameter (ID) of approximately 14 to 17 mm within which the winding arm 174 is received and operated. In an embodiment, a radial width (W) of the winding arm 174 is approximately less than half the inner opening of the stator, i.e., approximately 7 to 8.5 mm. Further, due to the large length of the stator, in an embodiment, a length of the winding arm 174 is greater than approximately 75 mm.

Referring to FIGS. 2 and 3, in an embodiment, the front bearing bridge 130 is described herein. In an embodiment, the front bearing bridge 130 includes a bearing pocket 132 formed around an outer race of a front bearing 104 mounted on the rotor shaft 122 that securely supports the front bearing 104, a series of radial arms 134 that project outwardly from the bearing pocket 132, and an outer ring 136 configured to mate with an end of the motor can 102. In an embodiment, outer ring 136 is form-fittingly received inside the inner surface of the motor can 102 to radially pilot and structurally support the front bearing bridge 130, and therefore the front bearing 104, relative to the motor can 102. In an embodiment, a radial lip 138 projects outwardly from the outer ring 136 in contact with the end surface of the motor can 102.

In an embodiment, a fan 108 is mounted on the rotor shaft 122 via a bushing 109 adjacent the front bearing bridge 130. In an embodiment, fan 108 may be an axial fan including a series of blades that generate an airflow through the motor can 102. In an embodiment, front bearing bridge 130 is disposed in close enough proximity to act as a baffle for the fan 108. In an embodiment, fan baffle 32 (FIG. 1) may be provided in addition to, or integrally with, the front bearing bridge 130, to support a larger diameter fan 108 and extend around the outer periphery of the fan 108.

In an embodiment, the fan 108 includes substantially the same diameter as the stator core 112 and/or the motor can 102. Alternatively, in an embodiment, the fan 108 includes a diameter that is approximately 70% to 100% larger than the outer diameter of the motor can 102.

Figure 7:
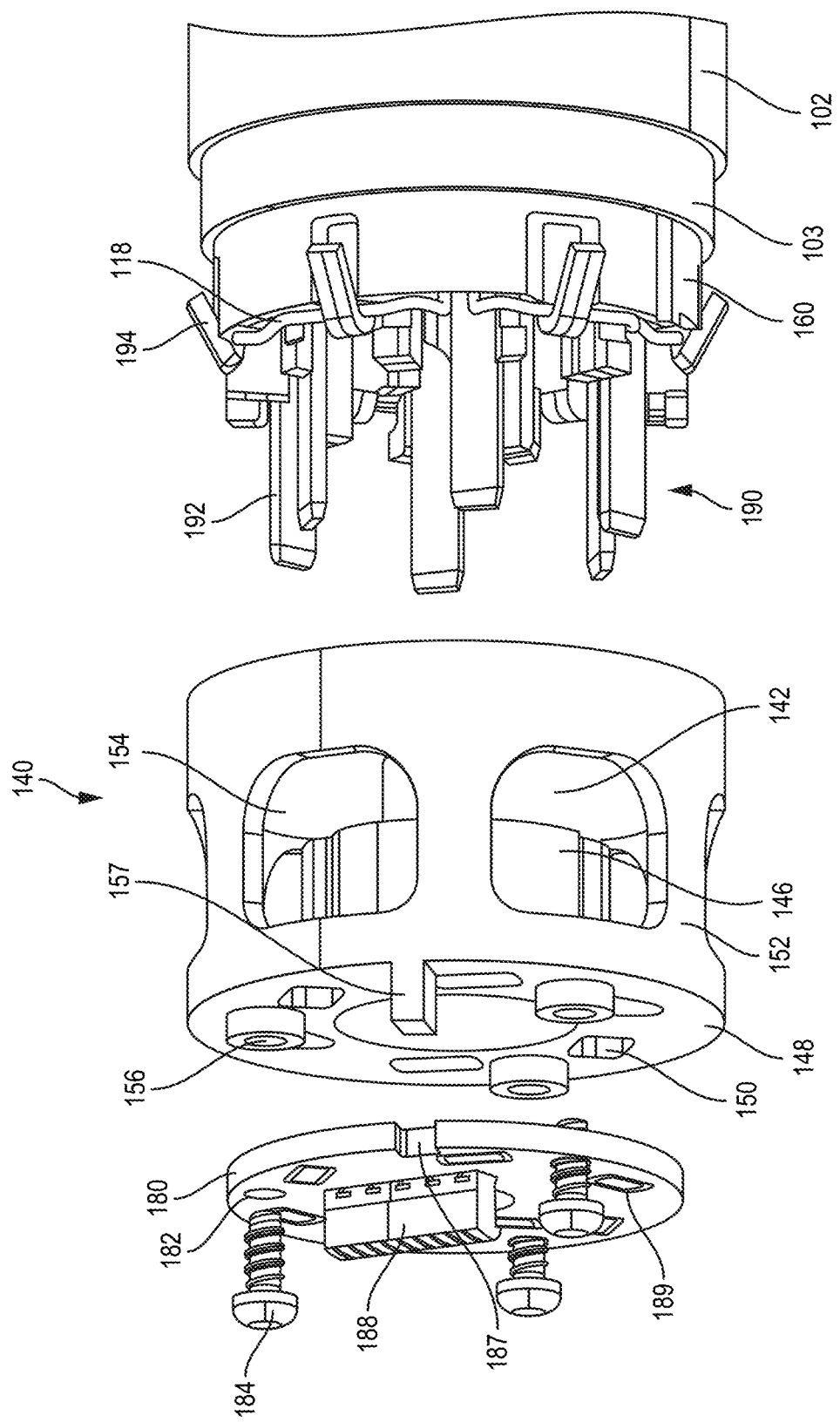
FIG. 7 depicts a partially exploded view of a rear end of the BLDC motor, according to an embodiment.
Figure 8:
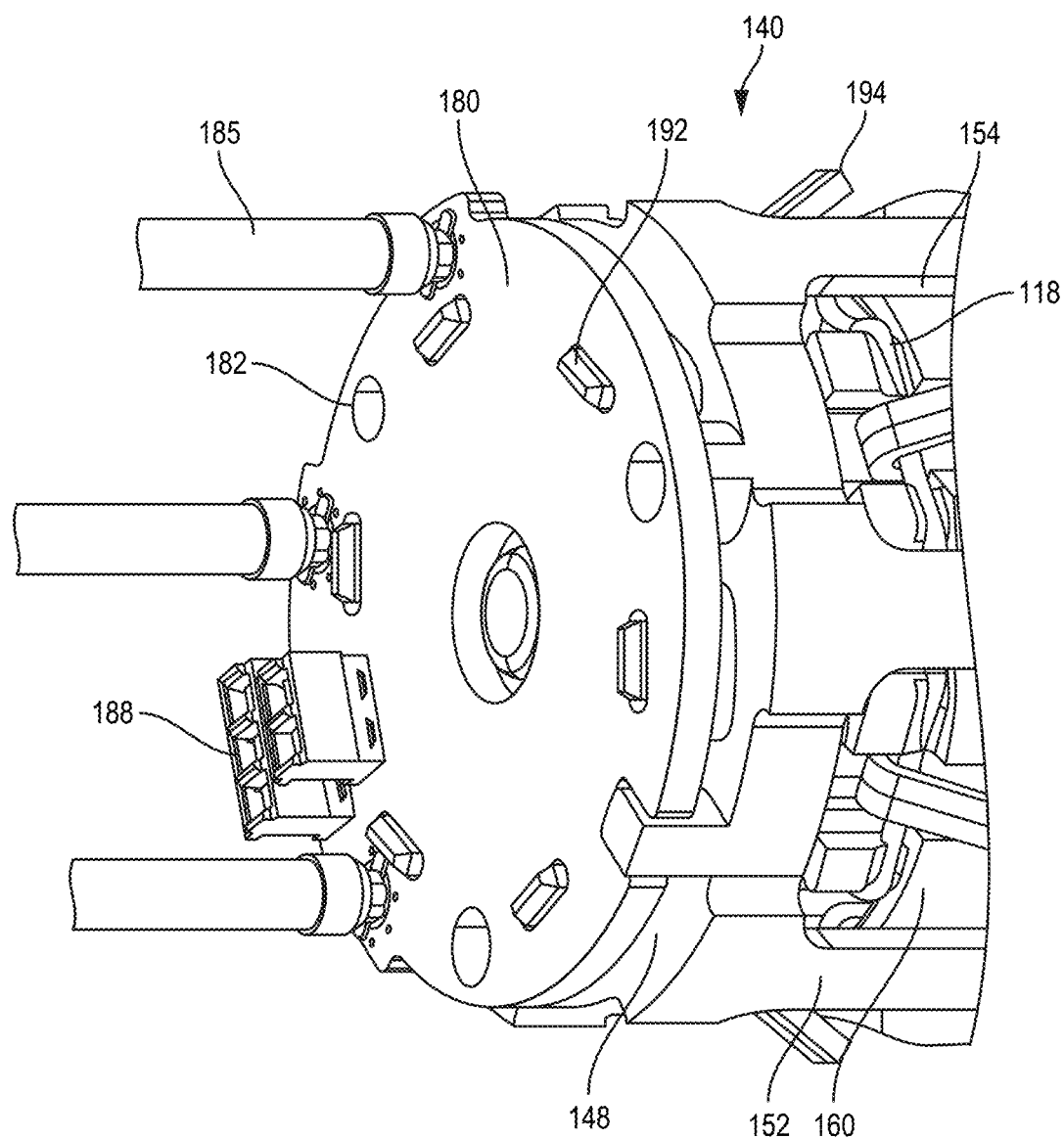
FIG. 8 depicts a perspective view of the rear end of the BLDC motor, according to an embodiment.

FIG. 7 depicts a partially exploded view of the rear end of the motor 100. FIG. 8 depicts a perspective view of the rear end of the motor 100. Referring to these figures, and with continued reference to FIGS. 2 and 3, the rear bearing bridge 140 is described herein.

In an embodiment, rear bearing bridge 140 includes a cylindrical bearing pocket 142 formed around an outer race of a rear bearing 106 mounted on the rotor shaft 122 that securely supports the rear bearing 106. In an embodiment, an annular ring 144 projecting inwardly from the bearing pocket 142 axially engages the rear bearing 106. In an embodiment, an inner annular body 146 extends from the annular ring 144 around the rotor shaft 122 in a direction opposite the bearing pocket 142. A sense magnet 107 mounted on the rotor shaft 122 between the end of the shaft 122 and the rear bearing 107 is arranged within the inner annular body 146 with an airgap therebetween. The sense magnet 107 has a magnetization orientation that corresponds to the orientation of the permanent magnet ring 126.

In an embodiment, a radial plate 148 projects radially outwardly from a rear end of the inner annular body 146 defining a series of openings 150 therein. In an embodiment, an outer annular body 152 extends from the boundary of the radial plate 148 coaxially around the inner annular body 146 and the bearing pocket 142 at approximately the same axial length as the inner annular body 146 and the bearing pocket 142 combined. The outer annular body 152 includes a series of peripheral openings 154 arranged to receive airflow from outside the motor 100. The outer annular body 152 includes a diameter that is substantially equal to the diameter D' of the motor can 102. In an embodiment, outer annular body 152 mates with the rear end of the cylindrical body, preferably forming a flush outer surface. In an embodiment, the rear end of the motor can 102 includes an annular lip 103 that is configured to be form-fittingly received inside the front end of the outer annular body 152. This arrangement radially pilots and structurally supports the rear bearing bridge 140, and therefore the rear bearing 106, relative to the motor can 102.

In an embodiment, a circuit board 180 is mounted on the rear end of the rear bearing bridge 140 adjacent the radial plate 148. The circuit board 180 includes center opening 181 through which the rear end of the rotor shaft 122 is received. The circuit board 180 also includes a series of holes 182 near its outer periphery corresponding to fastening receptacles 156 disposed on the radial plate 148 of the rear bearing bridge 140. Fasteners 184 are received through the holes 182 and fastened into the fastening receptacles 156 to securely support the circuit board 180 adjacent the radial plate 148.

In an embodiment, the circuit board 180 includes a series of magnetic sensors (e.g., Hall elements) 186, only one of which can be seen in FIG. 3, disposed around the center opening 181 facing the sense magnet 107 at an equidistant angular orientation. The center opening 181 includes a smaller diameter than the inner annular body 146, allowing exposure of the magnetic sensors 186 to the sense magnet 107 along the axial direction. The magnetic sensors 186 magnetically sense the magnetic flux of the sense magnet 107 and output positional signals associated with the rotational position of the rotor assembly 120 accordingly. In an embodiment, a connector 188 is mounted on the rear surface of the circuit board 180 to output the positional signals, which are received via signal wires (not shown) by the control module 24.

In an embodiment, as described above, a rear end of the routing insulator 160 extends beyond the rear axial end of the motor can 102. The rear end of the routing insulator 160 is received within the body of the outer annular body 152 of the rear bearing bridge 140 such that a radial plane intersecting the rear bearing 106 also intersects the routing insulator 160. In an embodiment, the rear end of the routing insulator 160 extends approximately to a plane that interests the annular ring 144 of the bearing pocket 142.

In an embodiment, a series of stator terminals 190 are mounted on the routing insulator 160. In an embodiment, the number of stator terminals 190 equals the number of stator windings 114. In a three-phase four-pole motor, six stator windings 114 and six stator terminals 190 are provided. In an embodiment, each stator terminal 190 is provided between adjacent windings 114, with cross-over portions 118 of the magnet wire passing only between adjacent windings 114 coming in contact with the stator terminal 190. The stator terminals 190, as will be described later in detail, include tang portions 194 that make electrical contact with the cross-over portions 118 of the magnet wire, and terminal pins 192 that extend axially from the routing insulator 160 through openings 150 of the rear bearing bridge 14. The circuit board 180 includes a series of slots 189 that securely receive the ends of the terminal pins 192 of the stator terminals 190. In an embodiment, a series of wires 185 are secured to the circuit board 180 to deliver power from the control module 24, via the circuit board 180, to the stator terminals 190. In addition, the circuit board 180 the circuit board includes conductive routings extending from the slots 189, which electrically connect to the stator terminals 190. In an embodiment, the circuit board 180 may be configured to electrically connect the stator terminals 190, and thus the stator windings 114, in a desired configuration. Specifically, in an embodiment, the circuit board 180 may include conductive routings to connect opposite stator windings 114 of the same phase in a series or parallel connection. In an embodiment, the circuit board 180 may also include conductive routings to connect stator windings 114 of different phases in a wye or a delta connection. Reference is made to U.S. Provisional Application No. 63/129,797 filed Dec. 23, 2020, which is incorporated herein by reference in its entirety, for an example of a circuit board that facilitates interconnections between the stator windings in this manner.

In an embodiment, to properly align the slots 189 of the circuit board with the terminal pins 192 of the stator terminals 190, piloting features including a tongue 157 and a corresponding groove 187 are provided on the rear bearing bridge 140 and the circuit board 180 respective.

Figure 9:
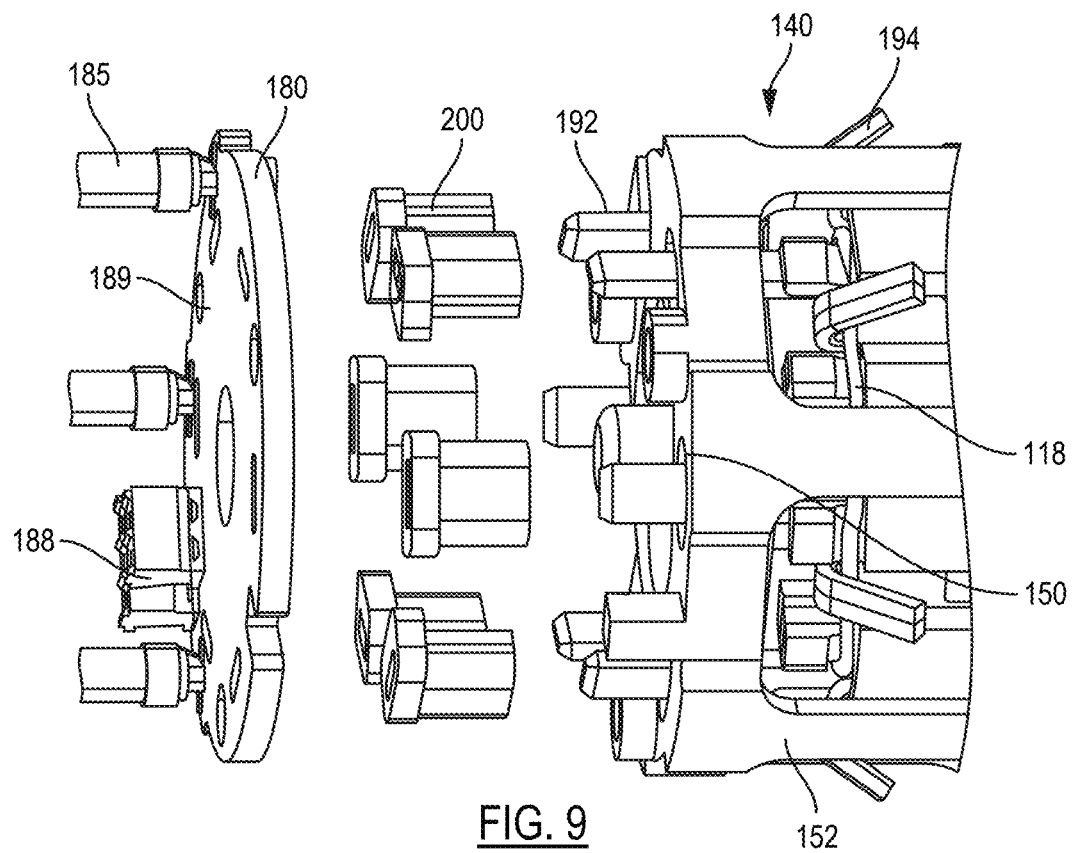
FIG. 9 depicts a partially exploded view of the rear end of the BLDC motor and a circuit board, according to an embodiment.
Figure 10:
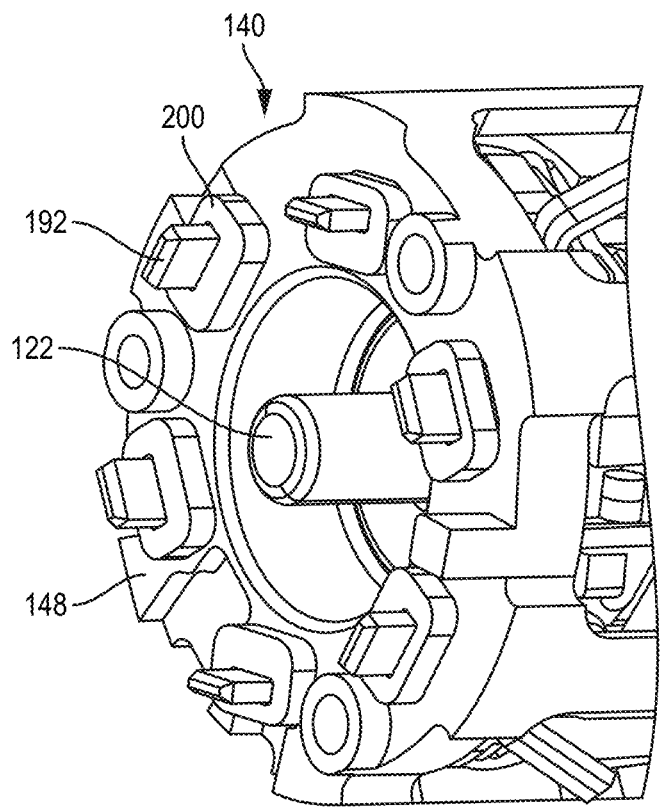
FIG. 10 depicts a perspective view of rear end of the motor without the circuit board, according to an embodiment.

FIG. 9 depicts a partially exploded view of the rear end of the motor 100, showing the circuit board 180 at a distance from the rear bearing bridge 140, according to an embodiment. FIG. 10 depicts a perspective view of rear end of the motor 100 without the circuit board 180, according to an embodiment.

In an embodiment, as shown here, a series of terminal slugs 200 are provided around the rear ends of the terminal pins 192 of the stator terminals 190, according to an embodiment. In an embodiment, the terminal slugs 200 are made of insulating material such as rubber or plastic and shaped to form sleeves around terminal pins 192 to electrically insulate the stator terminals 190 from the rear bearing bridge 140. This arrangement reduces the risk of electrical shortage between the stator terminals 190 and other components. Further, in an embodiment, terminal slugs 200 are fitted into openings 150 of the rear bearing bridge 140, thus axially securing the terminal pins 192 of the stator terminals 190 relative to the rear bearing bridge 140. This arrangement reduces the risk of the terminal pins 192 from being bent during the assembly process and ensures proper alignment of the terminal pins 192 with the slots 189 of the circuit board 180.

Figure 11:
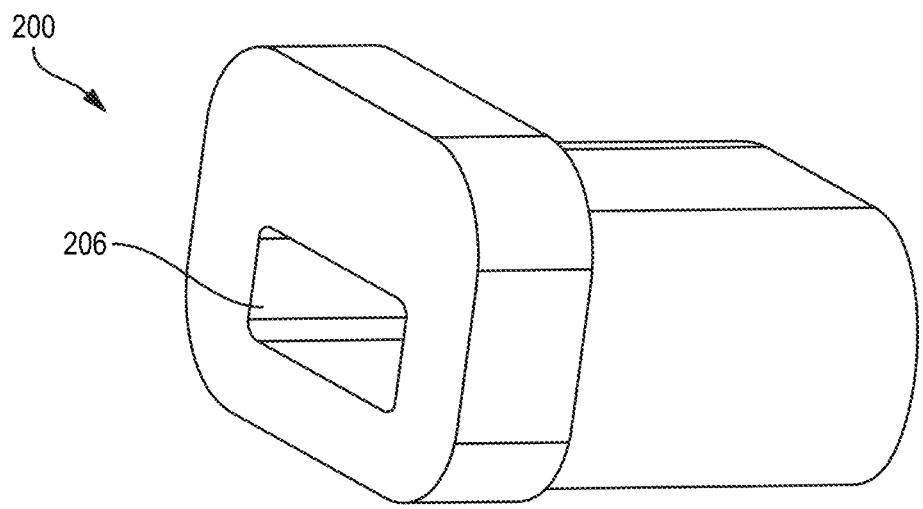
FIG. 11 depicts a perspective view of a terminal slug, according to an embodiment.
Figure 12:
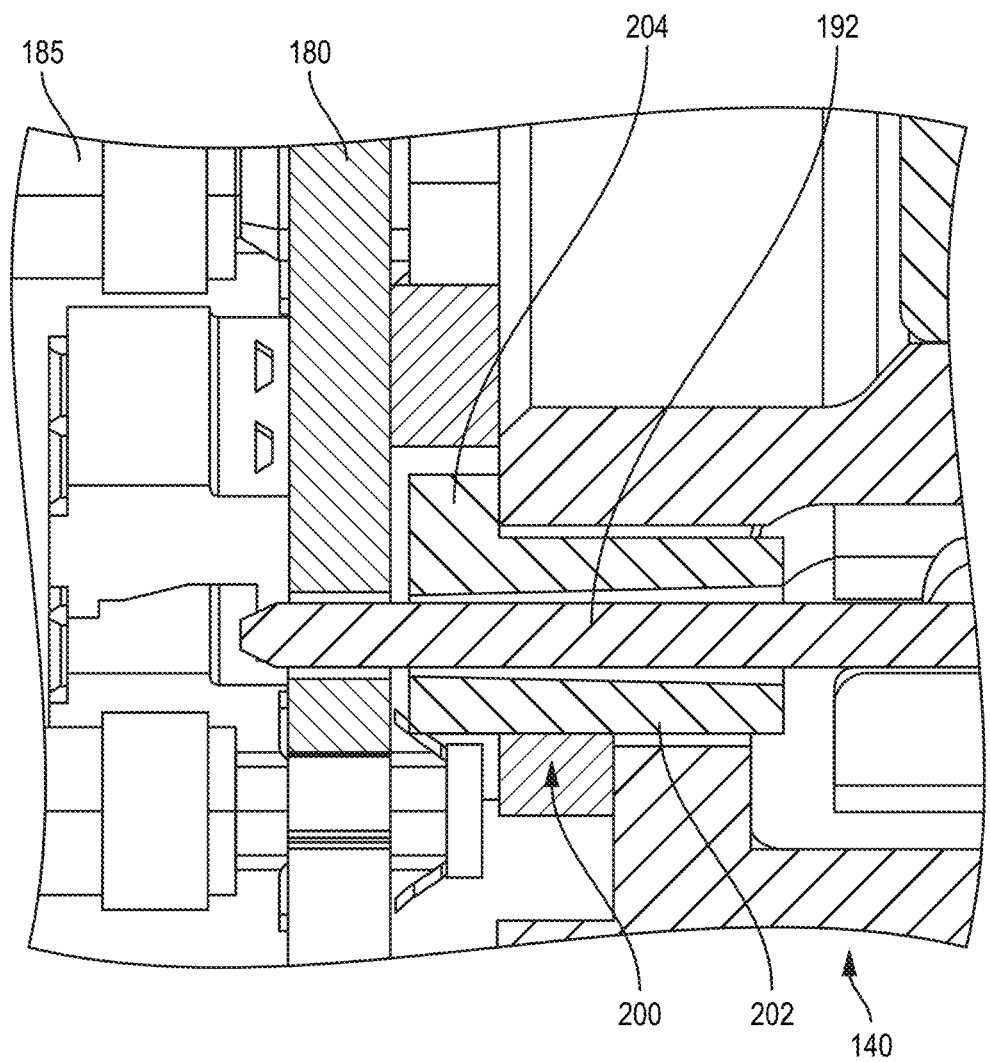
FIG. 12 depicts a zoomed-in cross-sectional view of the rear end of the motor including a terminal slug, according to an embodiment.

FIG. 11 depicts a perspective view of a terminal slug 200, according to an embodiment. FIG. 12 depicts a zoomed-in cross-sectional view of the rear end of the motor 100, showing the terminal pin 192 of one of the stator terminals 190 received within a corresponding terminal slug 200, according to an embodiment.

In an embodiment, as shown in these figures, each terminal slug 200 includes a first portion 202 sized to be form-fittingly received within a corresponding opening 150 of the rear bearing bridge 140. Each terminal slug 200 further includes a second portion 204 that includes a larger cross-sectional area but shorter axial length than the first portion 202 and is configured to rest on top of the radial plate 148 prior to assembly of the circuit board 180 and be sandwiched between the radial plate 148 of the rear bearing bridge 140 and the circuit board 180 after the circuit board 180 is mounted on the rear bearing bridge 140. In this manner, terminal slugs 200 also provide a flexible mounting platform for the circuit board 180. Each terminal slug 200 also includes a slot 206 having a rectangular cross-section that extends through the axial length of the terminal slug 200 sized to form-fittingly receive the terminal pins 192 of the stator terminals 190.

Various embodiments of the stator terminals and mounting of the stator terminals to the routing insulator are described herein.

Figure 13:
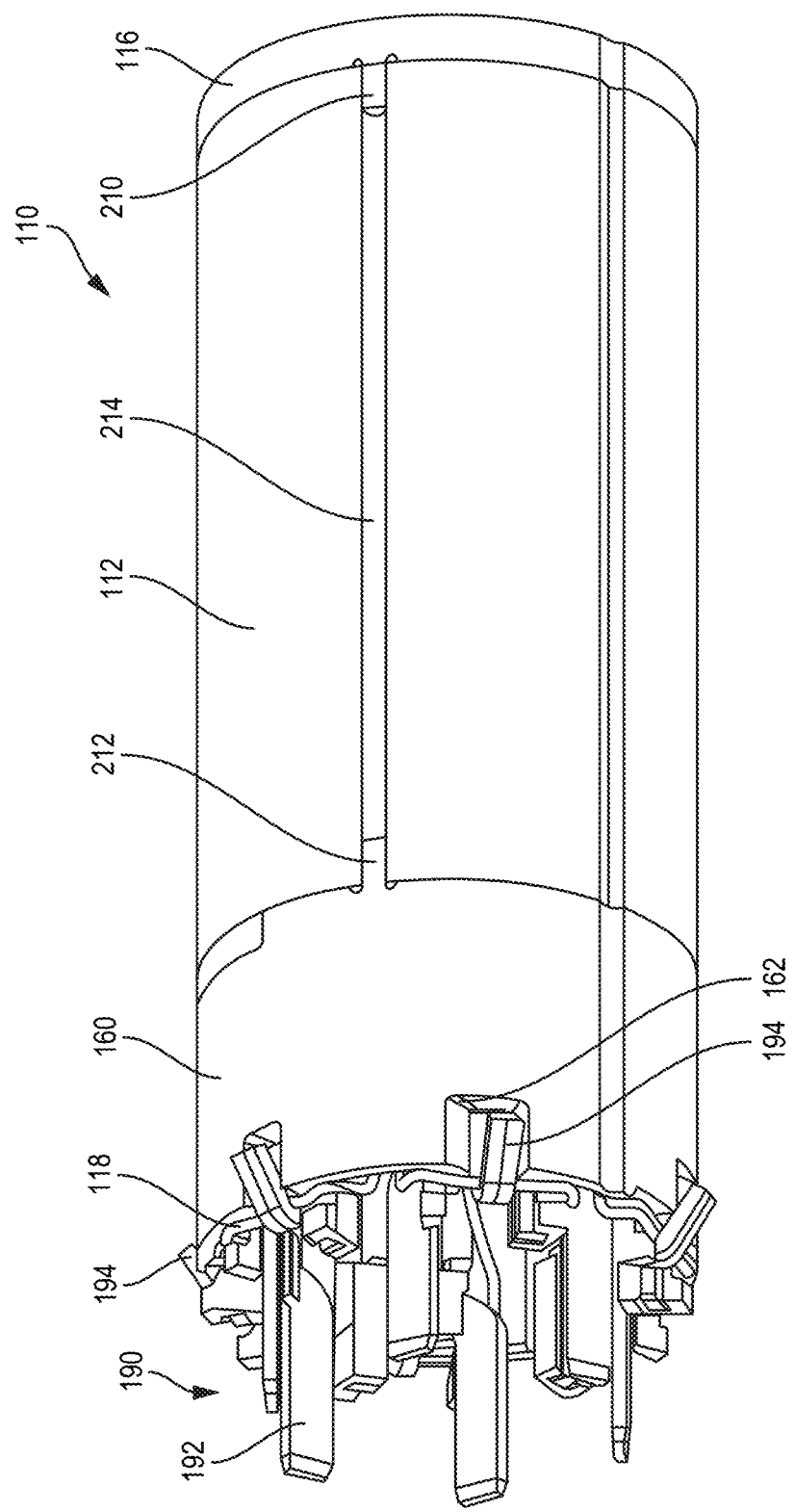
FIG. 13 depicts a perspective view of the stator assembly of the BLDC motor, according to an embodiment.
Figure 14:
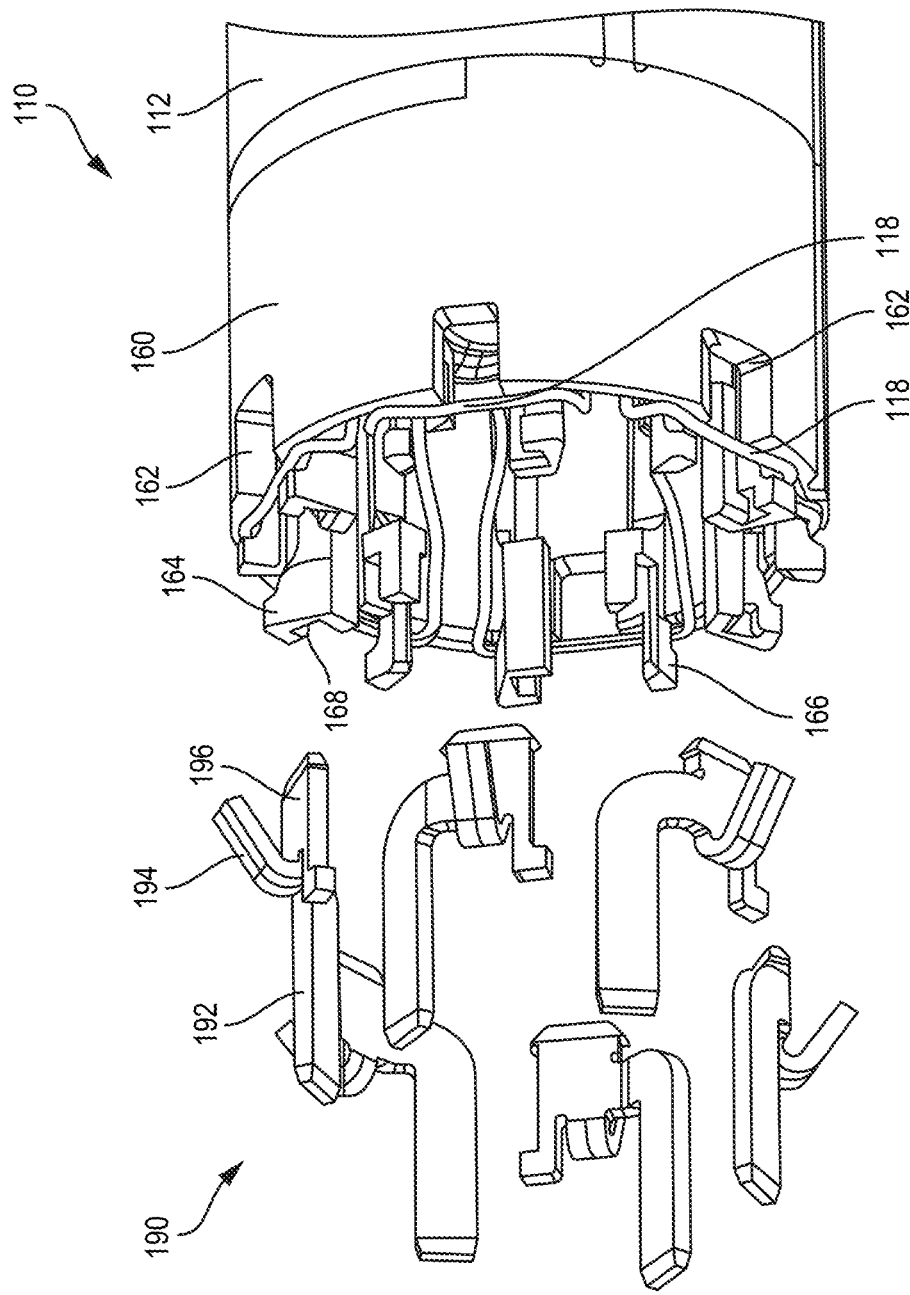
FIG. 14 depicts a partially exploded view of the rear end of the stator assembly including stator terminals, according to an embodiment.
Figure 15A:
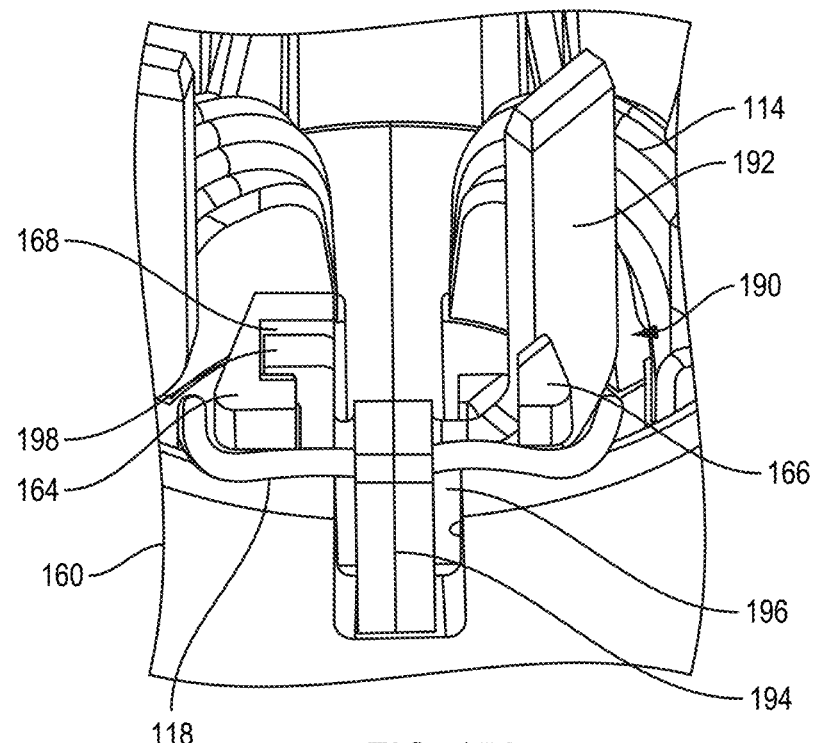
FIGS. 15A and 15B depict front and rear views of a stator terminal mounted on a routing insulator of the stator assembly, according to a first embodiment.
Figure 15B:
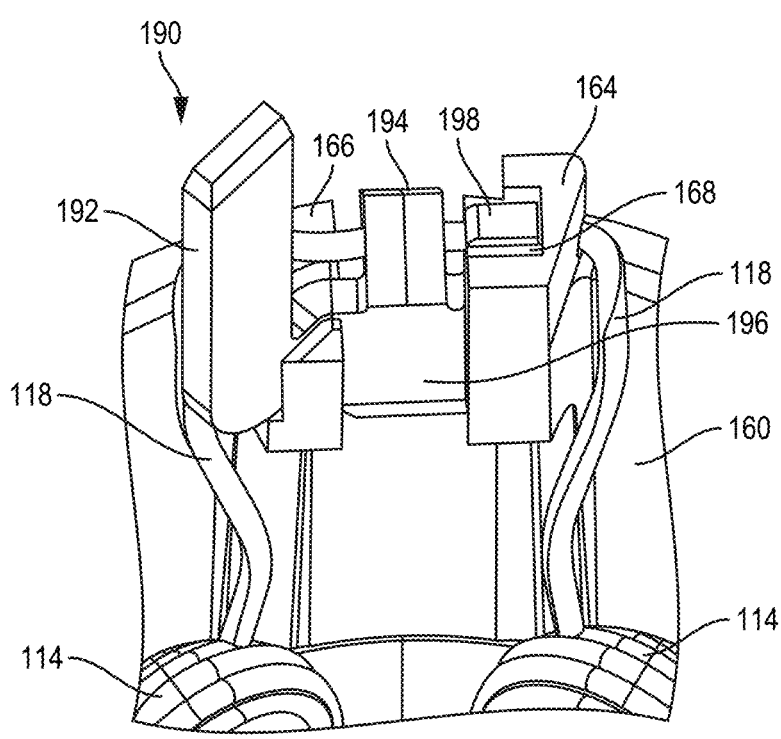

FIG. 13 depicts a perspective view of the stator assembly 110, according to an embodiment. FIG. 14 depicts a partially exploded view of the rear end of the stator assembly 110, showing the stator terminals 190 at a distance from the routing insulator 160, according to an embodiment. FIGS. 15A and 15B depict front and rear views of a stator terminal 190 mounted on the routing insulator 160, according to an embodiment.

In an embodiment, as described above, the front end insulator 116 and the routing insulator (i.e., rear end insulator) 160 are mounted on the two ends of the stator core 112 prior to winding of the magnet wire to form the stator windings 114. The front end insulator 116 and the routing insulator 160 are respectively provided with tongues 210 and 212 that are aligned and received into an axial channel 214 formed in the outer surface of the stator core 112 for proper alignment of the front end insulator 116 and the routing insulator 160 relative to the stator core 112.

In an embodiment, the routing insulator 160 includes a series of recessed region 162 at its rear surface. In addition, the routing insulator 160 includes several pairs of retaining legs 164 and 166 projecting axially-rearwardly from rear surface on two sides of each recessed region 162.

In an embodiment, each stator terminal 190 includes a main body 196 sized to be securely received within the gap formed between the corresponding retaining legs 164 and 166. The tang portion 194 of the each stator terminal 190 extends from the main body 196 and folded over the main body at an angle of approximately 30 to 60 degrees. The terminal pin 192 of each stator terminal 190 extends from one side of the main body 196 adjacent the tang portion 194. In an embodiment, a second leg 198 extends from the other side of the motor body 196. In an embodiment, second leg 198 is significantly smaller in height and size than the terminal pin 192. In an embodiment, the tang portion 194 extends from an edge of the main body 196 between the terminal pin 192 and the second leg 198.

In an embodiment, at least the retaining legs 164 include axially-extending grooves 168 facing the recessed regions 162. In an embodiment, during the assembly process of each stator terminal 190, the second leg 198 is slidingly received into the groove 168 of the retaining leg 164. In an embodiment, the side of the main body 196 from which the terminal pin 192 extends encounters, or is received within a groove of, the retaining leg 166. In an embodiment, the tang portions 194 of the stator terminals 190 is received within the recessed portions 162.

In an embodiment, as the magnet wire is wound to form respective stator windings 114, the cross-over portions 118 of the magnet wire passing from the wound stator winding 114 to the next (i.e., to be wound) stator winding 114 are guided to the rear end of the routing insulator 160 and passed along the rear end of the routing insulator 160 between axial sides of the recessed regions 162. In an embodiment, as the stator terminals 190 are mounted on the routing insulator 160, folded regions of the tang portions 194 capture the cross-over portions 118 of the magnet wire. After the stator terminals 190 are fully secured, the tang portions 194 are radially pressed through the recessed regions 162 against the main bodies 196. The wire insulator parts of the cross-over portions 118 are removed and the conductive parts are of the cross-over portions 118 are electrically connected to the tang portions 194 of the stator terminals 190. This may be done via fusing, wire stripping, welding, soldering, or a combination thereof. Pressing of the tang portions 194 against the main body 196 ensures that no part of the stator terminals 190 projects radially outwardly beyond the outer circumference of the routing insulator 160.

FIGS. 16A through 21B depict various configurations of the stator terminal, according to alternative embodiments.

Figure 16A:
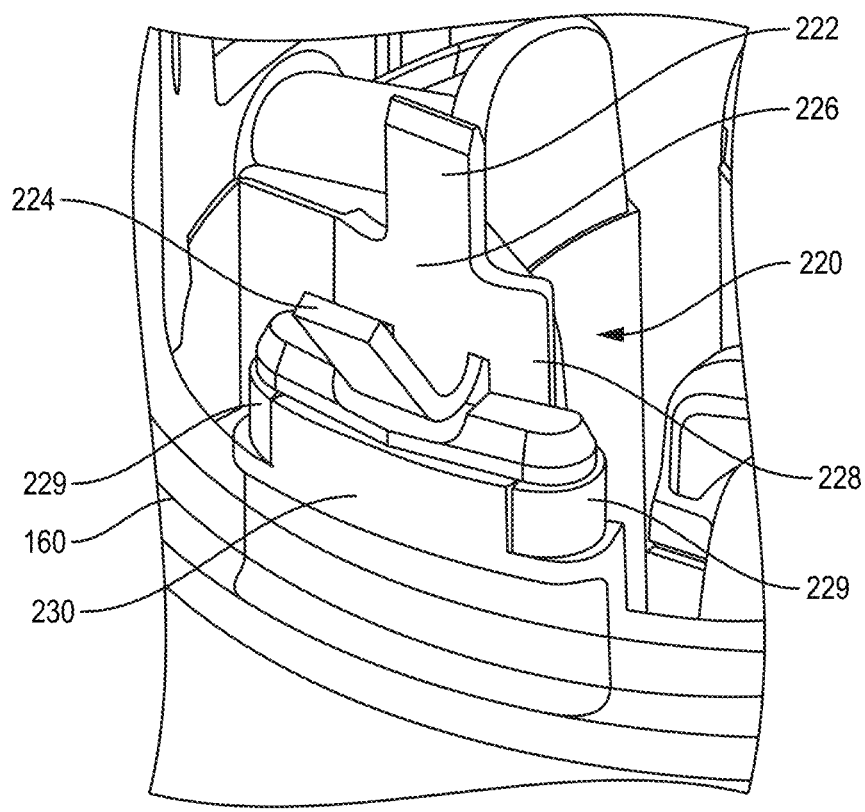
FIGS. 16A and 16B depict front and rear views of a stator terminal mounted on a routing insulator, according to a second embodiment.
Figure 16B:
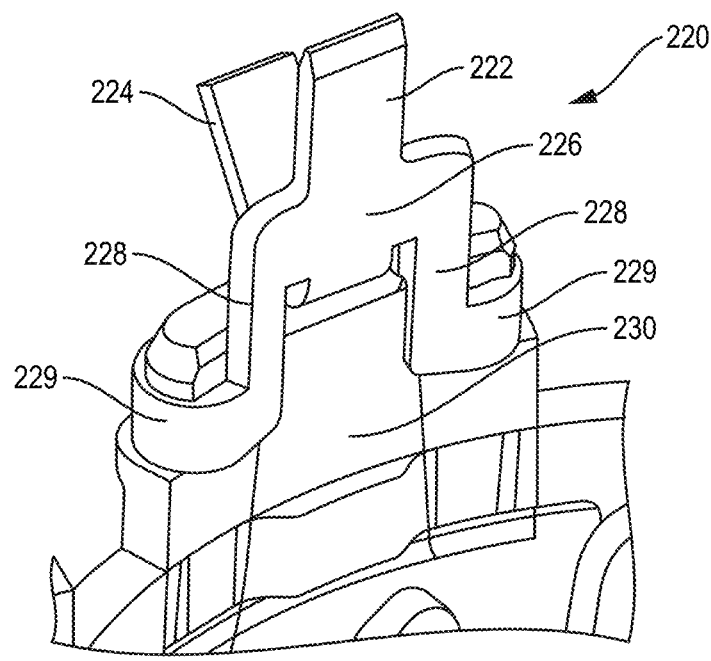

FIGS. 16A and 16B depict front and rear perspective views of a stator terminal 220, according to an embodiment. In this embodiment, the routing insulator 160 includes a series of mounting projections 230 for each stator terminal 220. Each stator terminal 220 includes a main body 226, a terminal pin 222 extending from one end of the main body 226 away from the routing insulator 160, and a tang portion 224 extending from an opposite end of the main body 226 and folded angularly over the main body 226. Two side legs 228 extend from sides of the main body 226 and in the direction of the routing insulator 160. The side legs 228 include hooks 229 that cooperatively wrap around the sides of the mounting projection 230 to secure the stator terminal 220 to the mounting projection 230. During the assembly process, the tang portion 224 captures the cross-over portion of the magnet wire (not shown) and is pressed against the main body 226.

Figure 17A:
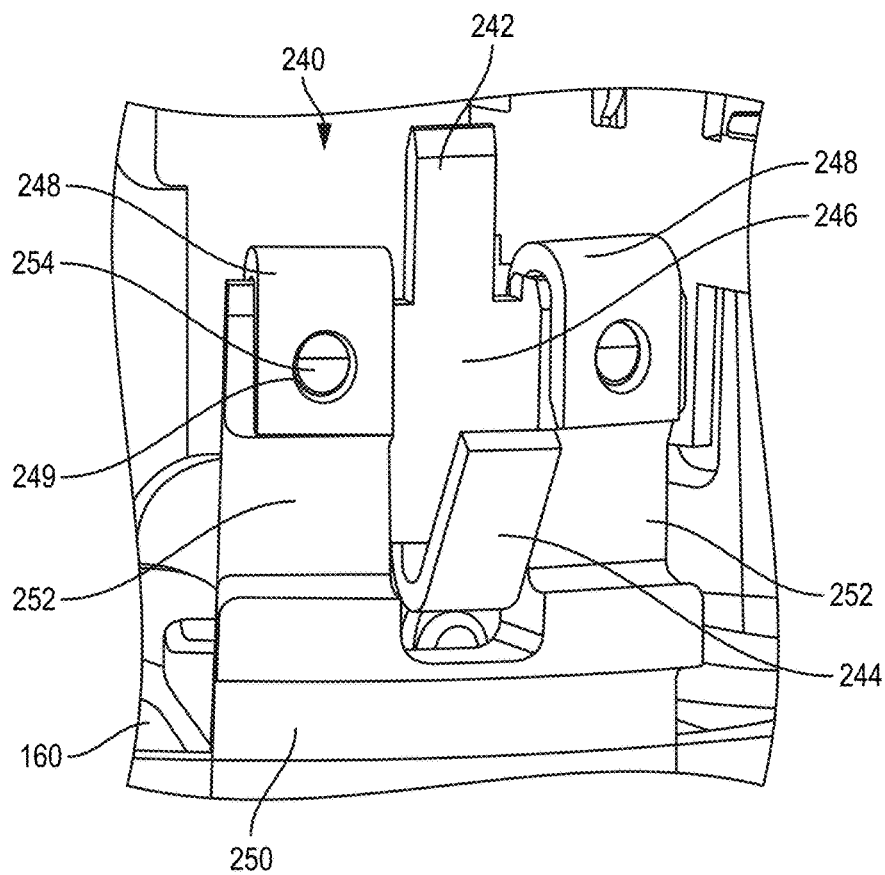
FIGS. 17A and 17B depict front and rear views of a stator terminal mounted on a routing insulator, according to a third embodiment.
Figure 17B:
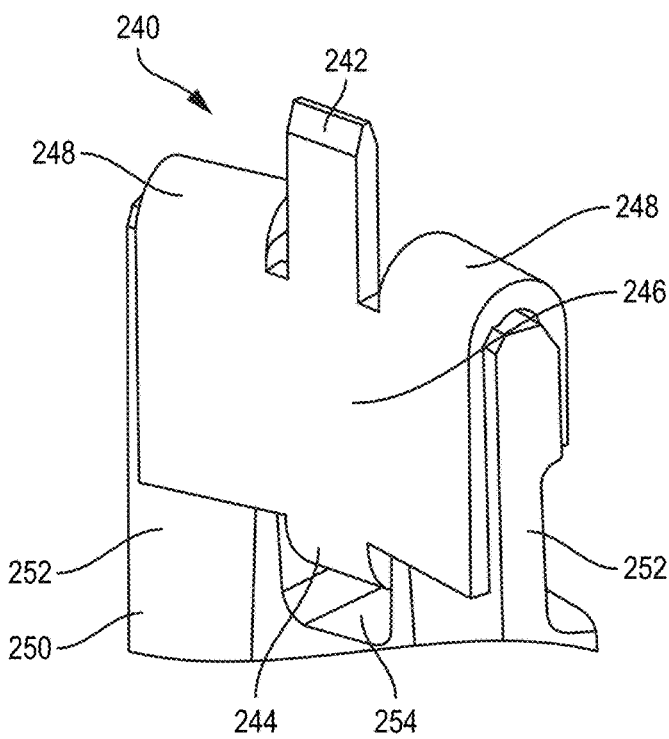

FIGS. 17A and 17B depict front and rear perspective views of a stator terminal 240, according to another embodiment. In this embodiment, the routing insulator 160 includes a series of mounting projections 250 for each stator terminal 240, each mounting projection 250 including two arms 252 defining an opening 254 therebetween. Each stator terminal 240 includes a main body 246, a terminal pin 242 extending from a distal end of the main body 246 away from the routing insulator 160, and a tang portion 244 extending from an opposite end of the main body 246 and folded angularly over the main body 246 in alignment with the opening 254. Two side legs 248 extend from the distal end of the main body 246 on two sides of the terminal pin 242 and are folded over the two arms 252 of the mounting projection 250. The arms 252 include snapping portions 254 arranged to be received within corresponding holes 249 of the side legs 248 to secure the stator terminal 240 to the mounting projection 250. During the assembly process, the tang portion 244 captures the cross-over portion of the magnet wire (not shown) and is pressed into the opening 254 against the main body 246.

Figure 18:
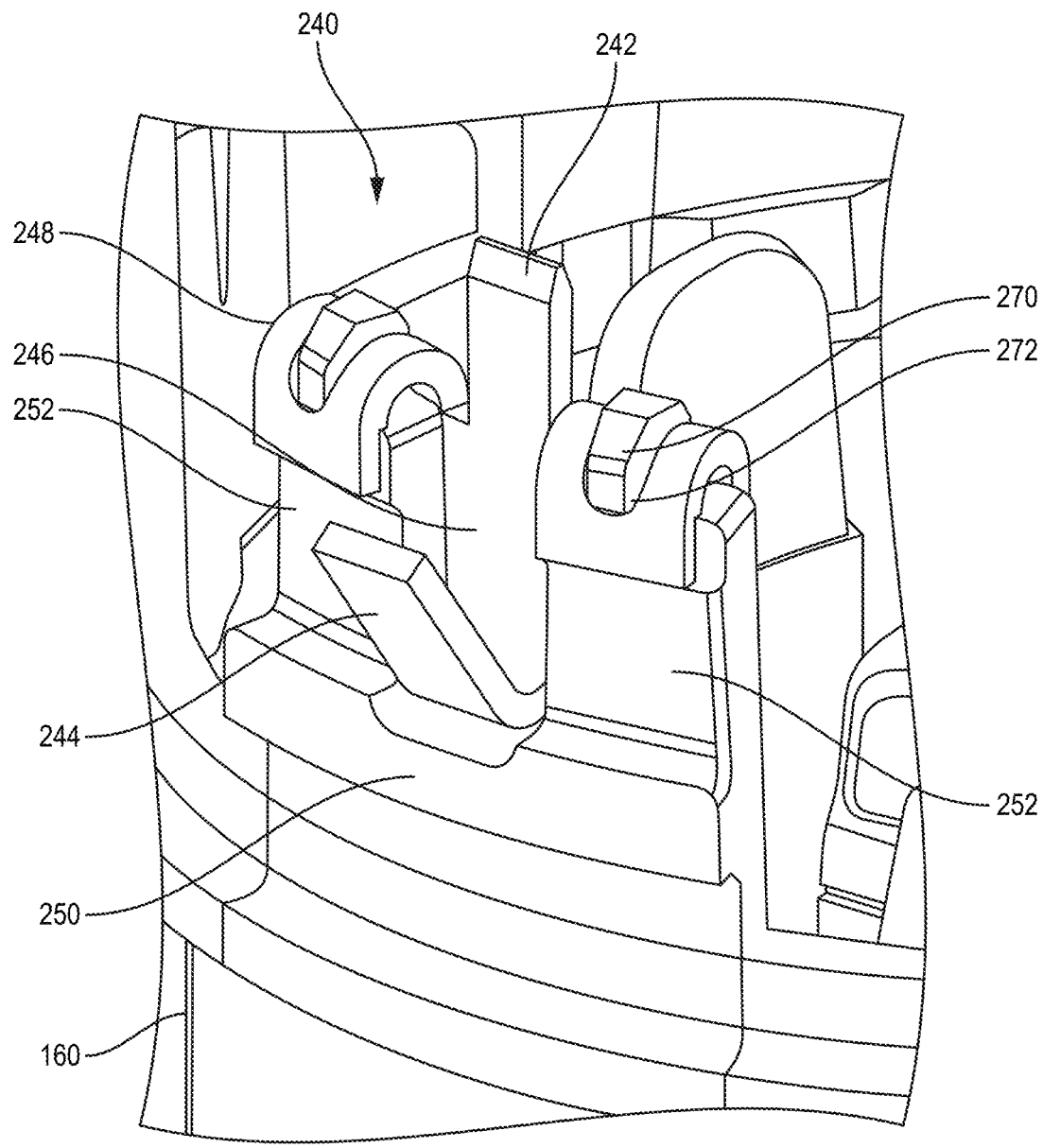
FIG. 18 depicts a front view of a stator terminal mounted on a routing insulator, according to a fourth embodiment.

FIG. 18 depicts a front perspective view of the stator terminal 240, according an alternative embodiment. In this embodiment, arms 252 of the mounting projection 250 include upper cantilever snap beams 270. The side legs 248 of the stator terminal 240 include upper openings 272 through which the upper cantilever snap beams 270 are received to make a snap-fit connection between the mounting projection 250 and the stator terminal 240.

Figure 19A:
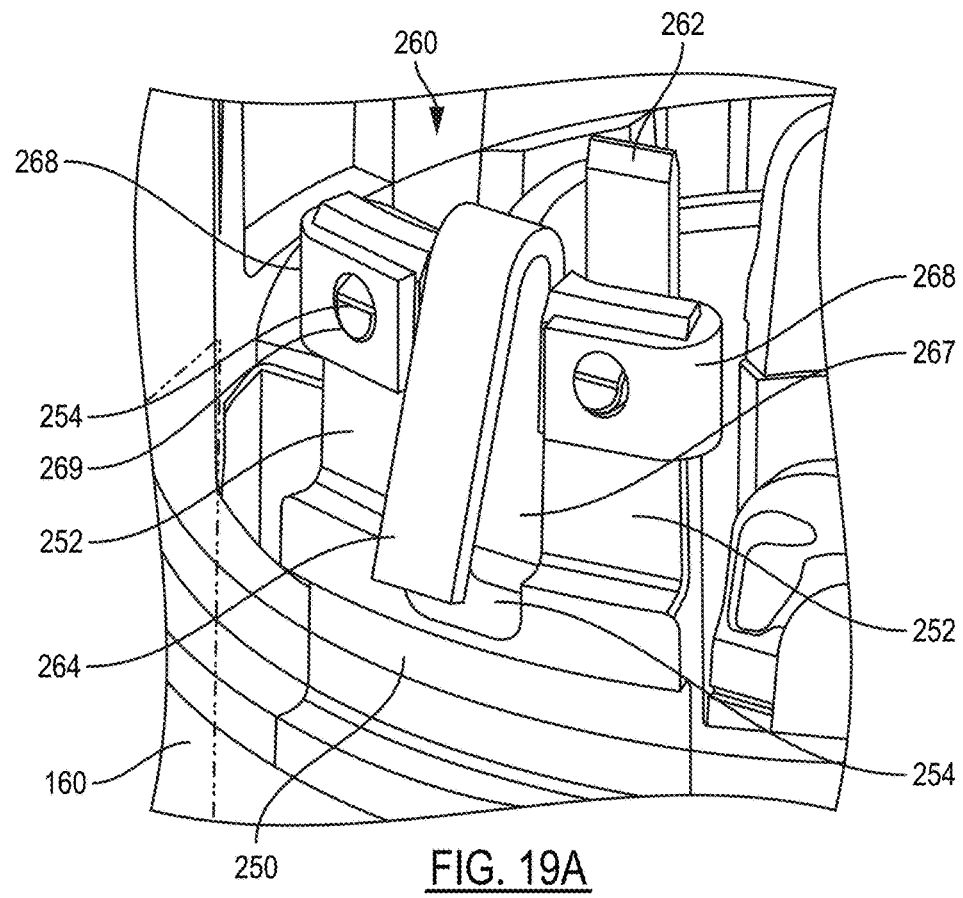
FIGS. 19A and 19B depict front and rear views of a stator terminal mounted on a routing insulator, according to a fifth embodiment.
Figure 19B:
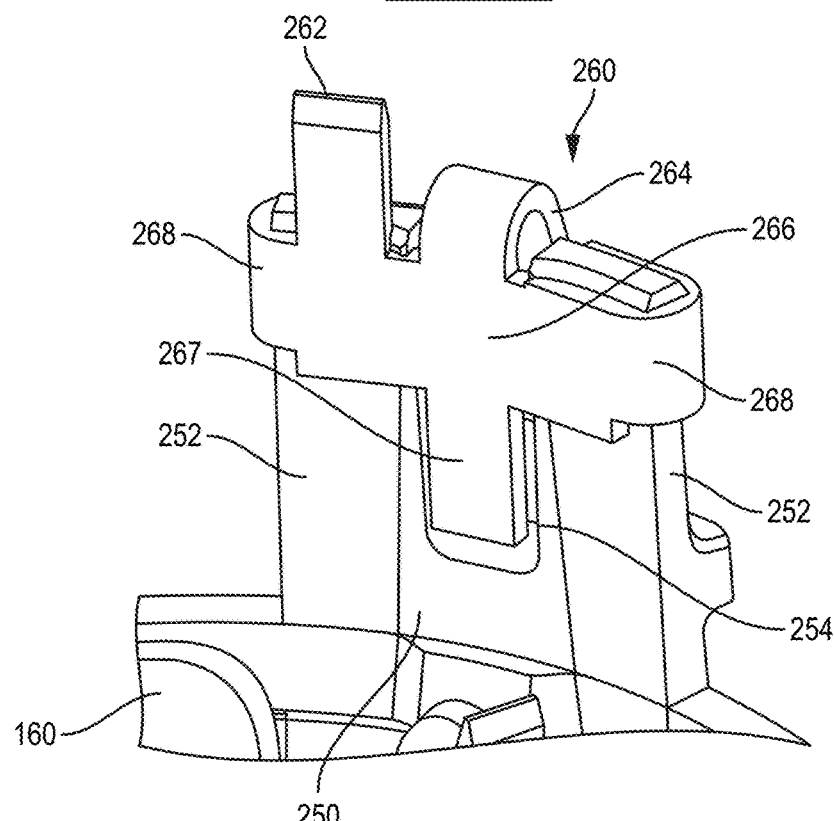

FIGS. 19A and 19B depict front and rear perspective views of a stator terminal 260, according to an embodiment. In this embodiment, the routing insulator 160 includes the same mounting projections 250 as described above, each mounting projection 250 including two arms 252 defining an opening 254 therebetween. Each stator terminal 260 includes a main body 266, a terminal pin 262 extending from a distal end of the main body 246 away from the routing insulator 160 off-center from the center axis of the main body 266, and a tang portion 264 extending from the same distal end the main body 246 along the center axis and adjacent the terminal pin 262. In an embodiment, a second leg 267 extends from an opposite end of the main body 266 along the center axis and is received in alignment with the opening 254. The tang portion 264 is folded angularly over the main body 266 in alignment with the opening 254. Two side legs 268 extend from the sides of the main body 266 and form opposite hooks around the two arms 252 of the mounting projection 250. The arms 252 include snapping portions 254 arranged to be received within corresponding holes 269 of the side legs 268 to secure the stator terminal 260 to the mounting projection 250. During the assembly process, the tang portion 264 captures the cross-over portion of the magnet wire (not shown) and is pressed into the opening 254 against the second leg 267. Since the folded angle of the tang portion 264 faces the routing insulator 160, this embodiment provides the advantage of allowing the cross-over portion of the magnet wire to be directly received within the tang portion 264 as the stator terminal 260 is mounted on the routing insulator 160.

Figure 20:
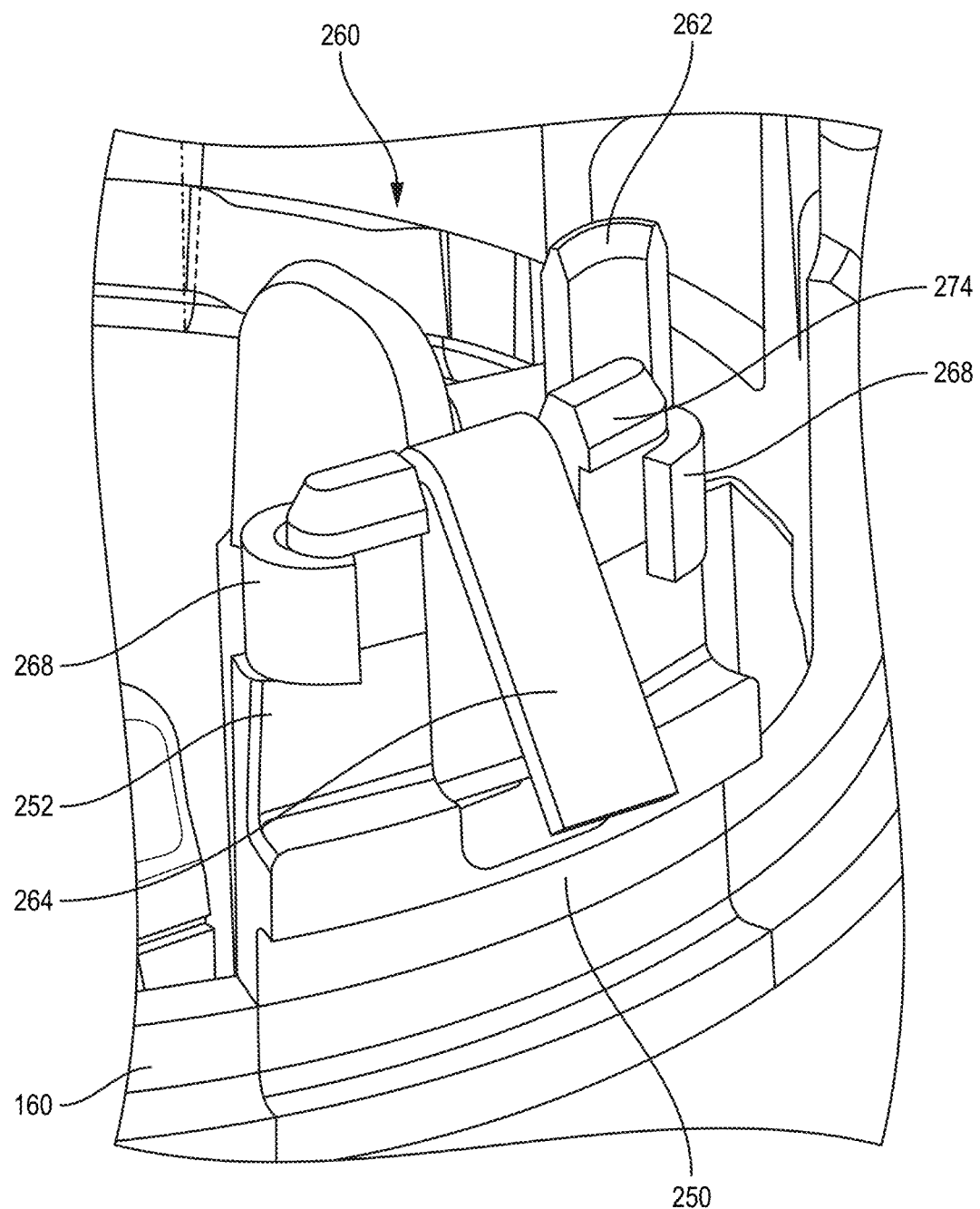
FIG. 20 depicts a front view of a stator terminal mounted on a routing insulator, according to a sixth embodiment.

FIG. 20 depicts a front perspective view of the stator terminal 260, according an alternative embodiment. In this embodiment, arms 262 of the mounting projection 260 include upper cantilever snap beams 274. The side legs 268 of the stator terminal 260 make a snap-fit connection with the cantilever snap beams 274 to secure the mounting projection 250 and the stator terminal 260.

Rotor assembly 120 is described herein with reference to FIGS. 21-25, according to an embodiment.

Figure 21A:
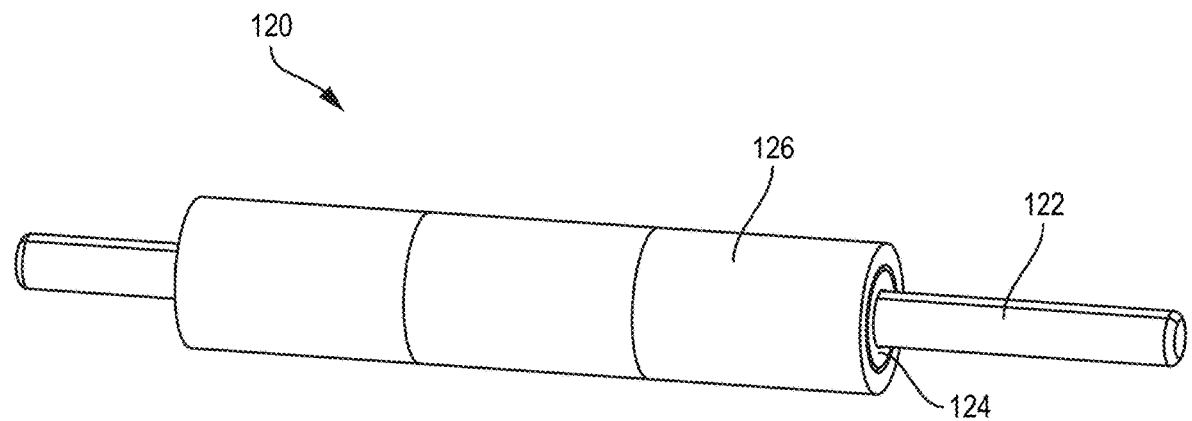
FIG. 21A depicts a partial perspective view of a rotor assembly of the BLDC motor, according to an embodiment.
Figure 21B:
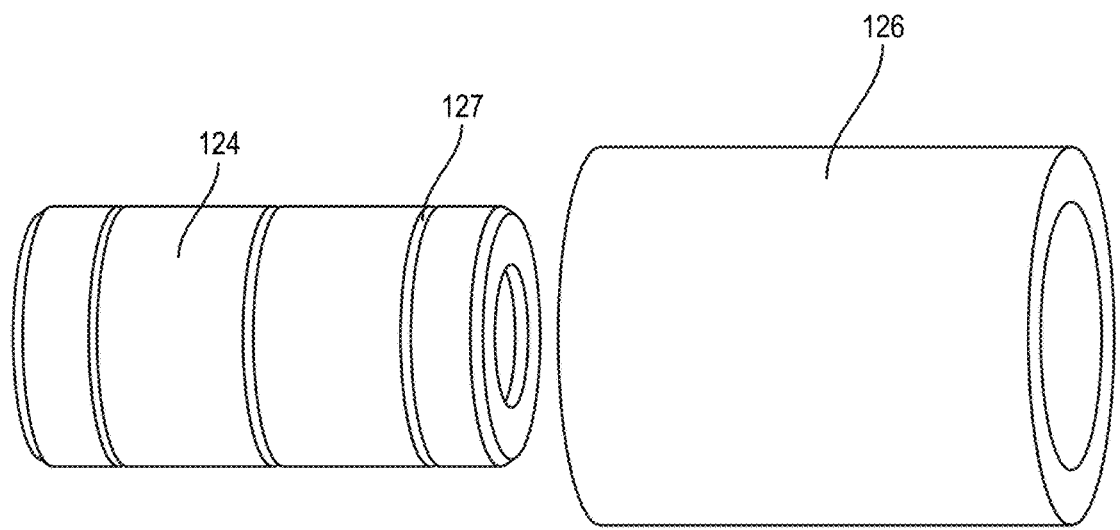
FIG. 21B depicts an exploded view of a magnet ring and a rotor core of the rotor assembly, according to an embodiment.

FIG. 21A depicts a partial perspective view of the rotor assembly 120, according to an embodiment. FIG. 21B depicts an exploded view of a set of permanent magnet ring 126 and rotor core segment 124, according to an embodiment.

In an embodiment, the rotor assembly has an outer diameter in the range of approximately 13 mm to 16 mm, and a length that greater than or equal to the length of the stator core 112, preferably at least approximately 2 mm to 5 mm greater than the length of the stator core 112, i.e., approximately at least 33 mm long. Accordingly, the ratio of the rotor length to its diameter is at least approximately 3:1, preferably approximately greater than 4:1. To accommodate such a high length to diameter ratio, in an embodiment, rotor assembly 120 includes a series of rotor core segments 124, three rotor core segments 124 in this example, mounted on the rotor shaft 122. Each rotor core segment 124 has a surface-mounted permanent magnet ring 126 disposed on its outer surface. Each permanent magnet ring 126 is cylindrical in shape, with an inner diameter that is slightly in diameter than the outer diameter of the rotor core segment 124 so it can be slidingly mounted to the outer surface of the rotor core segment 124. Each permanent magnet ring 126 is magnetized with a N-S-N-S orientation. In an embodiment, a layer is adhesive is applied between the outer surface of the rotor core segment 124 and the inner surface of the permanent magnet ring 126. In an embodiment, a series of annular grooves 127 is disposed in the outer surface of the rotor core segment 124 to aid in retention of the adhesive.

Figure 22A:
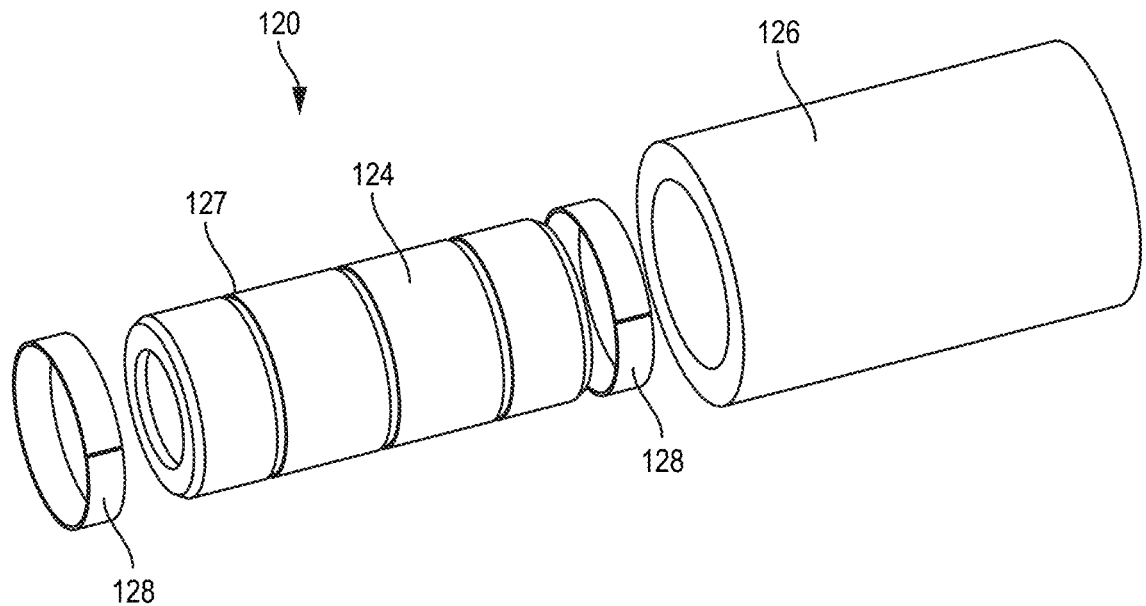
FIG. 22A depicts a partial exploded view of a magnet ring and a rotor core segment, further provided with two alignment members, according to an embodiment.
Figure 22B:
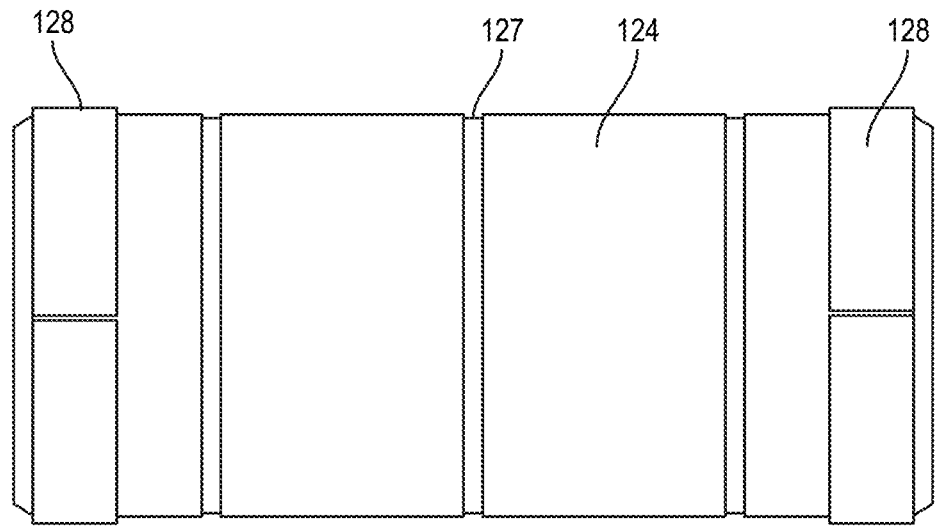
FIG. 22B depicts a side partial view of the rotor core segment provided with the alignment members, according to an embodiment.

FIG. 22A depicts a partial exploded view of a permanent magnet ring 126 and a rotor core segment 124, further provided with two alignment members 128, according to an embodiment. FIG. 22B depicts a side partial view of the rotor core segment 124 provided with the alignment members 128, according to an embodiment.

In this embodiment, to ensure that each permanent magnet ring 126 is aligned co-axially with the corresponding rotor core segment 124, two alignment members 128 are disposed on two ends of each rotor core segment 124. Alignment members 128 may be made of rubber or plastic material. In an embodiment, alignment members 128 are plastic tapes wrapped around the two ends of the rotor core segment 124. The outer diameter of the alignment members 128 corresponds to the inner diameter of the permanent magnet rings 126 to ensure a tight fit between the permanent magnet rings 126 and the rotor core segments 124. In an embodiment, adhesive is applied to the outer surface of the rotor core segments 124 between the alignment members 128.

The above-described embodiments are directed to rotor assembly 120 including permanent magnet ring 126, or series of permanent magnet rings 126, mounted on rotor shaft 122. Permanent magnet ring 126 may be made of any magnetic material, including rare-earth magnetic material. Magnet rings 126 may be constructed using a hot extrusion process, where bonding agent is mixed with magnetic material, and a die-processing is used at elevated temperature to align the grains of the magnetic material in the direction of the magnetization while forming the magnet in the desired shape and size. This construction has many advantages and is particularly suitable for a small diameter rotor as described above. In particular, this magnet construction is more suitable an embedded magnet design for a small diameter rotor construction. In an embodiment, where the ID of the stator is approximately in the range of 14 to 17 mm, the outer diameter of the rotor assembly 120 may be in approximately in the range of 13 mm to 16 mm, the magnet ring construction is far more suitable than an embedded magnet construction. Further, since the magnet rings 126 and rotor core segments 126 are mounted in sequence, any desired rotor length is achievable. However, due to the presence of a high concentration of bonding agent, the hot extrusion process typically provides magnet rings having a magnetic rating of, for example, 48 or less.

In an alternative embodiment, as described below, rotor assembly use in motor 100 may include surface-mounted discrete permanent magnets mounted on the outer surface of a rotor core. Discrete permanent magnets may be sintered magnets capable of higher magnetic ratings of, e.g., rating of 56 or higher.

Figure 23A:
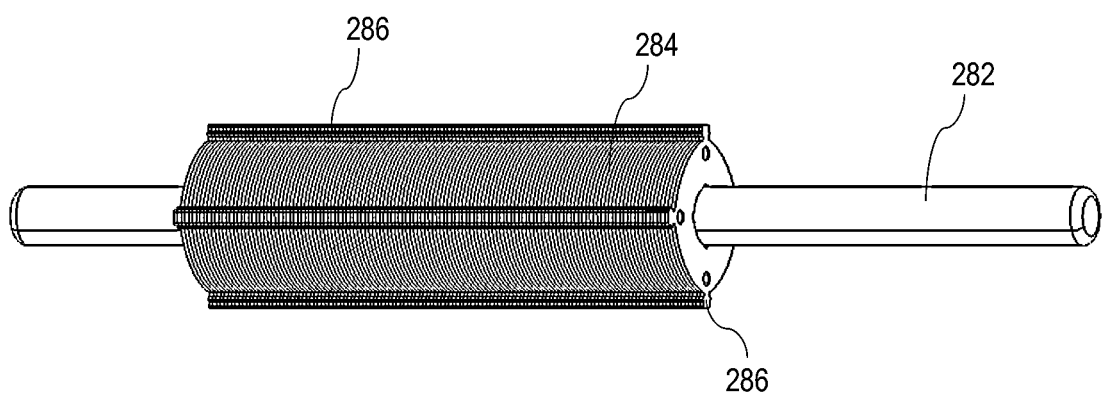
FIG. 23A depicts partial view of a rotor assembly including surface-mount magnet retention features mounted on the rotor shaft, according to an embodiment.

FIG. 23A depicts partial view of a rotor assembly 280 including a rotor core 284 including surface-mount magnet retention features mounted on the rotor shaft 282, according to an embodiment. In an embodiment, rotor core 284 is a lamination stack having a substantially cylindrical outer surface and a series of guide rails 286 projecting radially outwardly and extending longitudinally along the outer surface. In a three-phase brushless motor including four permanent magnets, four guide rails 286 are provided at 90 degree intervals. In an embodiment, the cylindrical outer surface of the rotor core 284 has an outer diameter of approximately 11 to 14 mm.

Figure 23B:
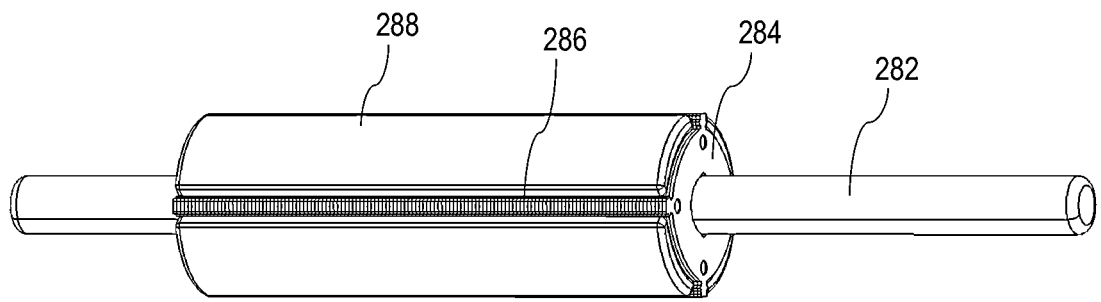
FIG. 23B depicts a partial view of the rotor assembly further provided with surface-mounted permanent magnets, according to an embodiment.

FIG. 23B depicts a partial view of the rotor assembly 280, further provided with surface-mounted permanent magnets 288 mounted on the outer surface of the rotor core 284, according to an embodiment. In an embodiment, each magnet 288 is arcuate shaped extending axially along the full length of the rotor core 284 and circumferentially along less than 90 degrees of the circumference of the rotor core 284. The permanent magnets 288 are received between the guide rails 286. In an embodiment, guide rails 286 may be include side ridges that engage the permanent magnets 288, thus allowing axial insertion of the permanent magnets 288 between the guide rails 286 while providing radial retention for the permanent magnets 288 on the rotor core 284 while.

Figure 23C:
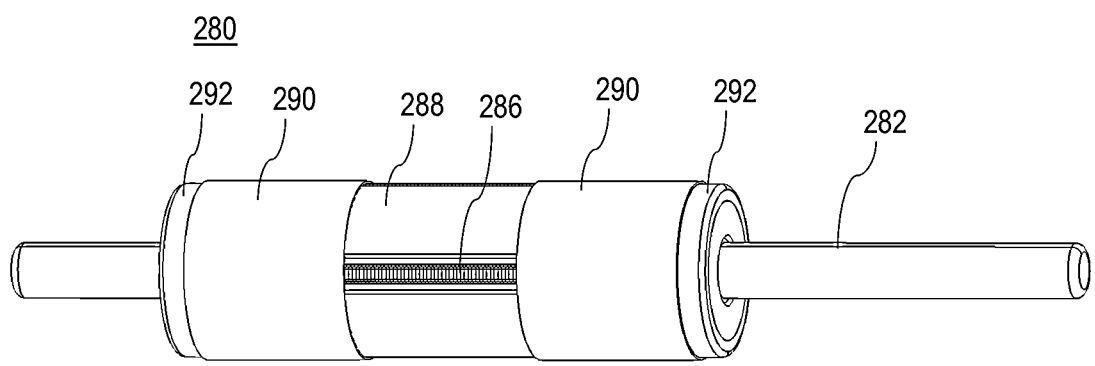
FIG. 23C depicts a perspective view of the rotor assembly further provided with sleeves and rotor end caps for magnet retention, according to an embodiment.

FIG. 23C depicts a perspective view of the rotor assembly 280, further provided with sleeves 290 and rotor end caps 292, according to an embodiment. In an embodiment, sleeves 290 are metallic cylindrical bodies mounted on permanent magnets 288 to hold and radially support the permanent magnets 288 against the outer surface of the rotor core 284. In an embodiment, rotor end caps 292 are mounted on the rotor shaft 282 to axially restrain the permanent magnets 288.

In an embodiment the guide rails 286 project radially outwardly so as to circumferentially align with approximately the outer surfaces of the permanent magnets 288 and make contact with the inner surfaces of the sleeves 290. The added structural support provided by the sleeves 290 assists the guide rails 286 in maintaining concentricity and the retention force required to retain the permanent magnets 288. In addition, this arrangement adds additional metal between the permanent magnets 288 along the circumferential direction and has shown to improve efficiency and power output by approximately 1% to 2%.

Figure 24A:
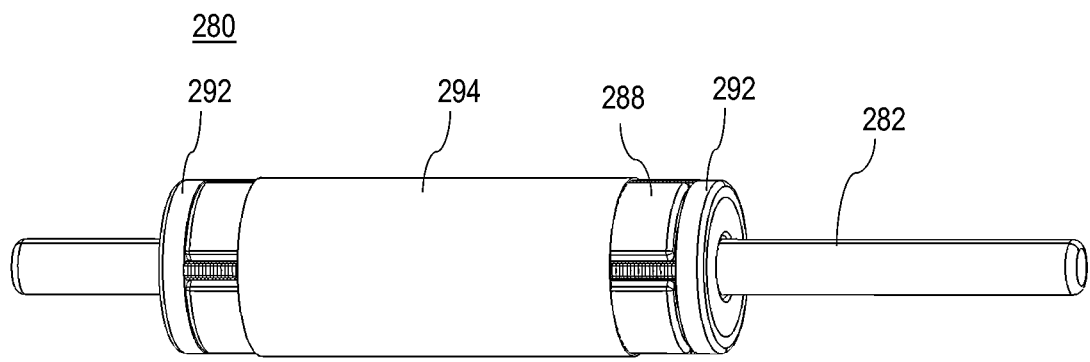
FIG. 24A depicts a depicts a perspective view of the rotor assembly provided with a single sleeve, according to an alternative embodiment.

FIG. 24A depicts a depicts a perspective view of the rotor assembly 280, provided with a single sleeve 294, according to an alternative embodiment. In this embodiment, the sleeve 294 is singularly provided in place of two separate sleeves 290. In an embodiment, sleeve 294 may be shorter in length than the stator core 284 and may be aligned with a center portion of the rotor core 284 along the axial direction.

Figure 24B:
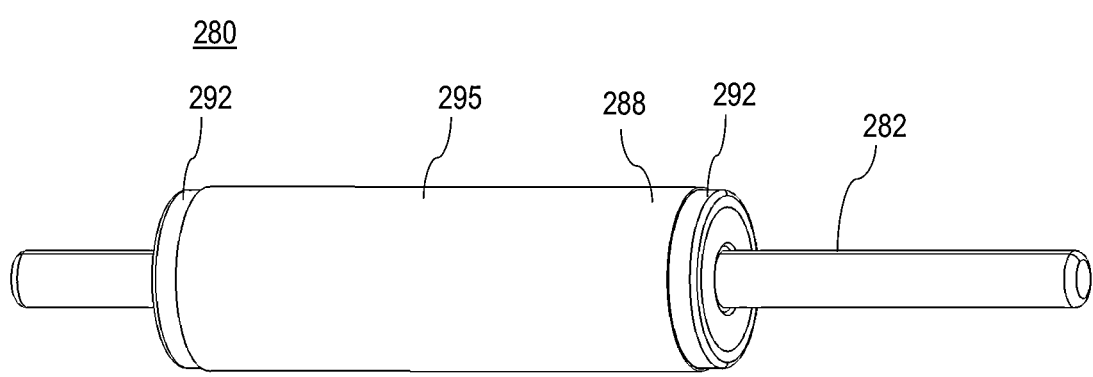
FIG. 24B depicts a depicts a perspective view of the rotor assembly provided with an alternative single sleeve, according to an alternative embodiment.

FIG. 24B depicts a depicts a perspective view of the rotor assembly 280, provided with an alternative single sleeve 295, according to an alternative embodiment. In this embodiment, the sleeve 295 alone provided for radial retention of the permanent magnets 288. In an embodiment, sleeve 295 is approximately the same length as the rotor core 284, therefore extending between the two rotor end caps 292.

Figure 24C:
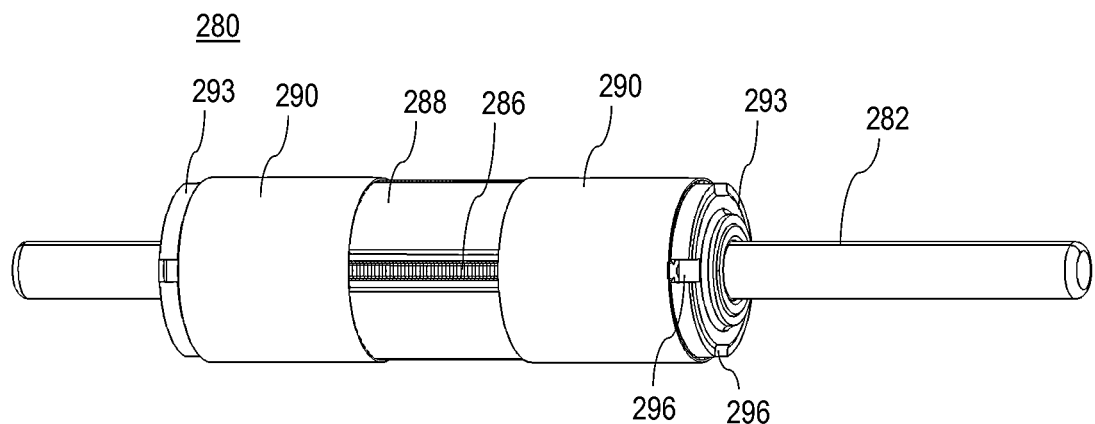
FIG. 24C depicts a depicts a perspective view of the rotor assembly provided with two bushings instead of the rotor end caps above, according to an alternative embodiment.

FIG. 24C depicts a perspective view of the rotor assembly 280, provided with sleeves 290 and two bushings 293 instead of the rotor end caps 292 above, according to an alternative embodiment. In this embodiment, the bushings 293 include clocking features 296 formed as recesses through its outer body. During the assembly process, the clocking features 296 are axially aligned with the permanent magnets 288, making it easier to later align the sense magnet with the rotor assembly 280.

Figure 24D:
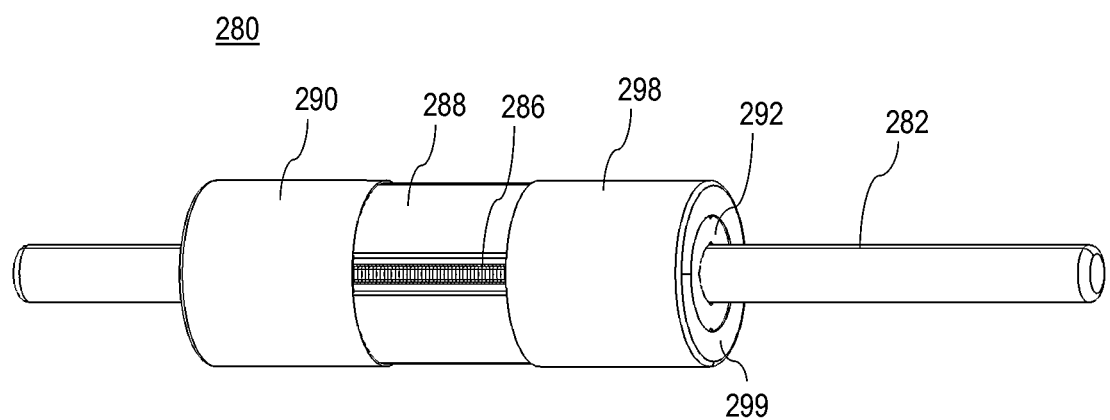
FIG. 24D depicts a depicts a perspective view of the rotor assembly provided with alternative sleeves designed to be joined with the rotor end caps 292, according to an alternative embodiment.

FIG. 24D depicts a perspective view of the rotor assembly 280, provided with alternative sleeves 298 designed to be joined with the rotor end caps 292, according to an alternative embodiment. In this embodiment, sleeves 298 include radial walls 299 that engage the outer ends of the rotor end caps 292. The radial walls 299 may be securely joined with the rotor end caps 292 or the rotor core 284 via, for example, soldering or welding.

An alternative motor construction is described herein, according to an embodiment.

Figure 25:
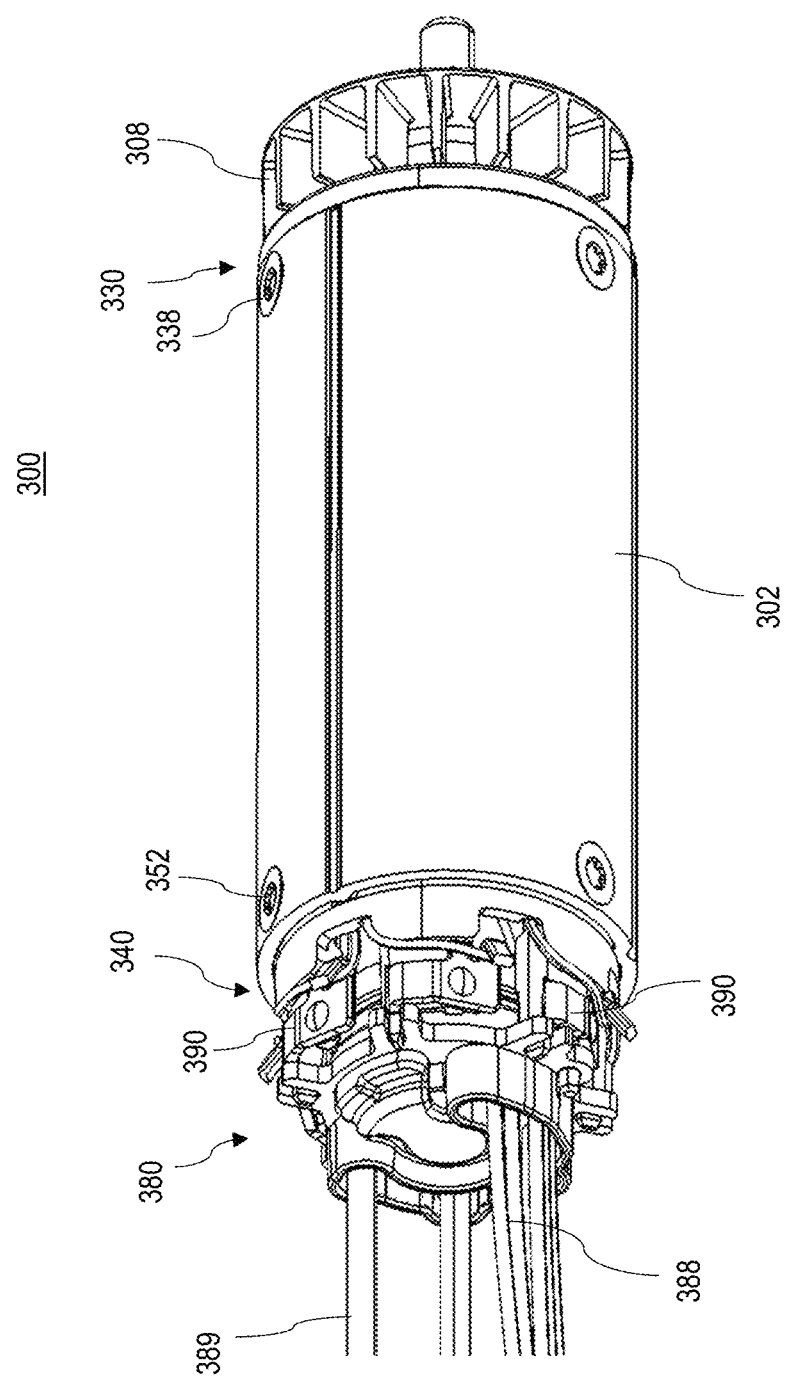
FIG. 25 depicts a perspective view of a BLDC motor, according to an alternative embodiment of the invention.
Figure 26:
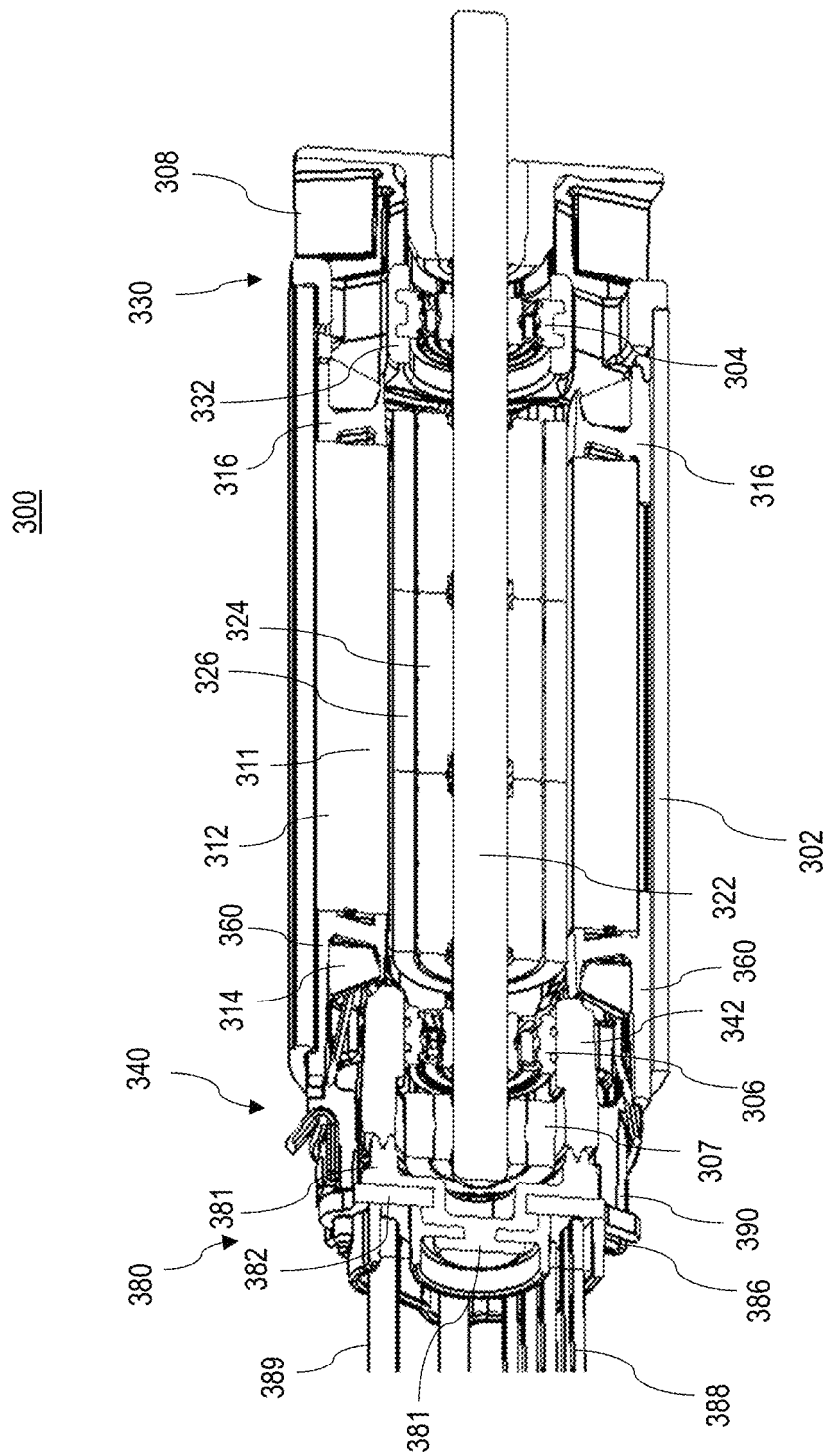
FIG. 26 depicts a perspective cross-sectional view of the BLDC motor, according to an embodiment.
Figure 27:
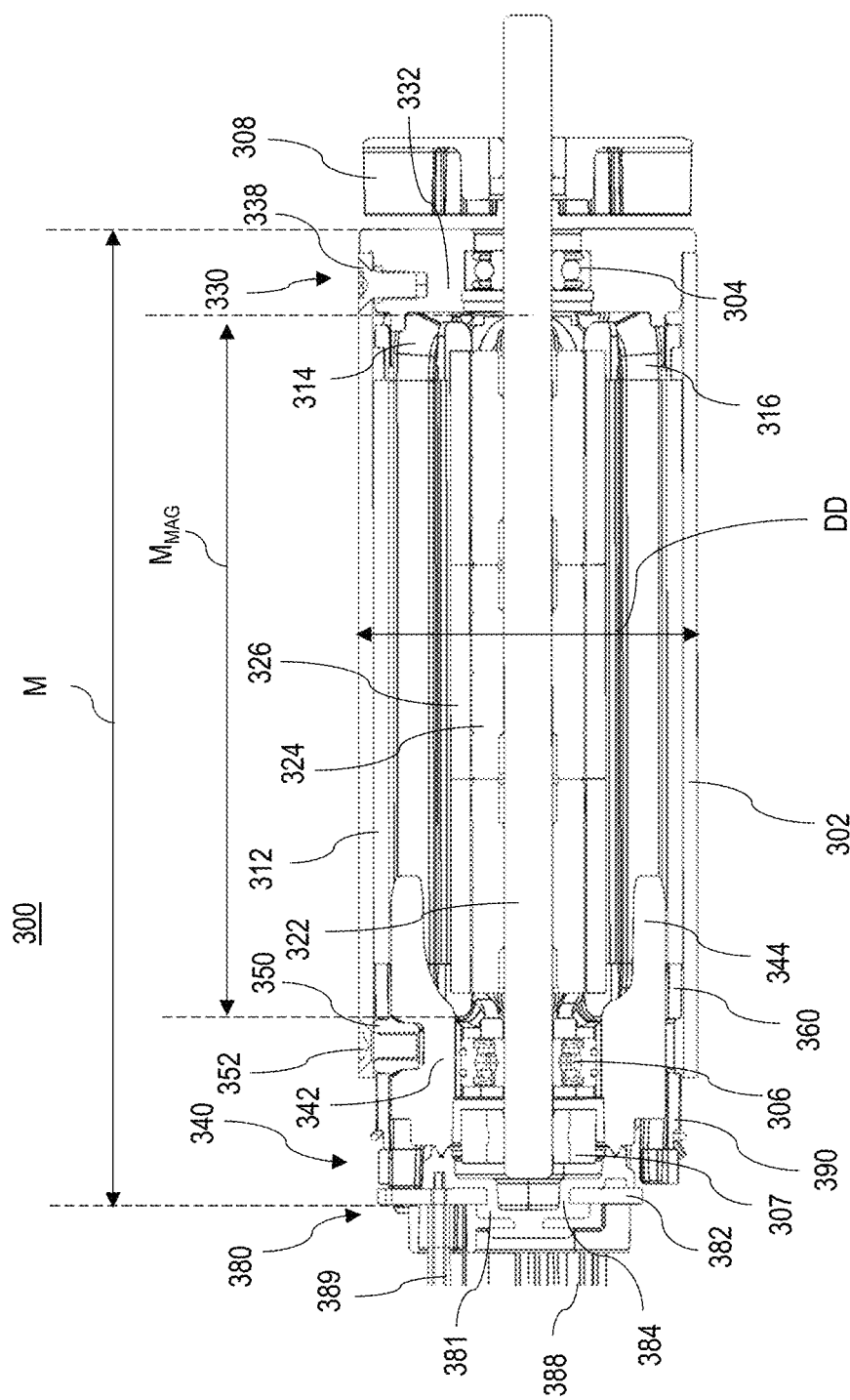
FIG. 27 depicts a side cross-sectional view of the BLDC motor, according to an embodiment.

FIG. 25 depicts a perspective view of a BLDC motor 300, according to an embodiment. FIG. 26 depicts a perspective cross-sectional view of the BLDC motor 300, according to an embodiment. FIG. 27 depicts a side cross-sectional view of the BLDC motor 300, according to an embodiment. FIGS. 26 and 27 are made along two different cross-section planes to provide a more comprehensive illustration of the motor 300 components.

In an embodiment, the motor 300 includes a motor housing (or motor can) 302 having a substantially cylindrical body and two open ends that supports the components of the motor 300 described below. In an embodiment, the motor can 302 may be made of steel or other metal to provide a reliable mounting structure for the motor components. The motor 300 further includes a stator assembly 310 and a rotor assembly 320 mounted on the rotor shaft 322.

In an embodiment, stator assembly 310 and rotor assembly 320 fundamentally include many of the same features as stator assembly 110 and rotor assembly 120 described above. Stator assembly 310 is securely received within the inner diameter of the motor can 302 and includes a stator core 312, which may be formed of a series of laminated steel members and includes a series of stator teeth 311 projecting radially inwardly from the annular body of the stator core 312, and a series of stator windings 314 supported by the stator core 312.

In an embodiment, the rotor assembly 320 includes a series of permanent magnets or permanent magnet rings 326. In an embodiment, the rotor assembly 320 is disposed within the stator assembly 310. As stator windings 314 are energized in a controlled sequence, the magnetic interaction between the stator windings 314 and the permanent magnets 326 causes the rotation of the rotor assembly 320 relative to the stator assembly 310.

In an embodiment, motor 300 includes a straight rotor shaft construction, with rotor shaft 322 having a uniform diameter from beginning to end. In an embodiment, a series of rotor core segments 324, as previously described with reference to FIGS. 21-24, are securely mounted on the rotor shaft 322. Further, a series of permanent magnet rings 326 are surface-mounted on the rotor core segments 324 in magnetic interaction with the stator windings 314.

In an embodiment, a sense magnet 307 is mounted on the rotor shaft 322 between the rear end of the shaft 322 and the rear bearing 306. In an embodiment, the sense magnet 307 has a magnetization orientation that corresponds to the orientation of the permanent magnet rings 326.

In an embodiment, stator assembly 310 further includes a front end insulator 316 and a rear end insulator 360 (also referred to as routing insulator 360) mounted on opposing axial ends of the stator core 312 to insulate the stator windings 314 from the stator core 322. Front end insulator 316 includes many of the same features as front end insulator 116 previously described and is provided primarily to electrically insulator the stator core 316 from the stator windings 314 at the front end of the motor. Similarly, routing insulator 360 includes many of the routing insulator 160 previously described and is provided primarily to electrically insulate the stator core 312 from the stator windings 314 at the rear end of the motor. Routing insulator 360 is smaller in length than previously-described routing insulator 160. Details of front end insulator 316 and routing insulators 360 are described later in detail.

In an embodiment, routing insulator 360 supports a series of stator terminals 390 projecting along the axial direction away from the stator assembly 310.

In an embodiment, a circuit board assembly 380 including a circuit board 382 is mounted on the rear end of the routing insulator 360 in electrical contact with the stator terminals 390. The circuit board 382 includes many of the same features as circuit board 180 described above. The circuit board 382 includes a center opening 384 through which (or close to which) the rear end of the rotor shaft 322 is positioned. A series of magnetic sensors (not shown) are mounted on the circuit board 382 in magnetic interface with the sense magnet 307. The circuit board 382 further includes peripheral slots 386 that receive the stator terminals 390 from the routing insulator 360 and includes conductive routings to connect the stator windings 314 of different phases in a wye or a delta connection. In an embodiment, a series of power wires 389 for supplying electric power to the motor 300, and a series of signal wires 388 for communication between a microcontroller and the magnetic sensors, are secured to the circuit board assembly 380. In an embodiment, circuit board assembly 380 includes an overmold structure 381 formed around at least the rear surface of the circuit board 382.

In an embodiment, motor 300 additionally includes a front bearing support structure (also referred to as front bearing bridge) 330, and a rear bearing support structure (also referred to as rear bearing bridge) 340 disposed on two ends of the motor can 302 to support front and rear bearings 304 and 306 of the rotor shaft 322 relative to the motor can 302. Front and rear bearing bridges 330 and 340 include some of the features and functions previously described with reference to front and rear bearing bridges 130 and 140. In an embodiment, front bearing bridge 330 includes a main cylindrical body 332 forming a bearing pocket for securely receiving an outer race of a front bearing 304 mounted on the rotor shaft 322. In an embodiment, rear bearing bridge 340 similarly includes a cylindrical body 342 forming a bearing pocket for securely receiving an outer race of a rear bearing 306 mounted near a rear end of the rotor shaft 322. In an embodiment, the sense magnet 307 is positioned within the cylindrical body 342 of the rear bearing bridge 340 with an airgap in between so it is not in physical contact with the rear bearing bridge 340. In an embodiment, a significant portion of the rear bearing bridge 340 is located inside the routing insulator 360 and includes features for its piloting and support relative to the inner surface of the stator core 312. Improvements to front and rear bearing bridges 330 and 340 and features thereof are discussed in detail later in this disclosure.

In an embodiment, front bearing bridge 330 is secured to the motor can 302 via one or more fasteners 338 received radially from outside the motor can 302. In an embodiment, rear bearing bridge 340 is similarly secured to the motor can 302 via one or more fasteners 352 received radially from outside the motor can 302. In an embodiment, one or more retaining insert members 350 are provided to receive the ends of the fasteners 352. In an embodiment, the retaining insert members 350 axially support the rear bearing bridge 340 relative to the stator assembly 310.

In an embodiment, the above-described arrangement provides for the rear bearing 306 being located between the circuit board 380 and the rotor assembly 310. In an embodiment, the rear bearing 306 is radially inward of the routing insulator 340, and a radial plane that goes through the rear bearing 306 intersects the routing insulator 340.

Referring particularly to FIG. 27, in an embodiment, motor 300 has an overall total length M, as defined from a front end of the front bearing bridge 330 to a rear surface of the circuit board 382, of approximately 65 mm to 110 mm, preferably approximately 67 mm to 105 mm, preferably smaller than or equal to approximately 97 mm. The length of the stator core 312 in this embodiment is approximately 30 mm to 47 mm, preferably approximately 34 mm to 42 mm, more preferably approximately 36 mm to 39 mm, less than the total length M of the motor 300. In an embodiment, motor 300 also has a diameter DD, as defined by the outer diameter of the motor can 302, of approximately 32 mm to 38 mm, preferably approximately 34 mm to 36 mm, preferably no more than 35 mm. In an embodiment, the stator core 312 has a diameter that is approximately 2 mm to 4 mm less than the diameter DD of the motor can 302. In an embodiment, there is approximately a 0.5 mm radial airgap between the stator core 312 and the inner surface of the motor can 302.

In an embodiment, a magnetic length MMAG of the motor 100 designates a length of the motor 300 in which magnetic components of the motor, including magnet wires and magnets, are located. In an embodiment, magnetic length MMAG is measured between frontmost and rearmost ends of the stator windings 514. This will be described later in detail.

These dimensions allow for motor 300 to fit into the small girth of the housing of a power tool while producing enough power for various operating including, but not limited to, grinding, cutting, impacting, drilling, etc. In an embodiment, motor 300 is configured to produce maximum long duration power output of at least approximately 450 watts, preferably at least approximately 500 watts. In an embodiment, tests conducted on motor 300 have proved them capable of producing a maximum long-duration power output (i.e., continuous power output at full motor speed over one discharge cycle of the battery pack from full charge of the battery pack until the battery voltage reaches a cut-off threshold) of greater than or equal to approximately 500 watts for a 30 mm stator stack length, 700 watts for a 48 mm stator stack length, and 8-watts for a 60 mm stator stack length.

Figure 28:
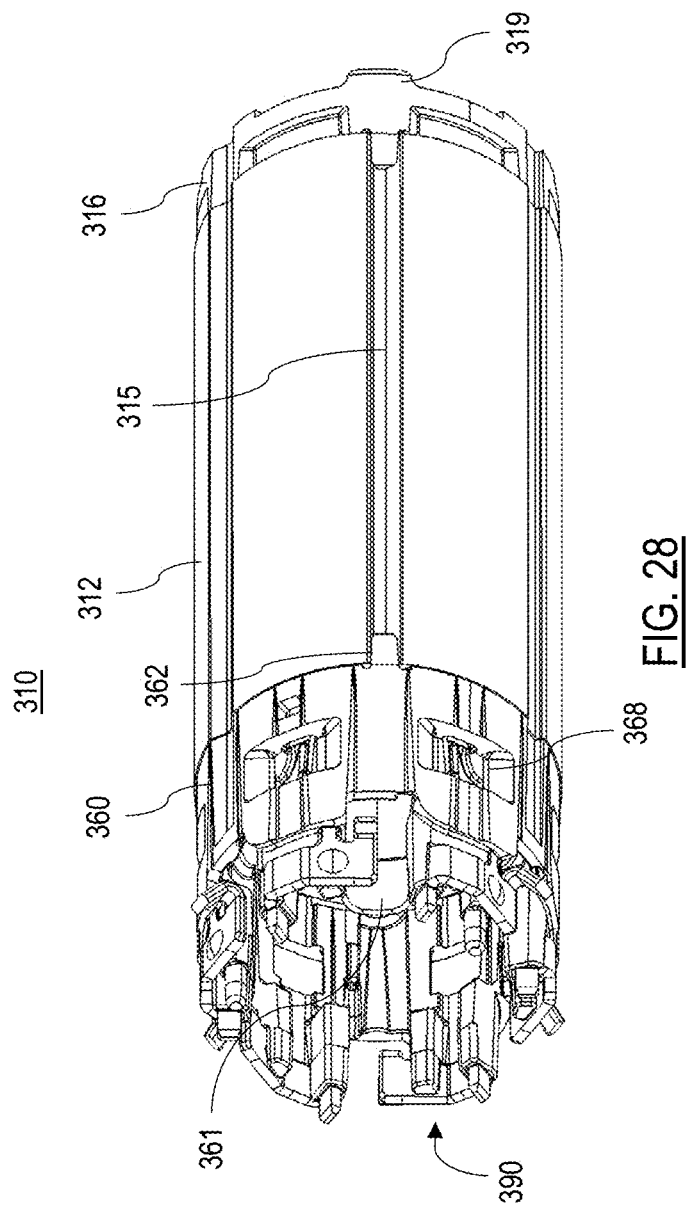
FIG. 28 depicts a side perspective view of a stator assembly of the BLDC motor, according to an embodiment.
Figure 29:
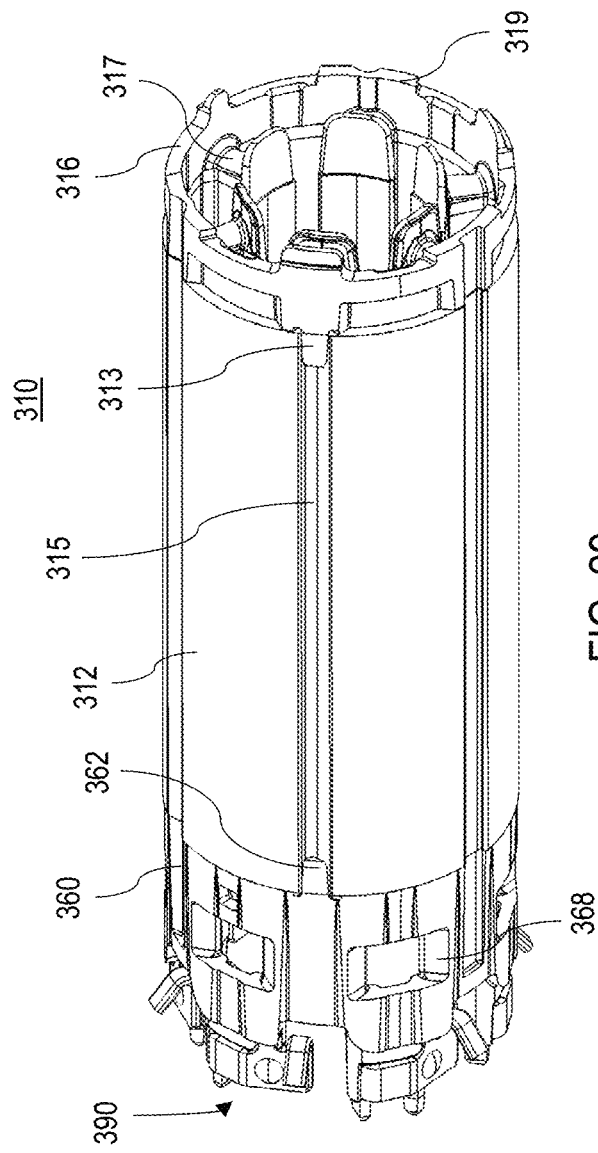
FIG. 29 depicts another side perspective view of the stator assembly, according to an embodiment.

FIGS. 28 and 29 depict side perspective views of the stator assembly 310, according to an embodiment. As discussed briefly above, front end insulator 316 and rear end insulator 360 (also referred to as routing insulator 360) are mounted on opposing axial ends of the stator core 312 to insulator the stator windings 314 (not shown) from the stator core 312.

In an embodiment, front end insulator 316 is shaped as an annular body and includes a series of inwardly-projecting teeth 317 that lay on front ends of the stator teeth 311 of the stator core 112. The front portions of the stator windings 314 are electrically insulated from the stator core 112 via the teeth 317 of the front end insulator 316. A series of tongues 313 project axially from the annular body into axial grooves 315 formed longitudinally along the outer surface of the stator core 112 to rotationally fix the front end insulator 316 to the stator core 112 prior to winding of the stator windings 314. In an embodiment, the tongues 313 may be press-fit into the axial grooves 315 to further provide axial retention for the front end insulator 316 relative to the stator core 112. In an embodiment, the front end of the front end insulator 316 includes a series of bumps 319 projecting axially opposite the stator core 312. In an embodiment, the front end insulator 316 extends approximately 2 mm to 6 mm along the axial direction.

Figure 30:
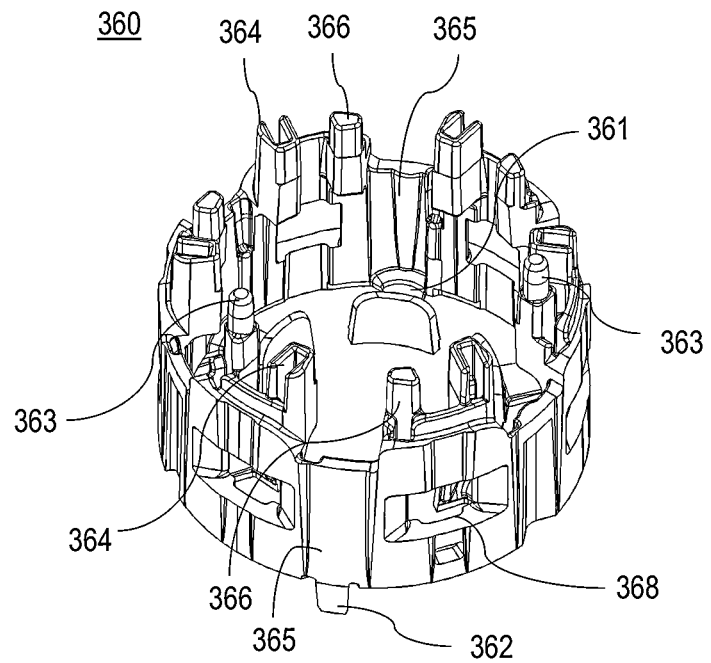
FIG. 30 depicts a side perspective view of a routing insulator of the stator assembly, according to an embodiment.
Figure 31:
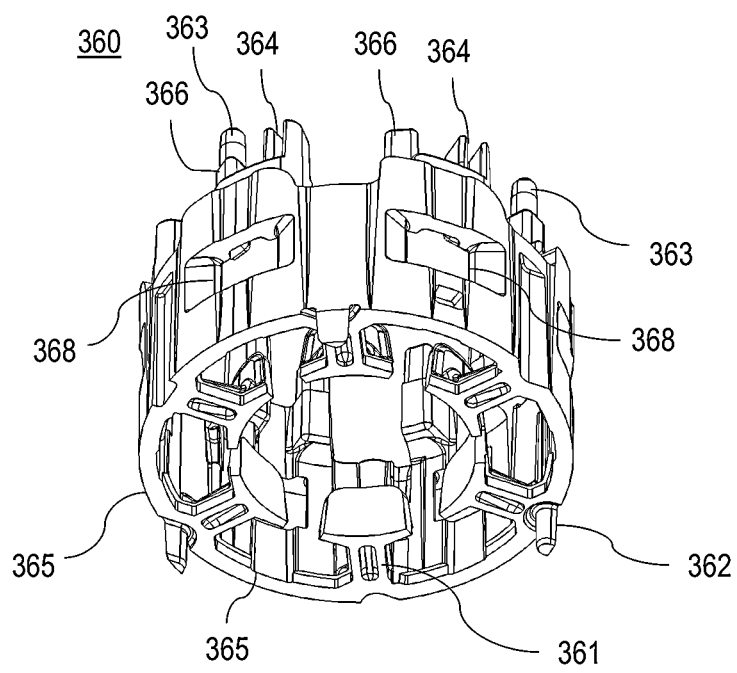
FIG. 31 depicts another side perspective view of the routing insulator, according to an embodiment.

FIGS. 30 and 31 depict side perspective views of the routing insulator 360, according to an embodiment. As shown here, and with continued reference to FIGS. 28 and 29, routing insulator 360 includes an annular body 365 and a series of inwardly-projecting teeth 361 that lay on rear ends of the stator teeth 311 of the stator core 112. The rear portions of the stator windings 314 are electrically insulated from the stator core 112 via the teeth 361 of the routing insulator 360. A series of pins 362 project axially from the annular body 365 into the axial grooves 315 of the stator core 112 to rotationally align and fix the routing insulator 360 to the stator core 112. In an embodiment, the pins 362 may be press-fit into the axial grooves 315 to provide axial retention for the routing insulator 360 relative to the stator core 112. In an embodiment, the annular body 365 of the routing insulator 360 extends approximately 13 mm to 20 mm, preferably approximately 15 mm to 18 mm, along the axial direction. In an embodiment, the annular body 365 has a thickness of 3 mm or less.

In addition to providing electric insulation for the stator windings 314, the routing insulator 360 includes several pairs of retaining members 364 and 366 projecting axially-rearwardly from its rear surface to support stator terminal 390 for connections of the respective stator windings 314 to the circuit board assembly 380. Further, the routing insulator 360 includes support posts 363 projecting from a subset of the retaining members 366 to support the mounting of the circuit board assembly 380. Moreover, the routing insulator 360 includes peripheral openings 368 and other features for piloting and supporting the rear bearing bridge 340. These features are disclosed here in detail.

It is initially noted that while the stator terminals 390 and its support mechanism on the routing insulator 360 is described herein according to an exemplary embodiment, any of the previously-described stator terminal and routing insulator mounting configurations previously described with reference to FIGS. 14-20 may be alternatively employed.

Figure 32:
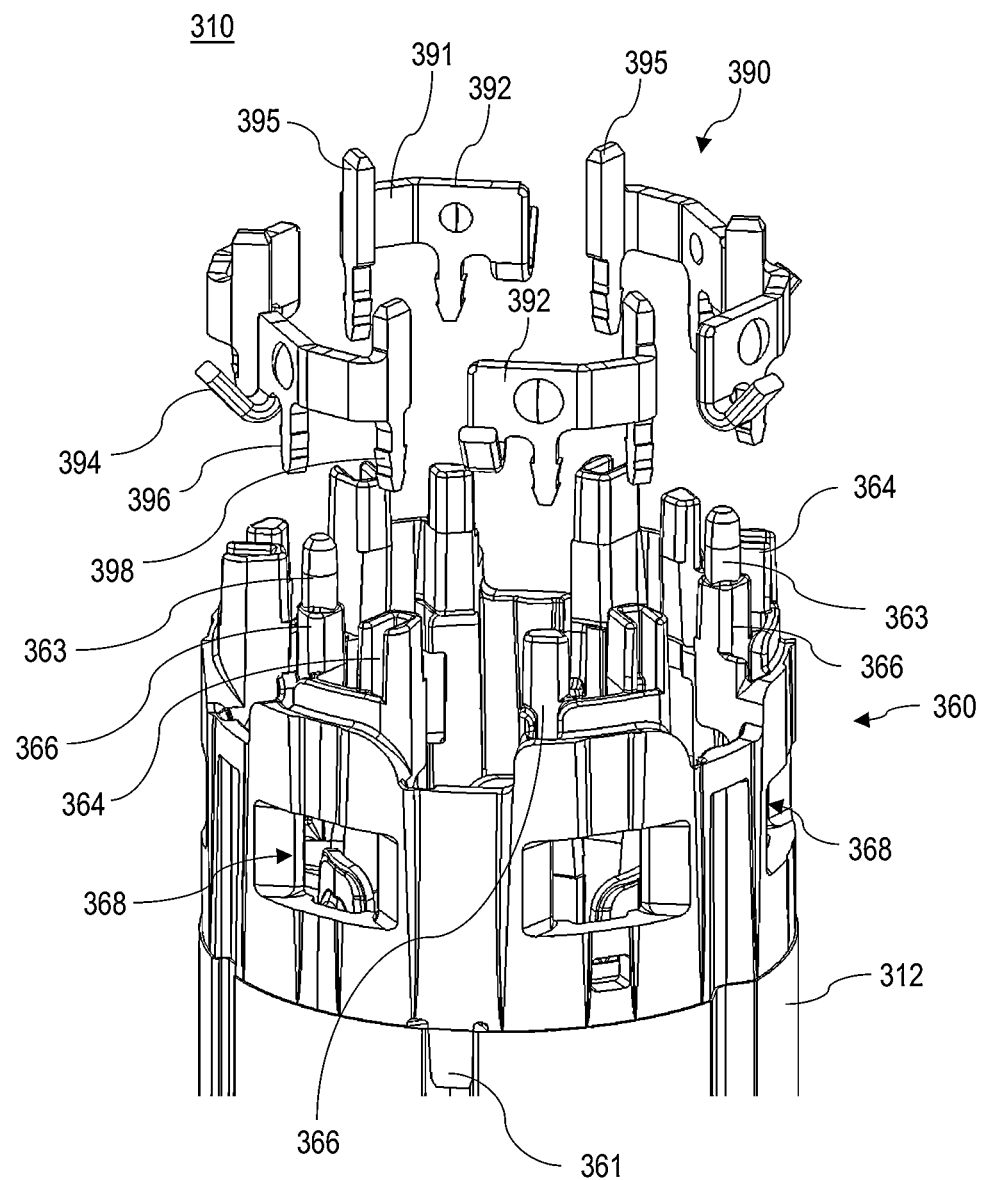
FIG. 32 depicts a partially exploded view of the rear end of the stator assembly including stator terminals, according to an embodiment.

FIG. 32 depicts a partially exploded view of the rear end of the stator assembly 310, showing the stator terminals 390 prior to mounted to the routing insulator 360, according to an embodiment.

In an embodiment, each stator terminal 390 includes a main body having a first portion 391 that is arcuate or planar shaped and a second portion 392 that extends angularly-inwardly from the first portion 391 at a 10 to 30 degree angle; a tang portion 394 that extends from a lower side of the second portion 392 (i.e., the side facing the stator core 312) and is folded over the second portion 392 at an angle of approximately 30 to 60 degrees; and two axial legs 396 and 398 that extend respectively from the lower sides of main body. The two axial legs 396 and 398 include a ribbed or teethed profile. Each retaining member 364 and 366 of the routing insulator 360 includes axial grooves therein sized to receive the axial legs 396 and 398. As the stator terminals 390 are mounted on the routing insulator 360, legs 396 and 398 of each stator terminal 390 are slidingly received into the grooves of corresponding retaining members 364 and 366 of the routing insulator 360, with the ribbed sides of the legs 396 and 398 making interference-fit connections to securely retain the stator terminals 390 to the retaining members 364 and 366.

In an embodiment, stator terminals 390 include terminal pins 395 projecting axially away from the routing insulator 360 opposite the legs 398. In an embodiment, terminal pin 395 and leg 398 of each stator terminal 390 are disposed proximate a side edge of the first portion 391, which is folded inwardly at an approximately 90 degree angle to ensure that that terminal pin 395 and leg 398 are located radially inwardly of the first portion 391.

Figure 33:
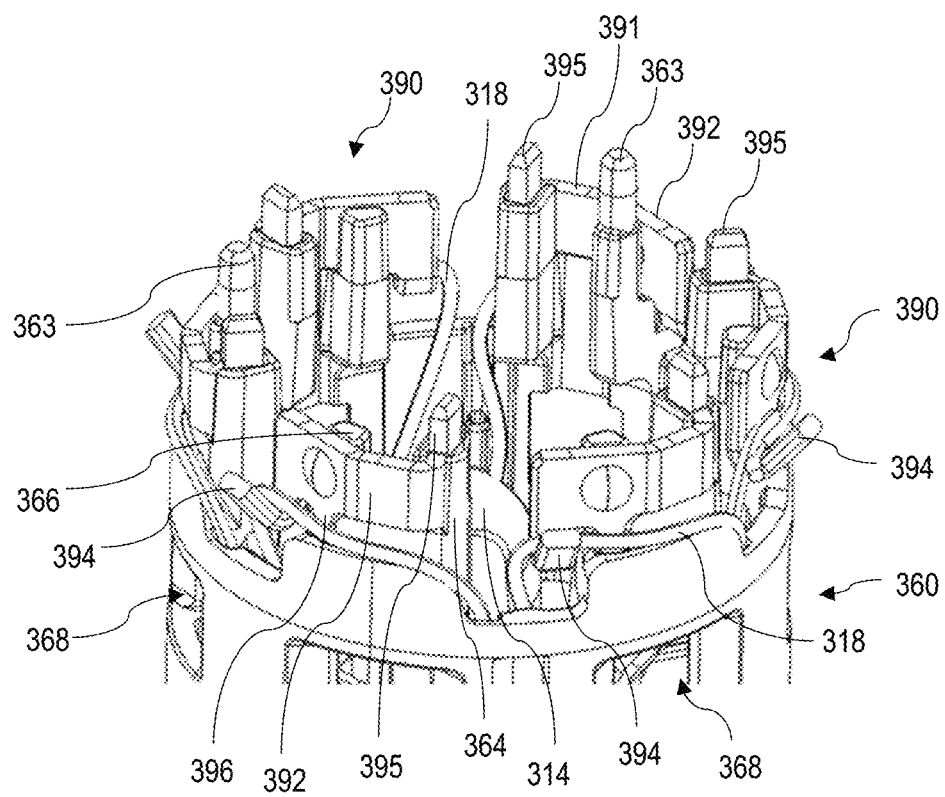
FIG. 33 depicts a partial view of the rear end of the stator assembly after the winding process, according to an embodiment.
Figure 34:
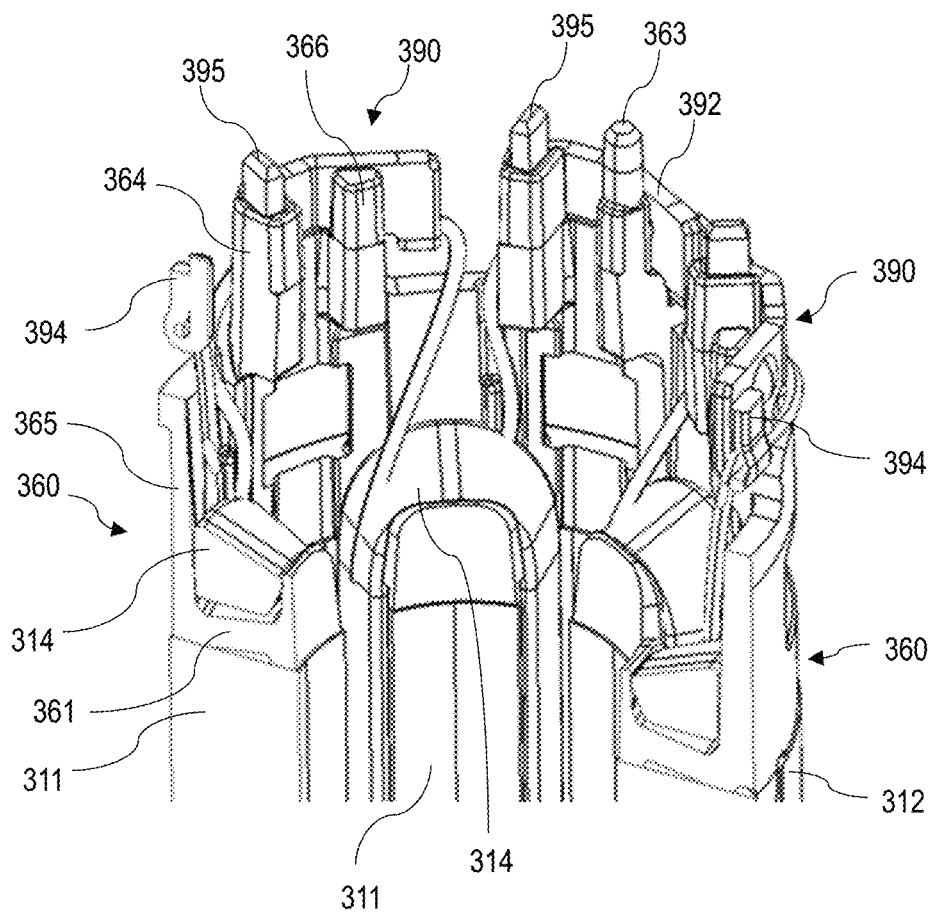
FIG. 34 depicts a cross-sectional angular view of the rear end of the stator 310 after the winding and fusing processes, according to an embodiment.

FIG. 33 depicts a partial view of the rear end of the stator assembly 310, showing the stator terminals 390 and the stator windings 314 after the winding process, according to an embodiment. FIG. 34 depicts a cross-sectional angular view of the rear end of the stator 310 after completion of the winding process and a fusing process, according to an embodiment.

In an embodiment, after routing insulator 360 and front end insulator 316 are mounted on two ends of the stator core 312 and the stator terminals 390 are mounted on the routing insulator 360, stator windings 314 are wound on the stator teeth 311 of the stator core 312. In this step, a magnet wire is wound on successive stator teeth 311 to form the stator winding 314, with cross-over portions 318 of the magnet wire passing between the stator windings 314 in contact with the stator terminals 390. In an embodiment, the cross-over portions 318 extend axially away from the stator windings 314 within the body of the routing insulator 360 radially outward of main cylindrical body 342 of the bearing bridge 340. The cross-over portions 318 are guided out of the routing insulator 360 in contact with the outer surfaces of the main body of the stator terminals 390, and are captured in the folded portions of the tang portions 394, before being routed back inside the routing insulator 360 for winding of the adjacent stator winding 314. After this process is complete, in an embodiment, the tang portions 394 are pressed against the cross-over portions 318 of the magnet wire and the cross-over portions 318 are fused to make electrical connections with the respective tang portions 394.

Figure 35:
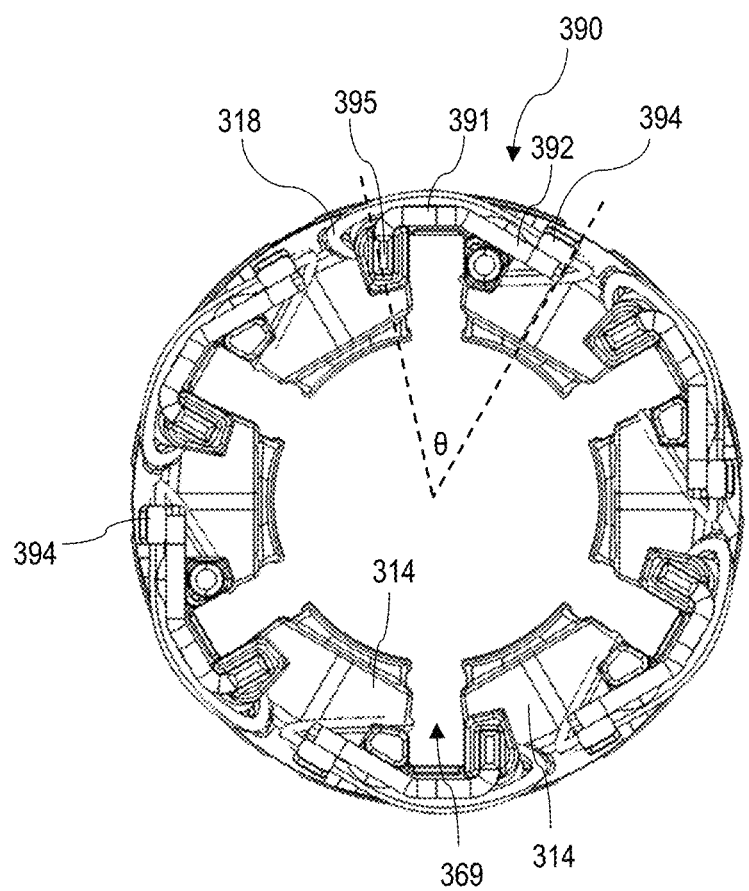
FIG. 35 depicts a rear axial view of the stator assembly 310 after the winding process and fusing processes, according to an embodiment.

FIG. 35 depicts a rear axial view of the stator assembly 310 after the winding process and fusing processes, according to an embodiment.

In an embodiment, the radially-inward angular orientation of the second portion 392 relative to the first portion 391 of the main body of each stator terminals 390 ensures that the tang portion 394, when pressed against the second portion 392, is not located radially outwardly of the first portion 391. As such, the stator terminals 390 can be located at or near the outer periphery of the routing insulator 360, without the tang portions 394 projecting radially outwardly outside the circumferential envelope of the routing insulator 360. The arcuate or angular shapes of the main bodies allows them to be fully located within the circumferential envelope of the stator assembly 310. After the tang portions 394 are pressed in against the second portion 392, the stator terminals 390 become substantially and/or entirely located within the circumferential envelope of the stator assembly 310 and the circumferential envelope of the annular body 365 of the routing insulator 360. In an embodiment, as described above, the annular body 365 of the routing insulator 360 has a thickness of 3 mm or less, and the first portion 391 is mounted fully on the routing insulator 360. In an embodiment, the second portion 392 slightly projects radially inwardly relative to the routing insulator 360.

In an embodiment, as shown in these figures, the main body (including first and second portions 391, 392) of each stator terminal 390 extends circumferentially at an angular distance θ of approximately 33 to 53 degrees, preferably approximately 37 to 48 degrees, preferably approximately 40 to 45 degrees. In an embodiment, no part of the stator terminals 390 pass through gaps 369 that are formed in the routing insulator 360 between the retaining members 364 and 366 and in axial alignment with centerlines of the stator slots between adjacent stator windings 314. In an embodiment, in each stator terminal 390, the terminal pins 395 is disposed on one side of the gap 369, the first portion 391 passes along or near the outer circumference of the main annular body 354 radially outwardly of the gap 369, and the second portion 392 and the tang portions 394 are disposed on the other side of the gap 369. This arrangement ensures that the stator terminals 390 do not interfere with the assembly of the rear bearing bridge 340 within the routing insulator 360, as described below.

After the winding and routing process of the magnet wire as described above is completed, according to an embodiment, the front and rear bearing bridges 330 and 340 are mounted to opposite ends of the stator assembly 310, with the rear bearing bridge 340 being positioned inside the body of the routing insulator 360. The mounting process of the rear bearing bridge 340 is initially described here.

Figure 36:
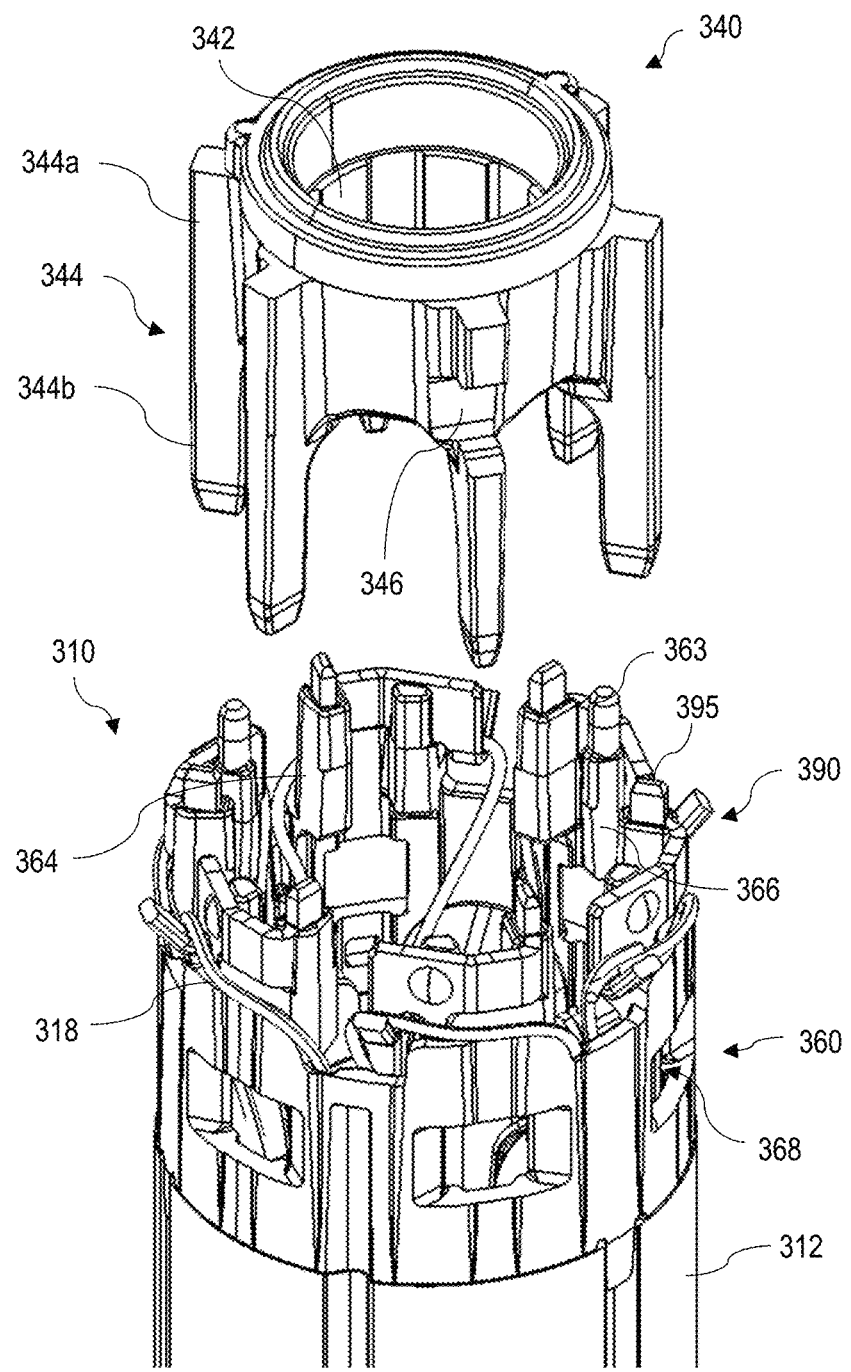
FIG. 36 depicts a partially exploded perspective view of a rear bearing bridge and the stator assembly, according to an embodiment.
Figure 37:
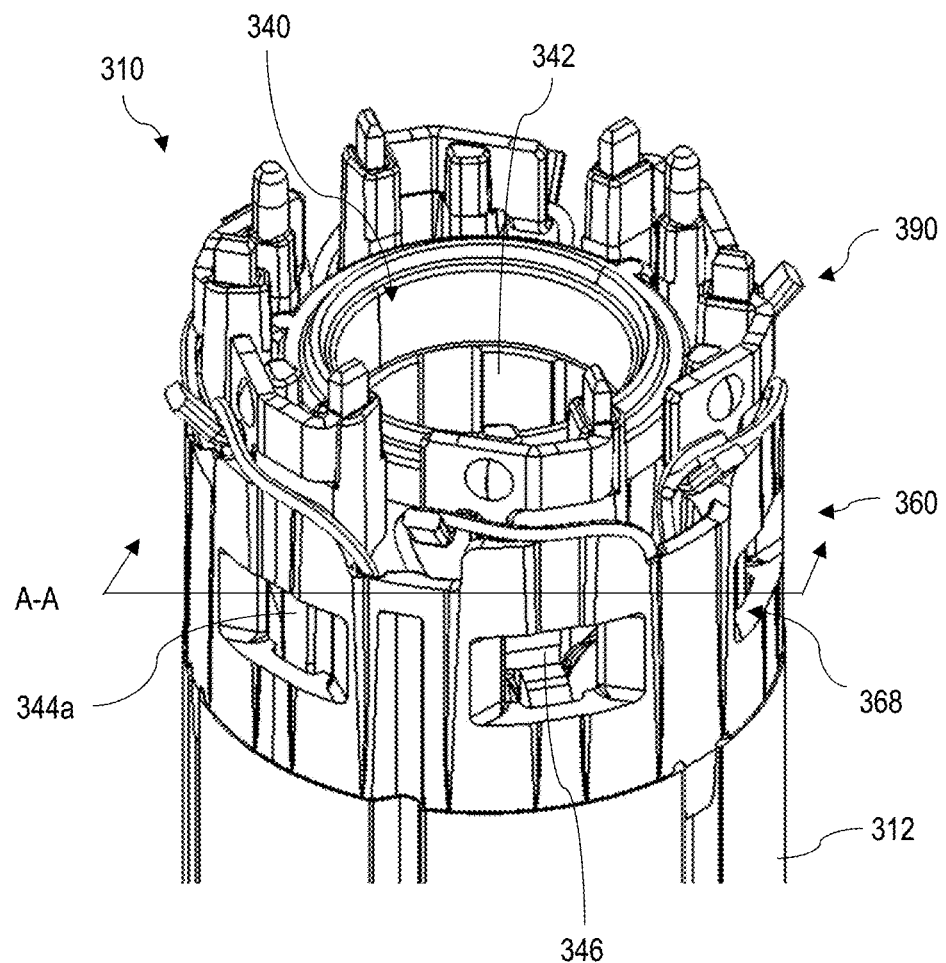
FIG. 37 depicts a perspective view of the rear bearing bridge mounted inside a routing insulator of the stator assembly, according to an embodiment.
Figure 38:
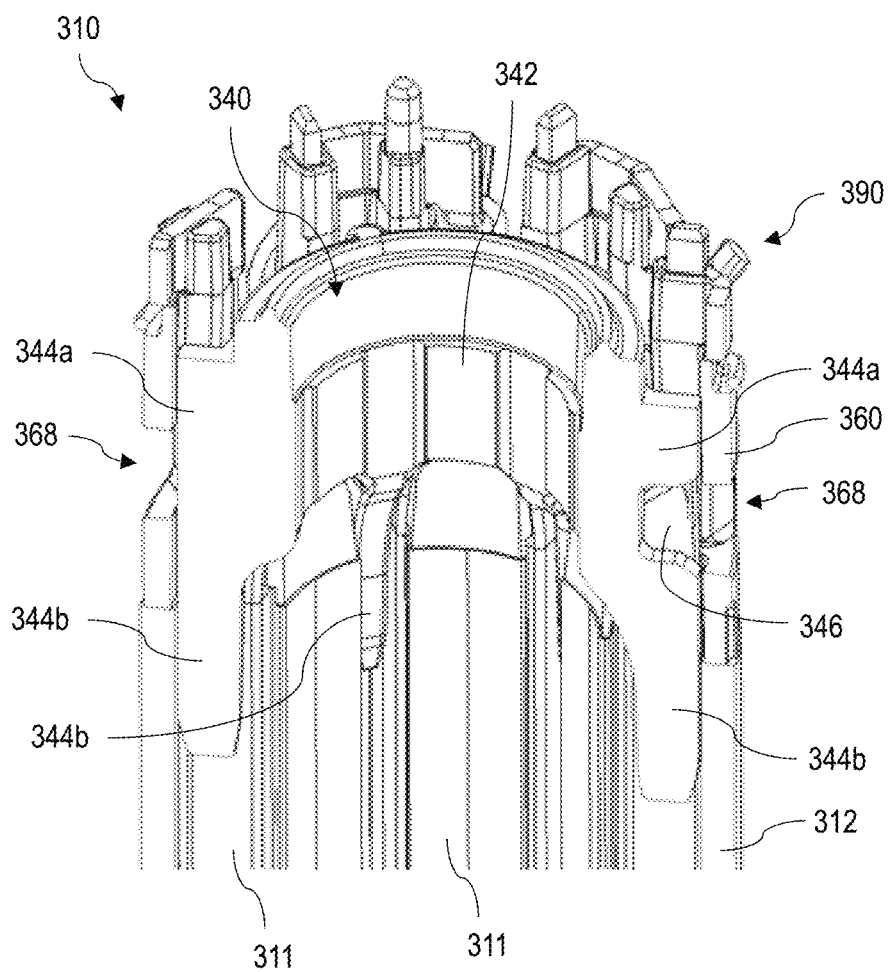
FIG. 38 depicts an angular cross-sectional view of the rear bearing bridge mounted inside the routing insulator, according to an embodiment.
Figure 39:
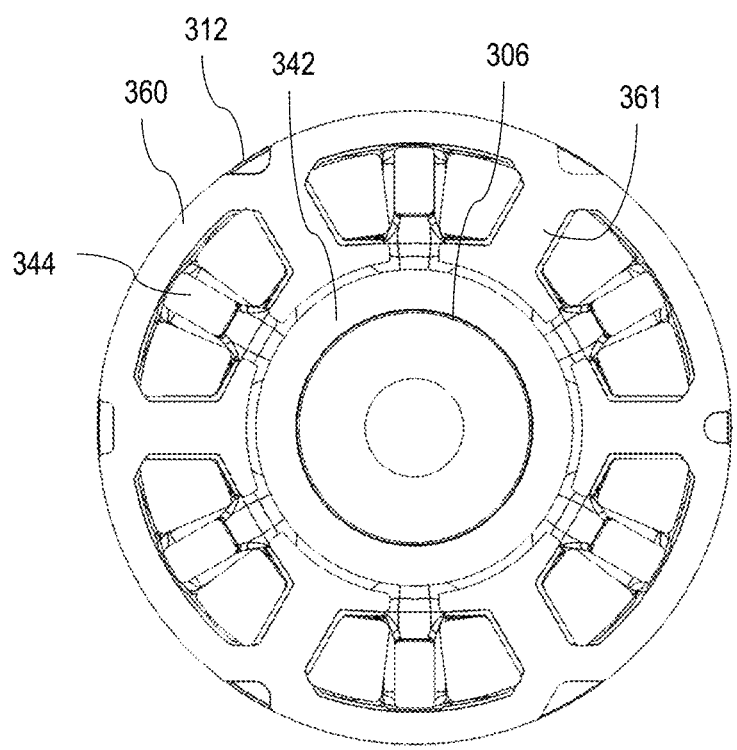
FIG. 39 depicts a radial cross-sectional view of the rear bearing bridge mounted inside the routing insulator, according to an embodiment.

FIG. 36 depicts a partially exploded perspective view of the stator assembly 310 and the rear bearing bridge 340, according to an embodiment. FIG. 37 depicts a perspective view of the rear bearing bridge 340 mounted inside the body of the routing insulator 360, according to an embodiment. FIG. 38 depicts an angular cross-sectional view of the rear bearing bridge 340 mounted inside the body of the routing insulator 360, according to an embodiment. FIG. 39 depicts a radial cross-sectional view of the rear bearing bridge 340 mounted inside the body of the routing insulator 360 along a plane A-A, according to an embodiment.

In an embodiment, as shown in these figures, and with continued reference to FIGS. 25-27 and 35, rear bearing bridge 340, in addition to main cylindrical body 342 for retention of the rear bearing 306, includes a series of axial post inserts 344 projecting radially outwardly from the outer circumference of the main cylindrical body 342 and extending in the axially forward direction in the direction of the stator core 312. The outer circumference of the cylindrical body 342 is sized to be slidingly received in contact with the inner body of the routing insulator 360. The axial post inserts 344 are sized to be received within gaps 369 (FIG. 35) of the routing insulator 360 to come into contact with the stator core 312, as detailed below.

In an embodiment, as the rear bearing bridge 340 is slidingly received within the routing insulator 360, the outer surface of the cylindrical body 342 comes into sliding contact with the inner surfaces of the retaining members 364 and 366 of the routing insulator 360 and becomes structurally supported by these features. In an embodiment, first portions 344a of the axial post inserts 344 that are located around the cylindrical body 342 are received into gaps 369 of the end insulator 360 and come into contact with the inner surface of the annular body 365 of the routing insulator 360. In an embodiment, second portions 344b of the axial post inserts 344 that extend axially forward from the cylindrical body 342, having already passed through the gaps 369, are slidingly received into the stator slots between adjacent stator windings 314 and are form-fittingly pressed into the inner body of the stator core 312. Engagement of the axial post inserts 344 with the stator core 312 pilots and radially supports the rear bearing bridge 340, and thus the rear bearing 306, relative to the stator assembly 310. In an embodiment, friction force between the post inserts 344 and the stator core 312 further rotationally secures the rear bearing bridge 340. In an embodiment, the post inserts 344 and the stator core 312 may be provided with snapping or tongue-and-groove retention features to fix the post inserts 344 more robustly along the rotational direction.

In some power tool applications with relative low torque ratings, the piloting of the rear bearing bridge 340 relative to the stator assembly 310 via the post inserts 344 is sufficient to provide full structural support for the rear bearing bridge 340. However, in higher torque power tool applications, the support provided merely by this structure may be insufficient.

In an embodiment, rear bearing bridge 340 further includes one or more notches 346 formed through the outer edged of the first portions 344a of the axial post inserts 344. After the rear bearing bridge 340 is fully received within the routing insulator 360, the notches 346 are radially aligned with peripheral openings 368 of the routing insulator 360. Notches 346 are provided for insertion of retaining insert members 350 or similar retention features from an outer tool housing for radial retention of the rear bearing bridge 340. This allows the tool housing to provide additional structural support for the rear bearing bridge 340, as discussed in detail herein.

Figure 40:
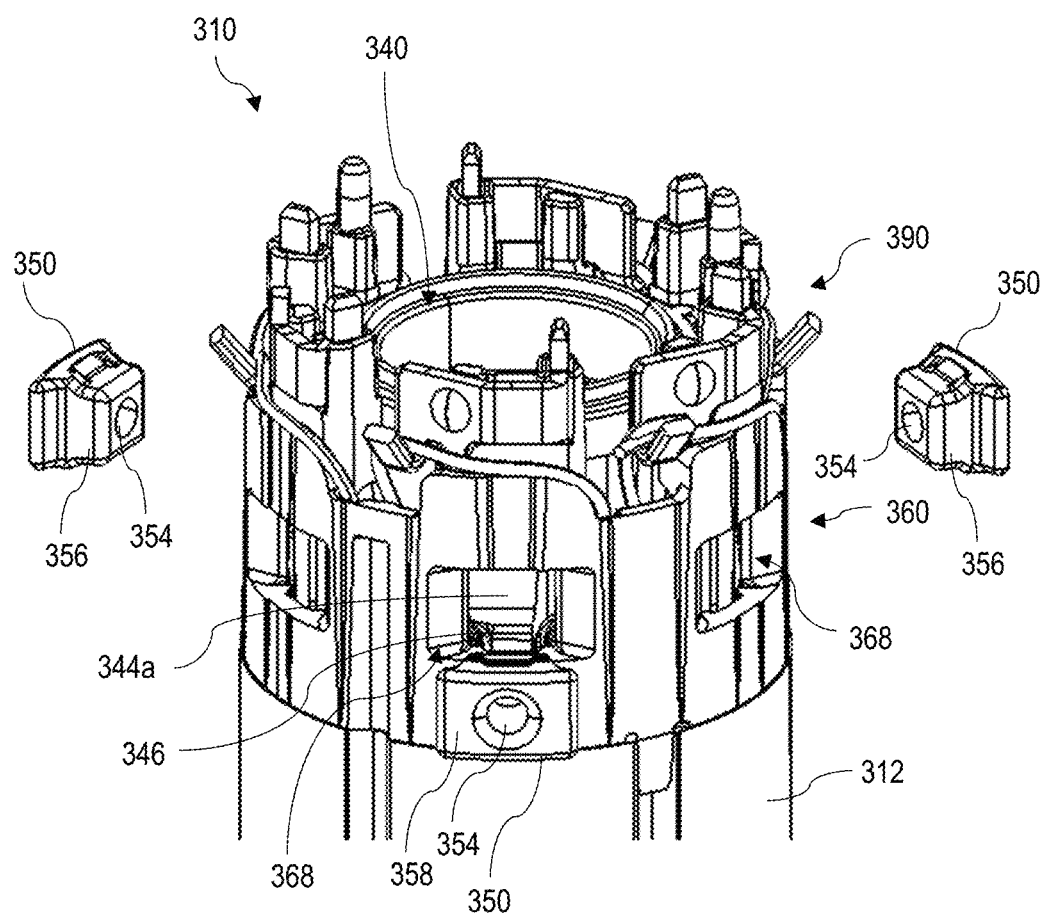
FIG. 40 depicts a partial perspective view of the stator assembly prior to assembly of retaining insert members, according to an embodiment.
Figure 41:
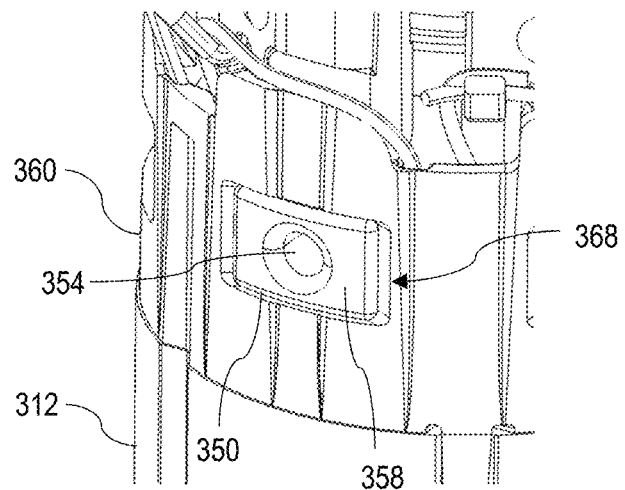
FIG. 41 depicts a partial zoomed-in view of the stator assembly including one retaining insert member, according to an embodiment.
Figure 42:
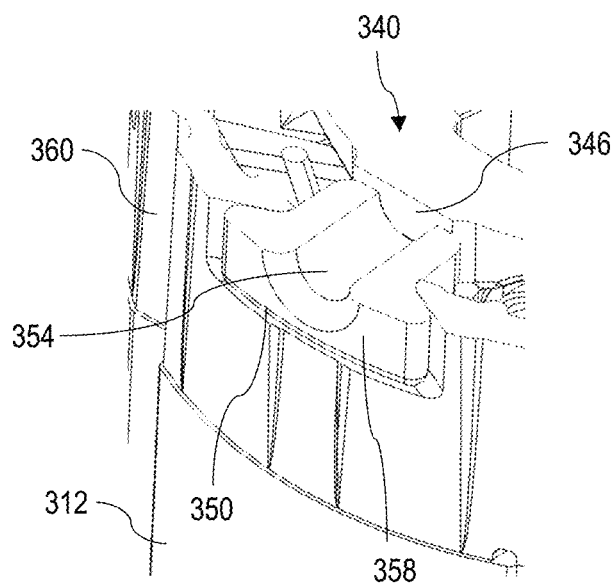
FIG. 42 depicts a partial zoomed-in view of the stator assembly cross-sectioned along a radial plane, according to an embodiment.
Figure 43:
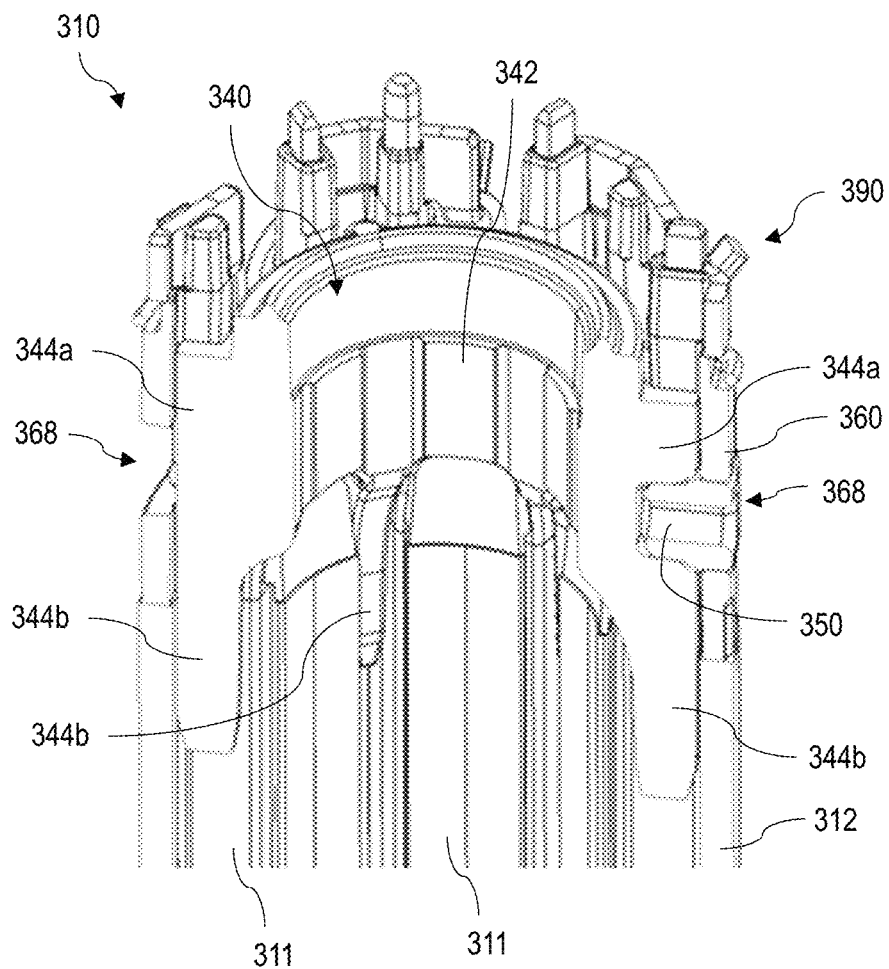
FIG. 43 depicts a cross-sectional perspective view similar to FIG. 38, additionally provided with retaining insert members, according to an embodiment.

FIG. 40 depicts a partial perspective view of the stator assembly 310 after the rear bearing bridge 340 is mounted inside the body of the routing insulator 360 but prior to assembly of the retaining insert members 350, according to an embodiment. FIG. 41 depicts a partial zoomed-in view of the stator assembly 310 showing one retaining insert member 350 received within a corresponding peripheral opening 368 of the routing insulator 360, according to an embodiment. FIG. 42 depicts a partial zoomed-in view of the stator assembly 310 cross-sectioned along a radial plane, according to an embodiment. FIG. 43 depicts a cross-sectional perspective view similar to FIG. 38, additionally provided with retaining insert members 350, according to an embodiment.

In an embodiment, retaining insert members 350 are received radially into peripheral openings 368 of the routing insulator 360 to engage the notches 346 of the axial post inserts 344. Each retaining insert member 350 includes an outer surface 358 having approximately the same area as the peripheral openings 368 that is rounded so as to be substantially flush with the outer body of the routing insulator 360 after the retaining insert member 350 is fully inserted so as to engage the inner surface of the motor can 302. Each retaining insert member 350 further includes a penetrating portion 356 that penetrates radially through and is shaped for engagement with a corresponding notch 346 of the rear bearing bridge 340. In their fully inserted position, the retaining insert members 350 axially and/or radially lock the rear bearing bridge 340 relative to the routing insulator 360.

In an embodiment, each retaining insert member 350 further includes a fastening receptacle 354 extending through the outer surface 358 along a radial direction of the motor 300. In an embodiment, fasteners 352 (FIGS. 25 and 27) are fastened into the fastening receptacles 352 to secure the rear bearing bridge 340 to the motor can 302 and/or other housing structures.

Alternatively, in an embodiment, at least a subset of the retaining insert members 350 may be include no fastening receptacles and be provided for radial piloting and support of the rear bearing bridge 340 and/or the routing insulator 360 to the motor can 302 and/or other housing structures.

In an alternative and/or further embodiment, at least a subset of the retaining insert members 350 may be made of resilient deformable material such as silicone or rubber, with the outer surfaces 358 projecting slightly outwardly relative to the annular body 365 of the routing insulator 360. In this embodiment, as the routing insulator 360 is received within the motor can 302, the retaining insert members 350 compress inwardly against the surface of the motor can 302, thus absorbing any radial stack-up tolerances and improving radial piloting and support of the rear bearing bridge 340 and/or the routing insulator 360 relative to the motor can 302.

Figure 44:
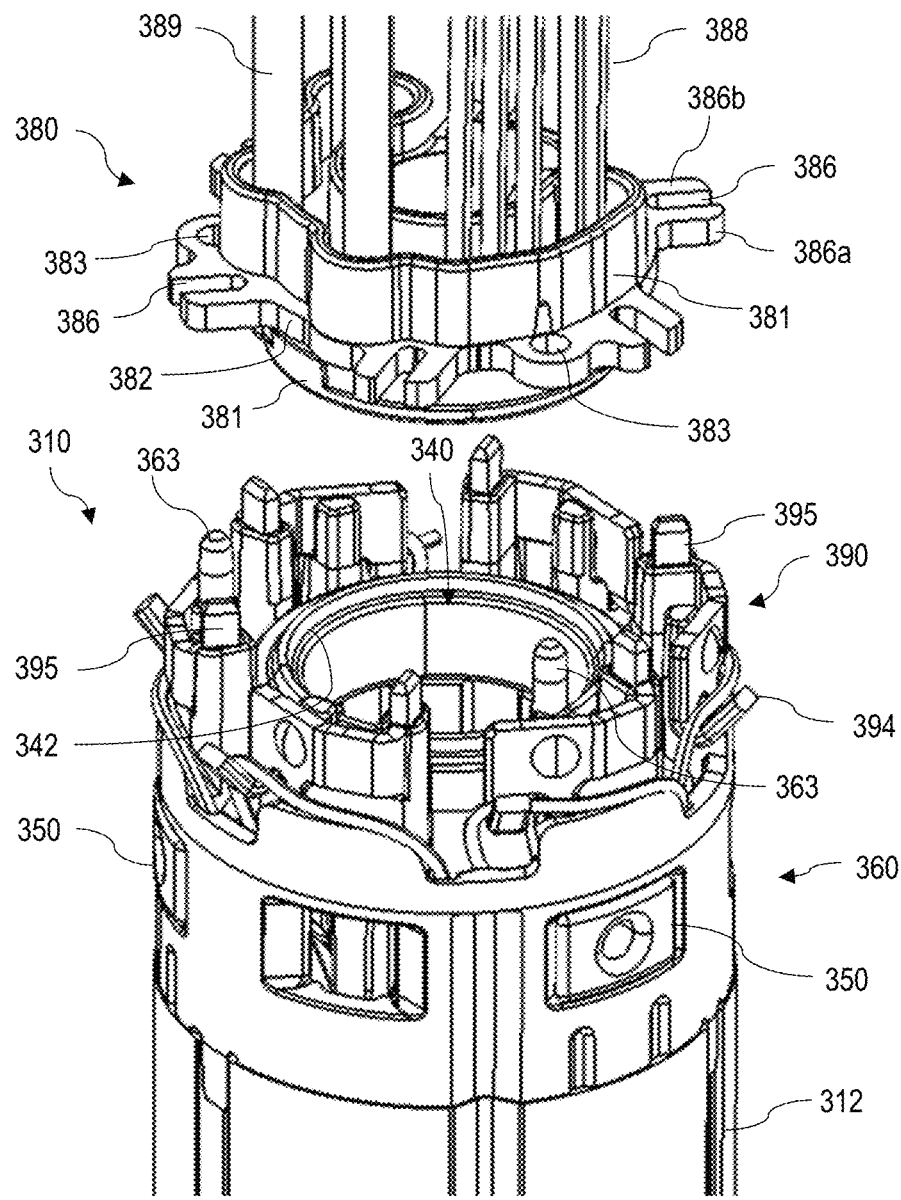
FIG. 44 depicts a perspective exploded view of a circuit board assembly and the stator assembly, according to an embodiment.
Figure 45:
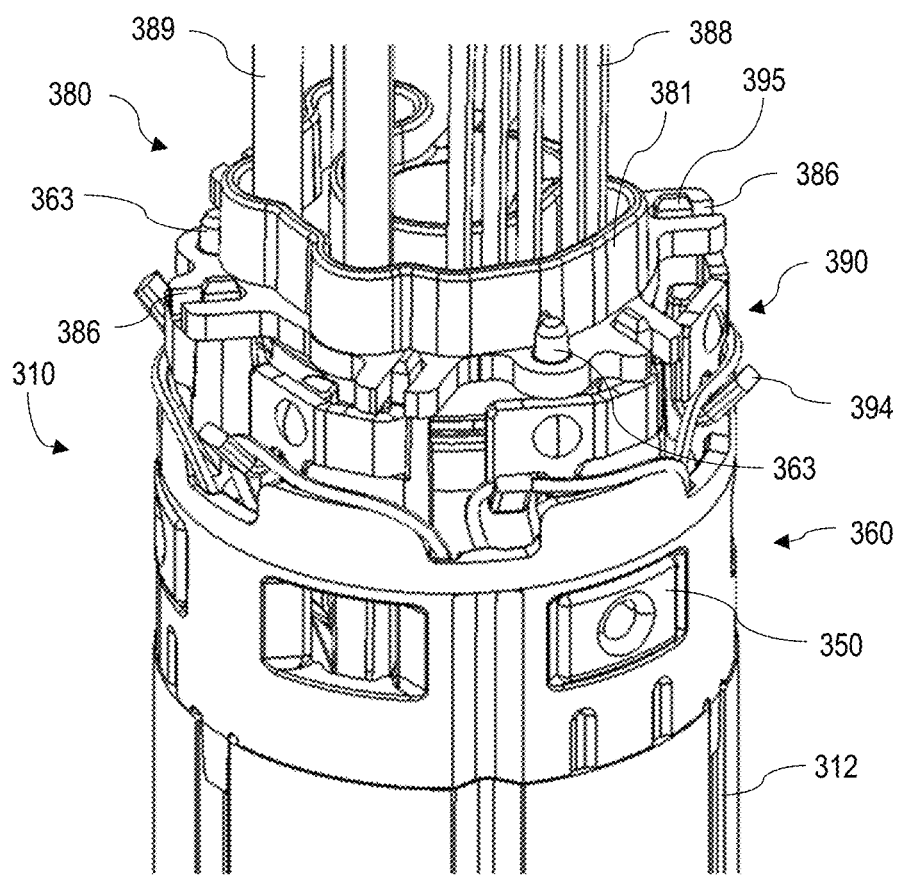
FIG. 45 depicts a perspective view of the circuit board assembly mounted onto the stator assembly, according to an embodiment.

FIG. 44 depicts a perspective view of the circuit board assembly 380 prior to mounting onto the stator assembly 310, according to an embodiment. FIG. 45 depicts a perspective view of the circuit board assembly 380 mounted onto the stator assembly 310, according to an embodiment.

As previously described, circuit board assembly 380 includes circuit board 382 mounted on the rear end of the rear bearing bridge 340. The circuit board 382 includes a series of magnetic sensors (not shown) mounted on its front surface (in this figure, bottom surface) in magnetic interface with the sense magnet 307 of the stator assembly 310. The circuit board 382 includes an outer periphery that includes approximately the same diameter as the cylindrical body 342 of the rear bearing bridge 340. Further, the diameter of the outer circumference of the main body of the circuit board 382 is smaller than a circumference of an envelope formed by the stator terminals 390. The circuit board 382 further includes a series of fingers 386a and 386b projecting radially outwardly from its outer periphery and forming peripheral slots 386 therein. Peripheral slots 386 are positioned to receive the stator terminals 390 from the stator assembly 310. In an alternative embodiment, peripheral slots 386 may be holes formed close to the outer periphery of the circuit board 382. Peripheral slots 386 align with and receive terminal pins 395 of the stator terminals 390 securely therein. Conductive traces within the circuit board 382 extends into the peripheral slots 386 to make electrical connections with the terminal pins 395 of the stator terminals 390. This allows the circuit board 382 to provide appropriate interconnections between the stator windings 314 of different phases.

In an embodiment, circuit board 382 additionally includes one or more through-holes 383 provided adjacent at least a subset of the peripheral slot 386 in alignment with support posts 363 of the routing insulator 360. As the circuit board assembly 380 is mounted on the stator assembly 310, the support posts 363 are securely received within the through-holes 383 to spatially support the circuit board assembly 380 relative to the routing insulator 360 and, by extension, the stator assembly 310.

In an embodiment, power wires 389 and signal wires 388 are secured to a rear (top) surface of circuit board assembly 380. In an embodiment, overmold structure 381 is formed around at least the rear surface of the circuit board 382, forming a continuous wall around the mounting points of the power wires 389 and signal wires 388. In an embodiment, overmold structure 381 is further provided on the front surface of the circuit board 382, forming an annular body for providing a sealed mating surface with the cylindrical body 342 of the rear bearing bridge 340.

Figure 46:
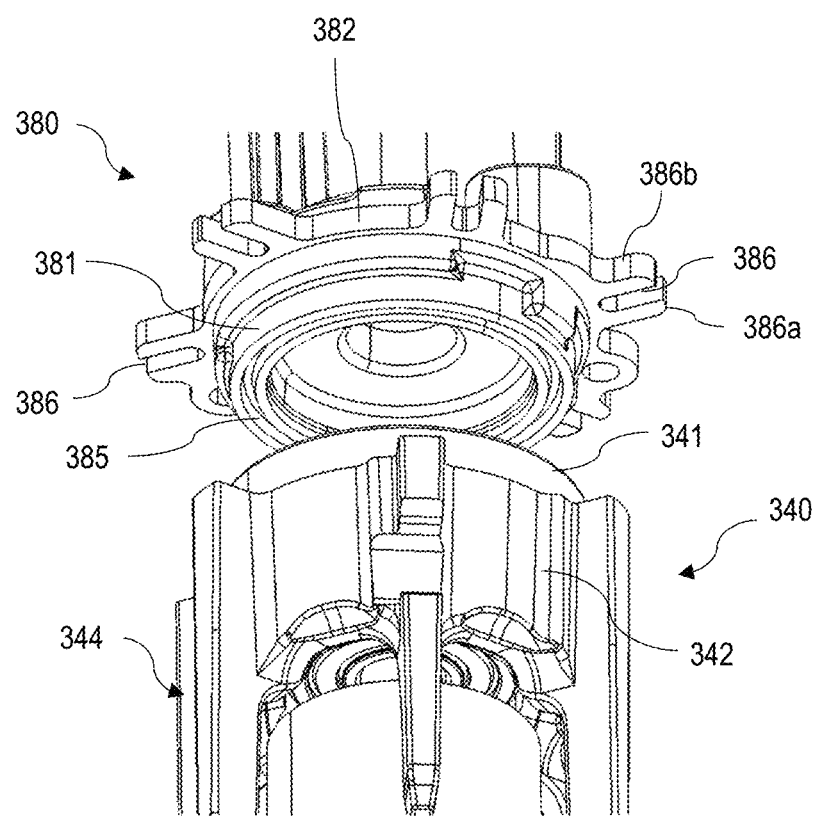
FIG. 46 depicts a partially exploded perspective view of the circuit board assembly relative to the rear bearing bridge, according to an embodiment.

FIG. 46 depicts a partially exploded perspective view of the circuit board assembly 380 relative to the rear bearing bridge 340, according to an embodiment. As shown here, the annular body formed by the overmold structure 381 on the front surface of the circuit board 382 includes approximately the same diameter as the cylindrical body 342 of the rear bearing bridge 340. In an embodiment, the annular body of the overmold structure 381 includes an annular groove 385 on its front surface, which receives an annular lip 341 of the cylindrical body 342 of the rear bearing bridge 340. This allows the circuit board assembly 380 to substantially seal off the hollow opening of the cylindrical body 342 of the rear bearing bridge 340, thus protecting the rear bearing 306, the sense magnet 307, and the magnetic (Hall) sensors (not shown), from ingress of dust and debris particles.

Figure 47:
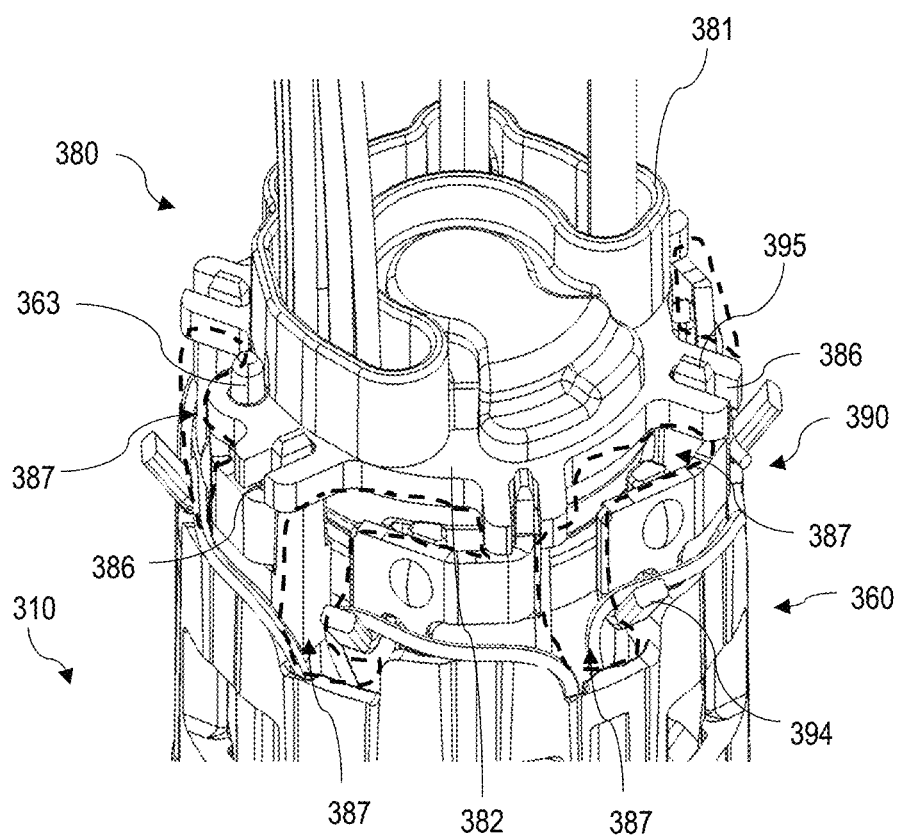
FIG. 47 depicts a perspective view of the circuit board assembly mounted and the stator assembly highlighting air inlets, according to an embodiment.

FIG. 47 depicts a perspective view of the circuit board assembly 380 mounted onto the stator assembly 310, according to an embodiment. This figure provides a similar view as FIG. 45, but further highlights a series of air inlets 387 formed between the circuit board 382, the routing insulator 360, and the stator terminals 390. The airflow generated by the motor fan 308 enters the motor assembly 300 through air inlets 387, in thermal contact with the circuit board assembly 380, and through the stator assembly 310. In an embodiment, the air inlets 387 include radial portions and circumferential portions. In an embodiment, the outer circumferential surface of the circuit board 382 is recessed between adjacent peripheral slots 386 and forms the radial portions of the air inlets 387. In an embodiment, gaps formed between adjacent stator terminals 390 and between the stator terminals 390 and the routing insulator 360 form the circumferential portions of the air inlets 387.

Figure 48:
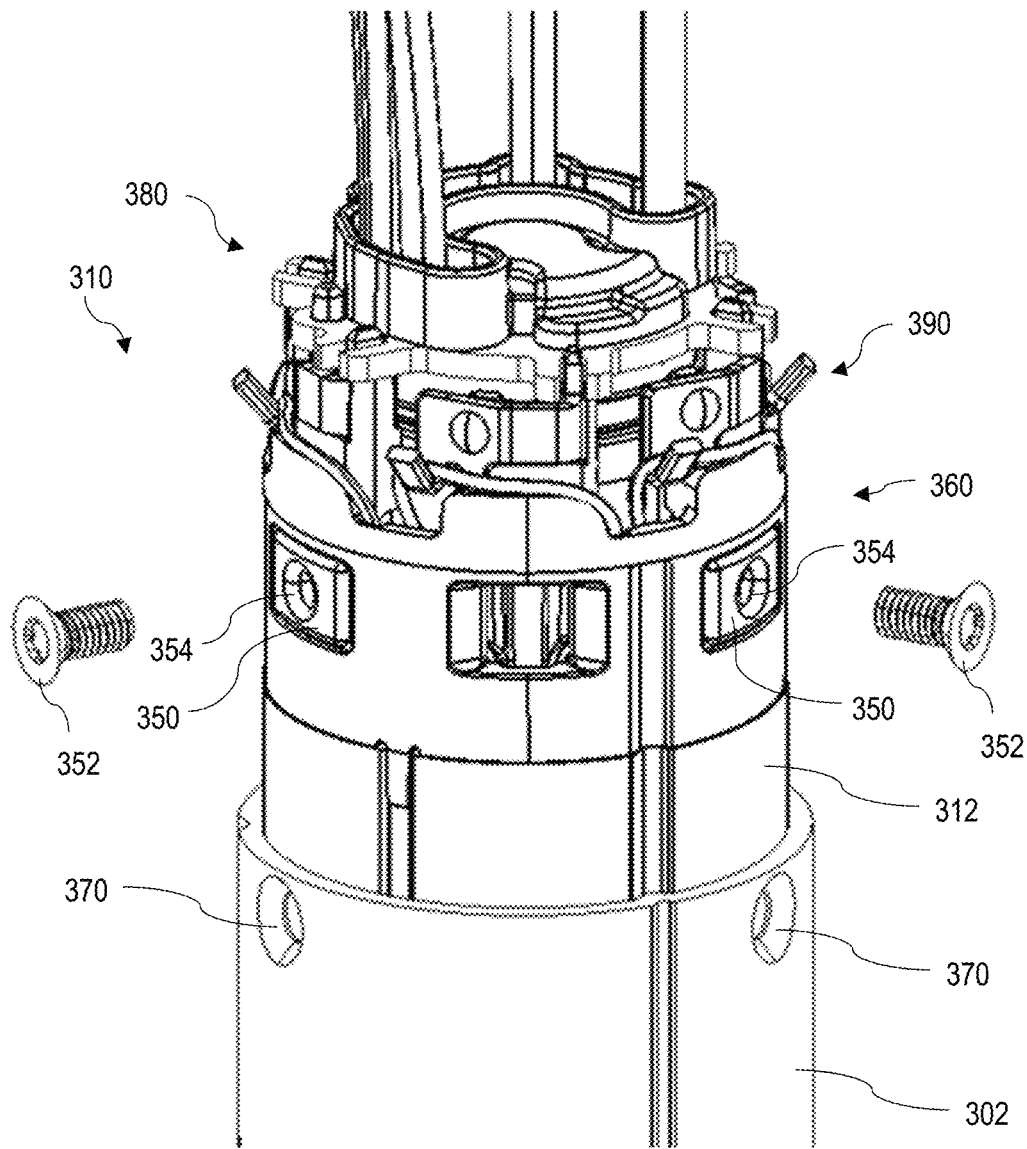
FIG. 48 depicts a partial perspective view of the stator assembly being received through an end of a motor can of the BLDC motor, according to an embodiment.
Figure 49:
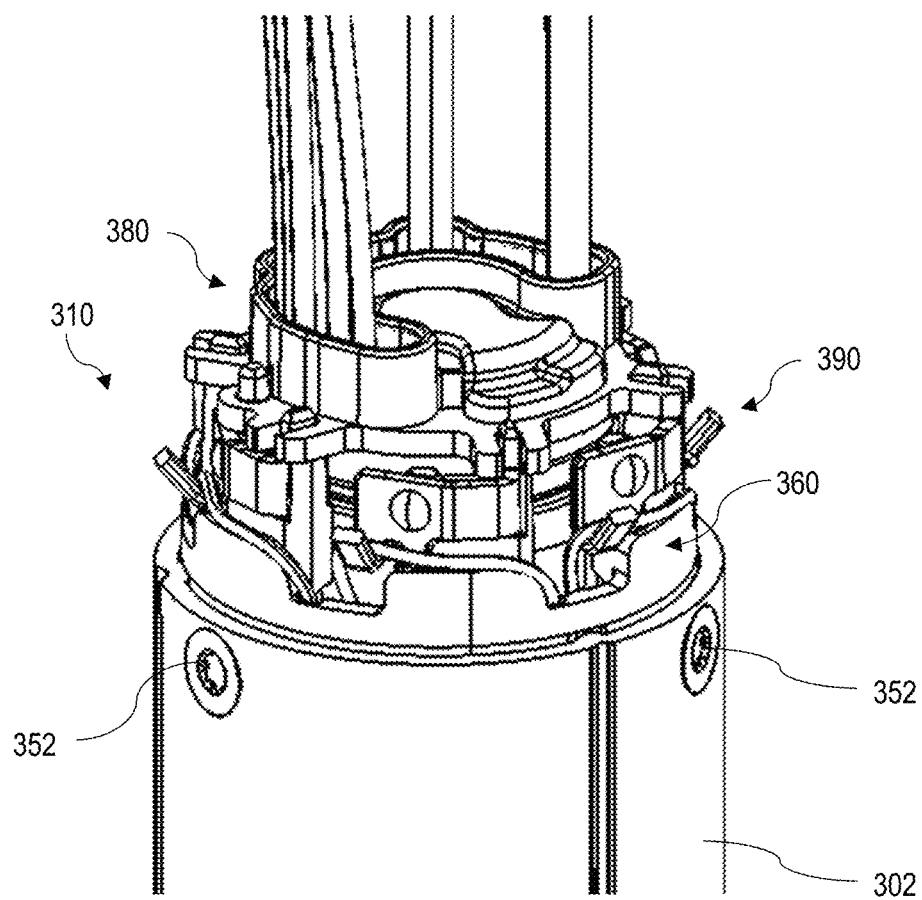
FIG. 49 depicts a partial perspective view of the motor can with the stator assembly received therein, according to an embodiment.

FIG. 48 depicts a partial perspective view of the stator assembly 310 being received through an end of the motor can 302, according to an embodiment. FIG. 49 depicts a partial perspective view of the motor can 302 with the stator assembly 310 fully inserted therein, according to an embodiment.

As shown in these figures, in an embodiment, motor can 302 includes one or more side openings 370. As the stator assembly 310 is being received through the rear open end of the motor can 302, the side openings 370 are axially aligned with fastening receptacles 354 of the retaining insert members 350. Once the stator assembly 310 is properly positioned within the motor can 302, fasteners 352 are received radially through the side openings 370 into the fastening receptacles 354 to secure the motor can 302 to the rear bearing bridge 340 and the stator assembly 310.

In an embodiment, after the stator assembly 310 is mounted into the motor can 302, the rotor assembly 320 is received through the front open end of the motor can 302 and the front bearing bridge 330 is secured to the front open end of the motor can 302, as described herein in detail.

Figure 50:
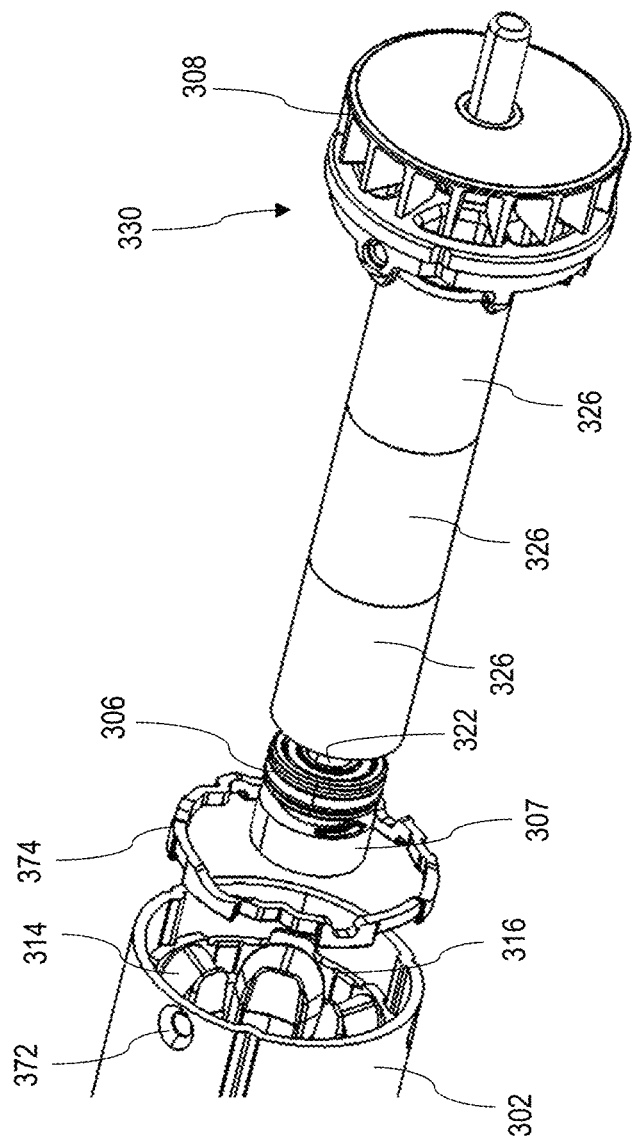
FIG. 50 depicts a partial exploded view of a rotor assembly and a front bearing bridge of the BLDC motor, according to an embodiment.
Figure 51:
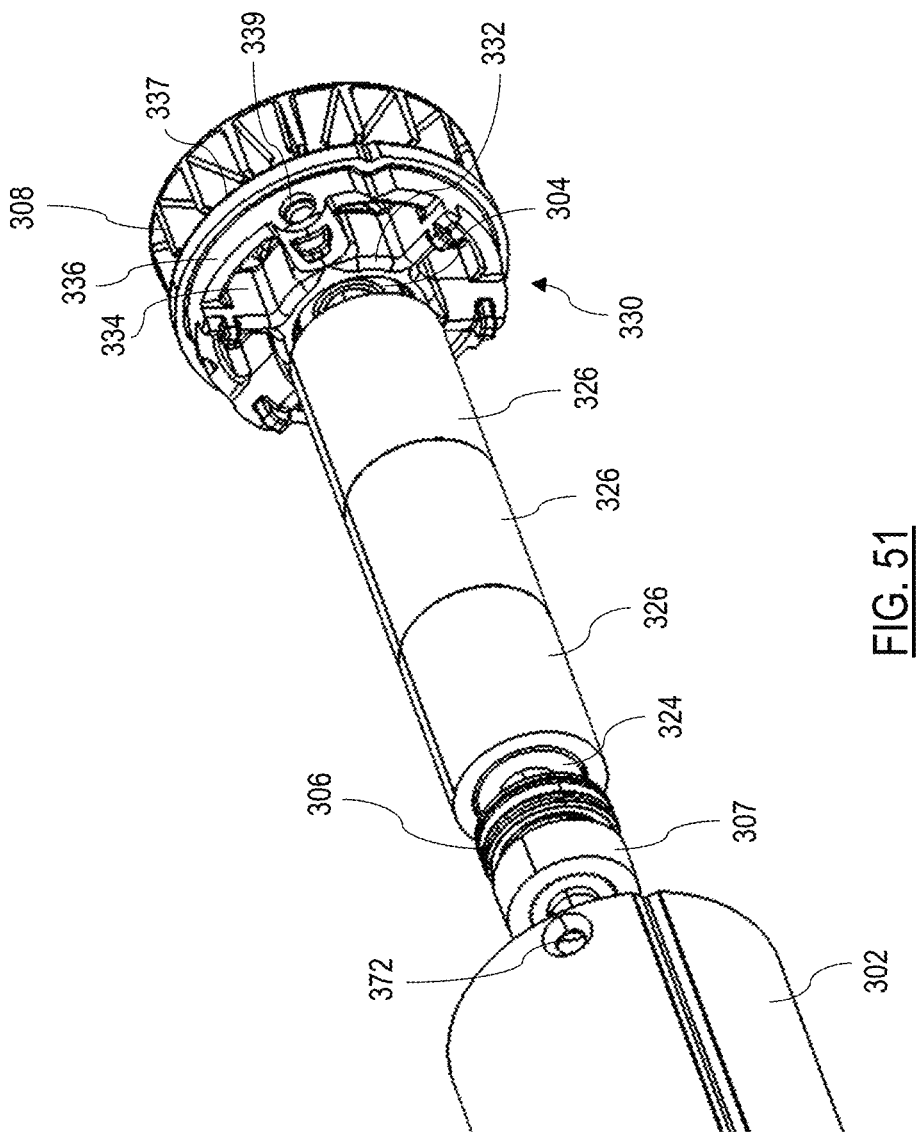
FIG. 51 depicts another partial exploded view of the rotor assembly and the front bearing bridge, according to an embodiment.

FIGS. 50 and 51 depict partial exploded perspective views of the rotor assembly 320 and the front bearing bridge 330 prior to mounting into the motor can 302 and the stator assembly 310, according to an embodiment.

In an embodiment, referring to these figures and FIG. 27, front and rear bearings 304 and 306 are mounted on the rotor shaft 322 on opposite sides of the series of permanent magnets 326. Sense magnet 307 is also mounted of the rotor shaft 322 rearward of the rear bearing 306. In an embodiment, the front bearing 304 is nested within the bearing pocket formed by the main cylindrical body 332 of the front bearing bridge 330 prior to insertion of the rotor assembly 320 into the motor can 302. During the mounting process, the rear bearing 306 is guided into the cylindrical body 342 of the rear bearing bridge 340. Once the front bearing bridge 330 is secured to the motor can 302, the rotor assembly 310 has full axial and radial structural support relative to the stator assembly 310.

In an embodiment, in addition to main cylindrical body 332 for receiving the front bearing 304, the front bearing bridge 330 further includes a series of radial arms 334 that project outwardly from the main cylindrical body 332, and an outer ring 336 configured to mate with the front end of the motor can 302. In an embodiment, outer ring 336 is fittingly received inside the inner surface of the motor can 302 to radially pilot and structurally support the front bearing bridge 330, and therefore the front bearing 304, relative to the motor can 302. In an embodiment, an annular lip 337 radially projects outwardly from the outer ring 336 to mate with the end surface of the motor can 302. In an embodiment, the outer ring 336 further includes a series of fastening receptacles 339 facing radially outwardly, and the motor can 302 includes a series of corresponding side openings 372 through which fasteners 338 (FIG. 27) are received radially into the fastening receptacles 339 to secure the motor can 302 to the front bearing bridge 330.

In an embodiment, motor fan 308 is disposed adjacent the front bearing bridge 330. The airflow generated by the motor fan 308 passes through the openings formed between the radial arms 334 of the front bearing bridge 330 towards the motor fan 308. In an embodiment, the front bearing bridge 330 forms a baffle for the air to be repelled along the radial direction away from the motor fan 308. In an embodiment, the size of the fan 308 may be configured according to motor power output requirements. In the illustrated embodiment, the fan 308 includes approximately the same diameter as the motor can 302.

In an embodiment, in its mounted position, the front bearing bridge 330 axially restrains the front end of the stator assembly 310 within the motor can 302. To absorb stack-up tolerances resulting from manufacturing inaccuracies in, for example, the length of the stator assembly 310, length of the motor can 302, placement of the side openings 370 and 372, or placement of the fastening receptacles 354 and 339, a compression ring 374 is provided inside the motor can 302 between the front end of the front end insulator 316 and the rear end of the front bearing bridge 330.

Figure 52:
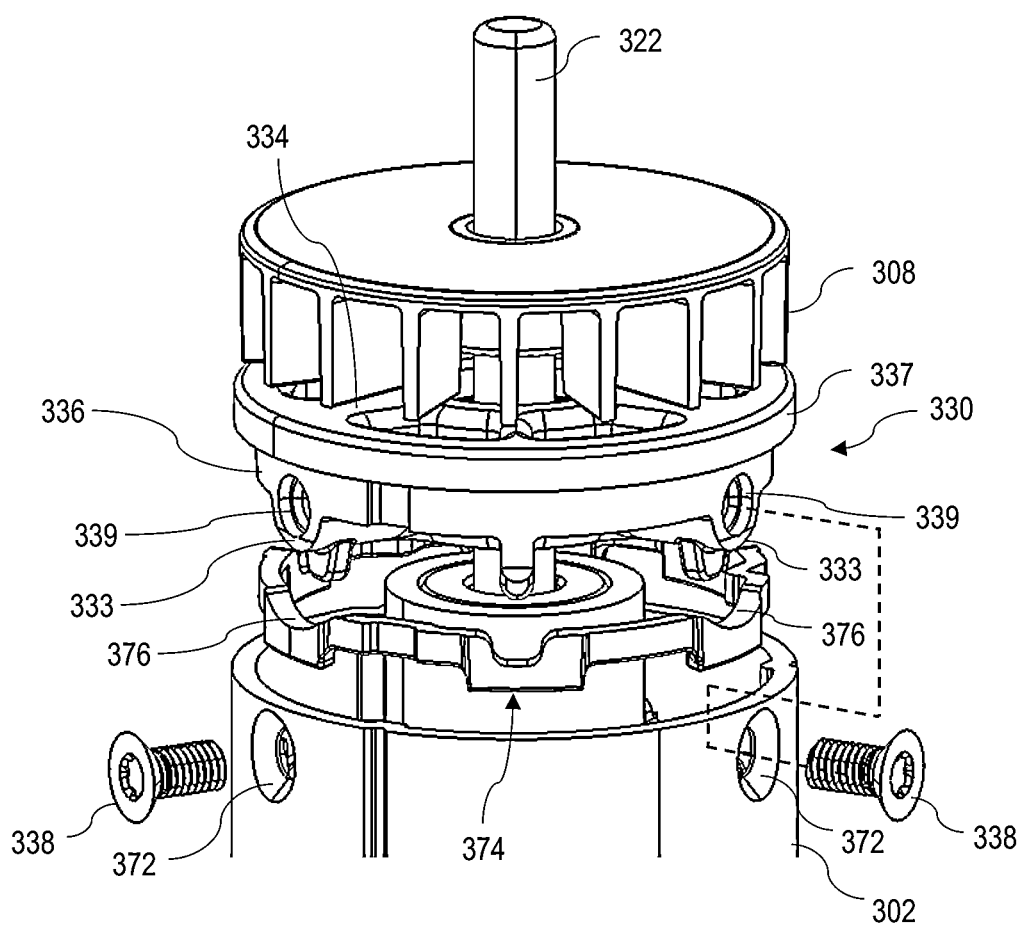
FIG. 52 depicts a partially exploded view of the front end of the motor can and the front bearing bridge including a compression ring, according to an embodiment.
Figure 53:
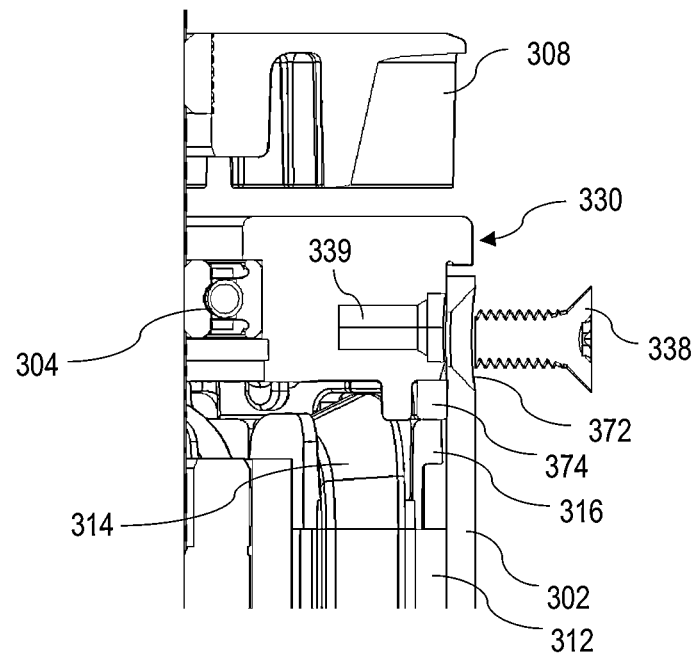
FIG. 53 depicts a zoomed-in cross-sectional view of the front end of the motor can prior to fastening the front bearing bridge, according to an embodiment.
Figure 54:
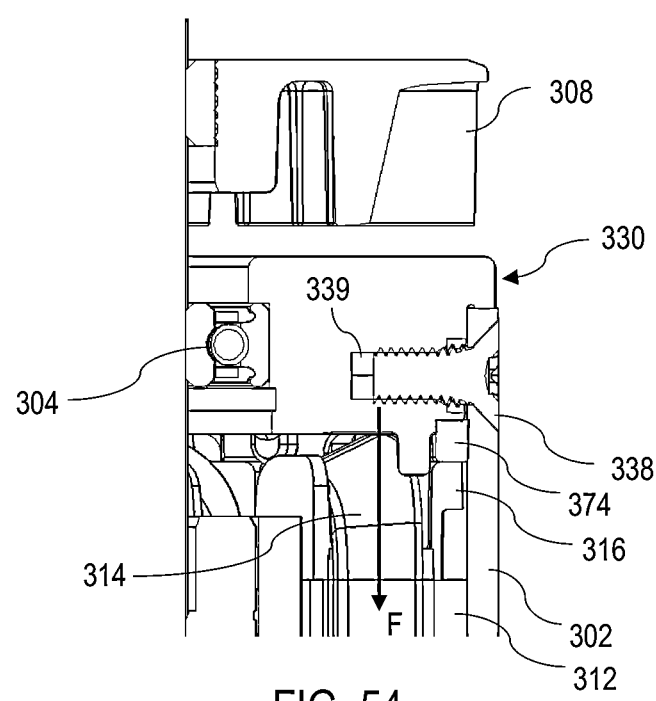
FIG. 54 depicts a zoomed-in cross-sectional view of the front end of the motor can after fastening the front bearing bridge, according to an embodiment.

FIG. 52 depicts a partially exploded view of the front end of the motor can 302 and the front bearing bridge 330, according to an embodiment. FIGS. 53 and 54 depict zoomed-in cross-sectional views of the front end of the motor can 302, according to an embodiment.

As shown in these figures, in an embodiment, the compression ring 374 includes a length of, for example, at least approximately 1 mm along the axial direction. The compression ring 374 may include an outer diameter that is approximately equal to or slightly smaller than the inner diameter of the motor can 302, allowing it to be sandwiched between the between the front end of the front end insulator 316 and the rear end of the front bearing bridge 330 inside the motor can 302. Alternatively, the outer diameter of the compression ring 374 may be slightly greater than the inner diameter of the motor can 302 for added radial dampening. As the front bearing bridge 330 is initially mounted on the front end of the motor can 302 and prior to the fasteners 338 being fastened, the axial width of the compression ring 374 causes the side openings 372 to be slightly axially misaligned relative to the fastening receptacles 339. Fastening the fasteners 338 through the side openings 372 into the fastening receptacles 339 causes the front bearing bridge 330 to move in the direction F towards the stator assembly 310 against the biasing force of the compression ring 374, thus compressing the compression ring 374 between the front end of the front end insulator 316 and the rear end of the front bearing bridge 330. This ensures that the compression ring 374 absorbs all stack-up tolerances, and consequently reduce vibration and noise, while firmly supporting the stator assembly 310 relative to the front bearing bridge 330 along the axial direction.

In an embodiment, the front bearing bridge 330 includes rounded areas 333 formed rearward of the fastening receptacles 339, and the compression ring 374 includes corresponding rounded recesses 376. As the fasteners 338 are tightened into fastening receptacles 339, the rounded areas 333 press against the rounded recesses 376 in the direction F, thus compressing the compression ring 374 against the front end of the front end insulator 316.

Figure 55:
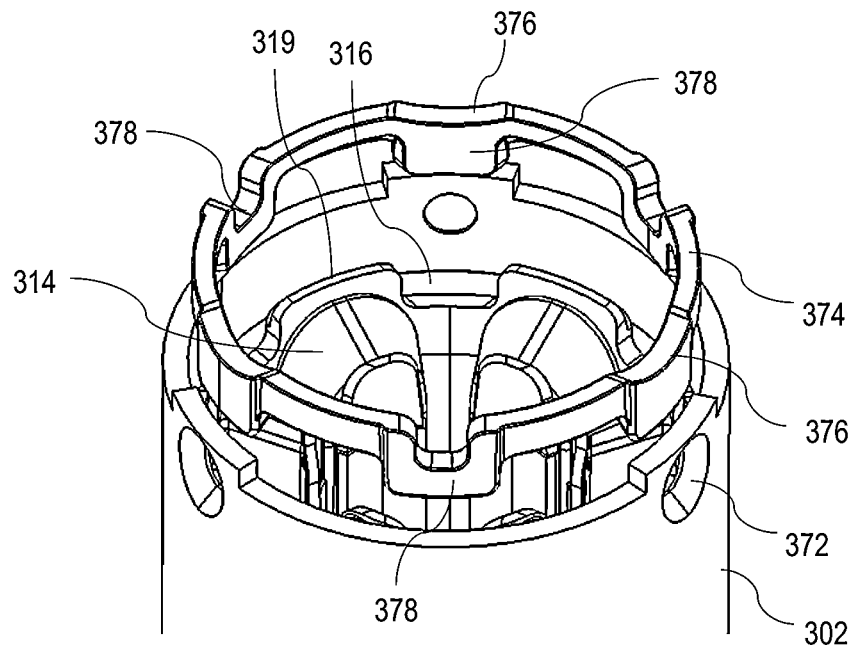
FIG. 55 depicts a partial perspective view of the motor can and the compression ring, according to an embodiment.
Figure 56:
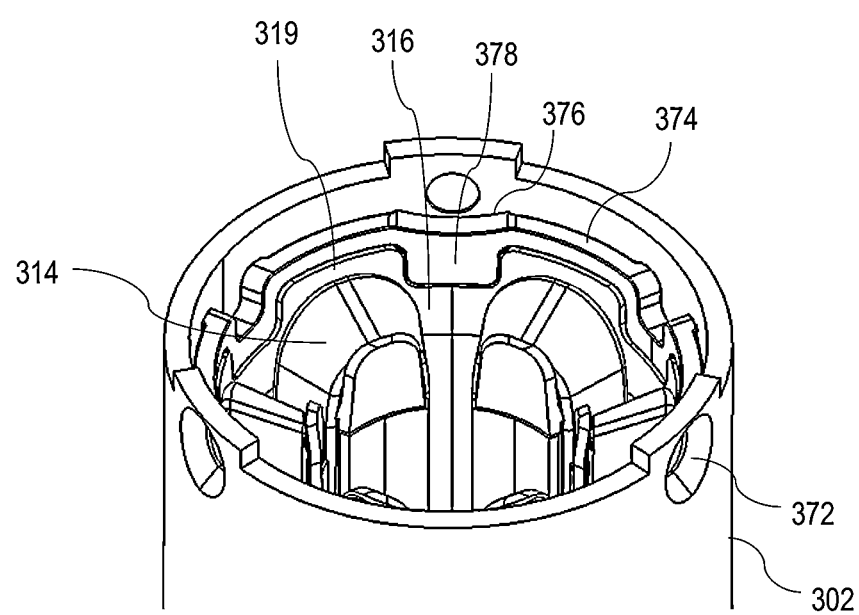
FIG. 56 depicts a partial perspective view of the motor can with the compression ring received therein, according to an embodiment.

FIG. 55 depicts a partial perspective view of the motor can 302 with the compression ring 374 at a distance from the front end of the front end insulator 316, according to an embodiment. FIG. 56 depicts a partial perspective view of the motor can 302 with the compression ring 374 received in contact with the front end insulator 316, according to an embodiment.

As shown in these figures, in an embodiment, a rear surface of the compression ring 374 that is arranged to come into contact with the front end of the front end insulator 316 includes contoured profile including a series of humped surfaces 378 designed to fit into recesses formed between bumps 319 of the front end insulator 316.

Embodiments described above are made with reference to a canned BLDC motor having a motor can 302 in which the motor components including the stator assembly 310 are received and to ends of which the front and rear bearing bridges 330 and 340 are secured. The motor can 302, in an embodiment, may be a solid cylindrical metal piece having two open ends.

An alternative embodiment of the invention, described here in detail, utilizes the same motor components described above directly in a clamshell housing 402 without an intermediary motor can 302.

Figure 57:
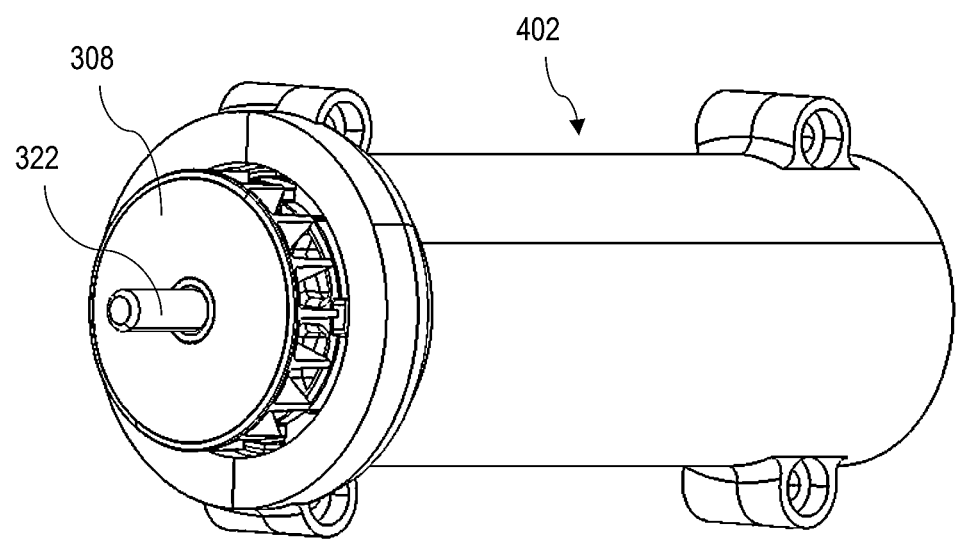
FIG. 57 depicts a perspective view of BLDC motor houses within a clamshell housing instead of a motor can, according to an embodiment.
Figure 58:
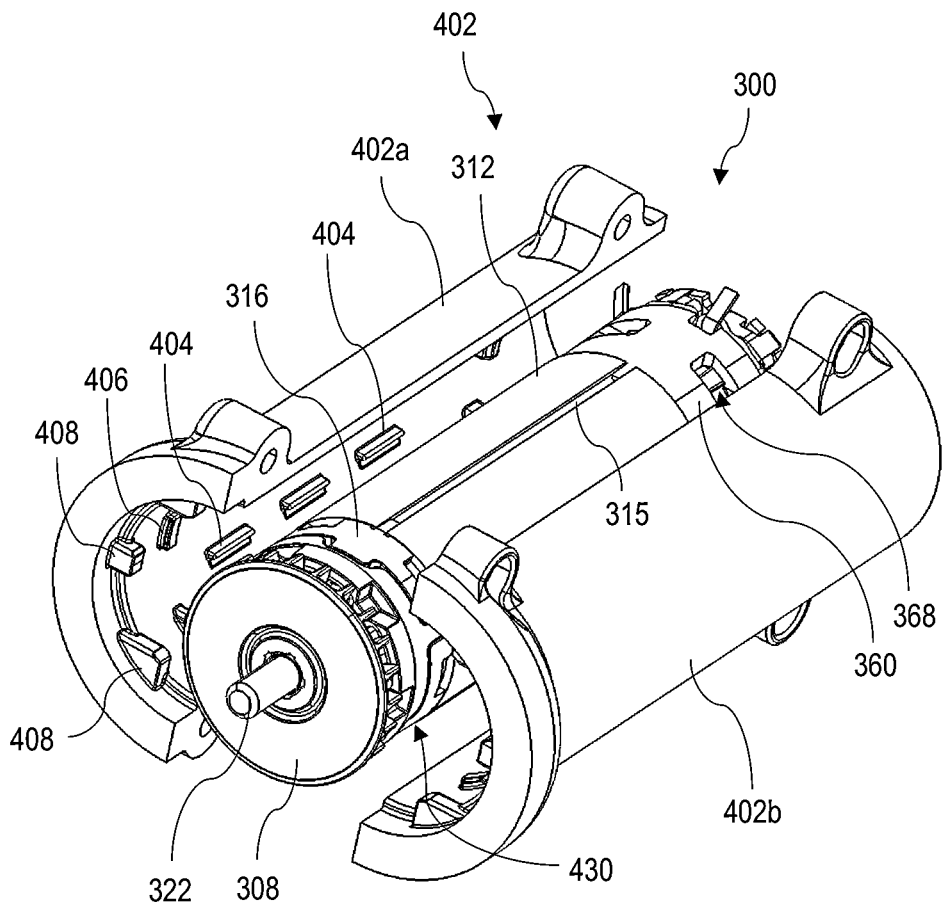
FIG. 58 depicts a partially exploded view of the clamshell housing around the BLDC motor, according to an embodiment.
Figure 59:
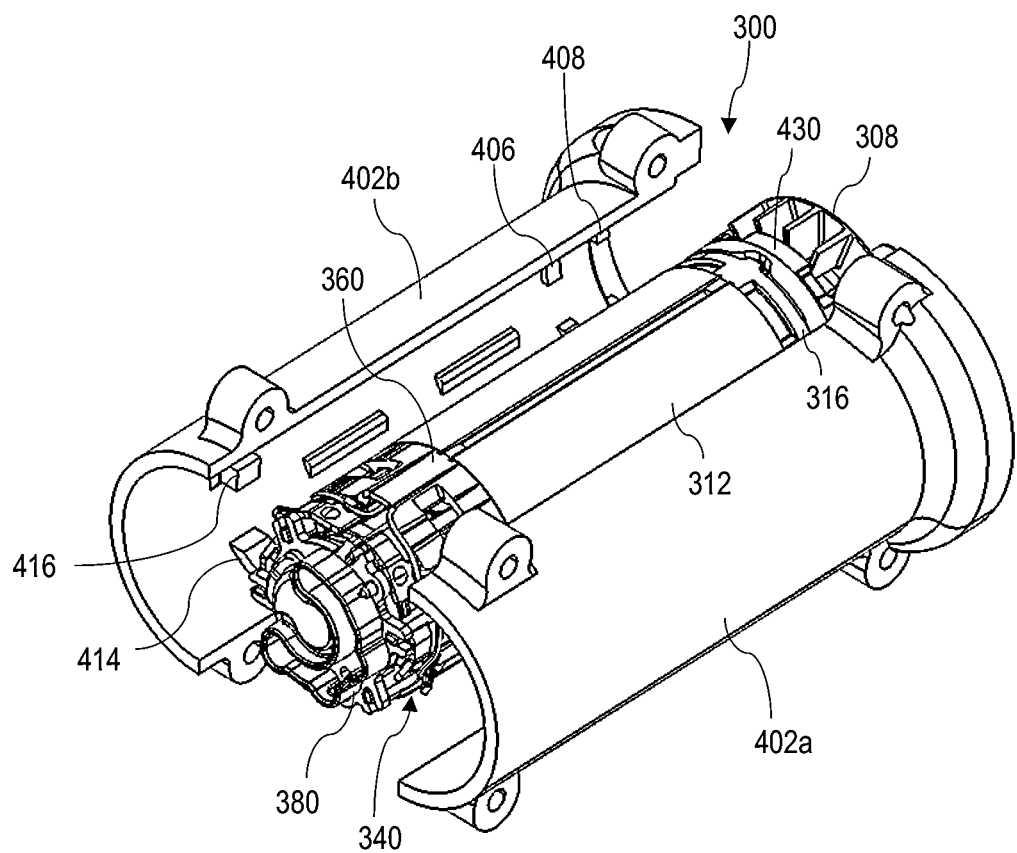
FIG. 59 depicts another partially exploded view of the clamshell housing around the BLDC motor, according to an embodiment.
Figure 60:
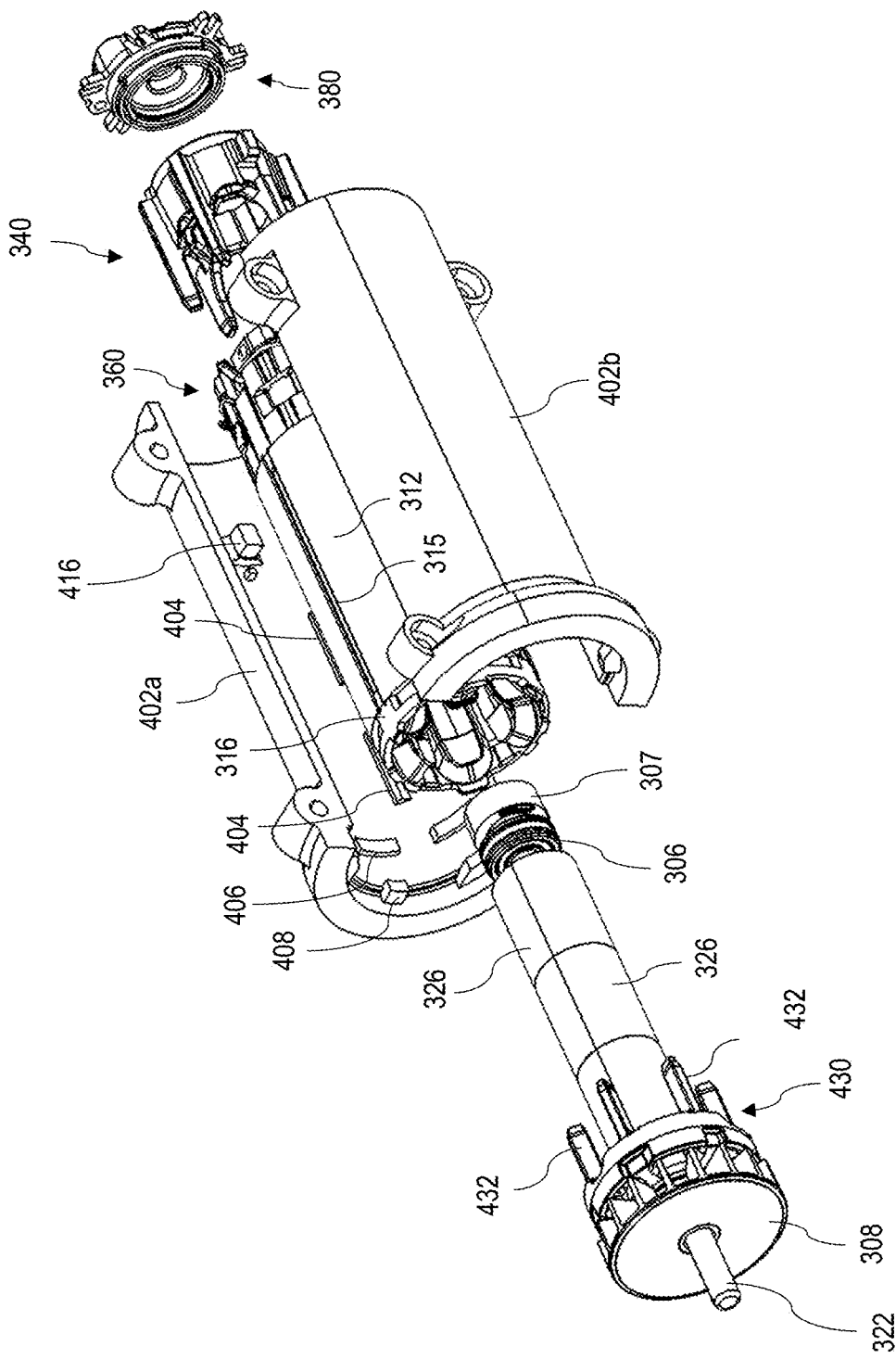
FIG. 60 depicts an exploded view of the BLDC motor components and the clamshell housing, according to an embodiment.

FIG. 57 depicts a perspective view of a clamshell housing 402 for housing the motor 300, according to an embodiment. FIGS. 58 and 59 depict two partially exploded views of the clamshell housing 402 relative to the motor 300, according to an embodiment. FIG. 60 depicts an exploded view of the motor 300 components and the clamshell housing 402, according to an embodiment.

In an embodiment, components of the motor 300 remain unchanged except that it includes an alternative front bearing bridge 430 configuration. In this embodiment, front bearing bridge 430 includes substantially the same features as front bearing bridge 330 described above, but it does not include fastening receptacles along the sides of its outer ring for receiving fasteners. Rather, the front bearing bridge 430 includes a series of axial post inserts 432 arranged to be securely received into stator slots of the stator assembly 310 for piloting and supporting the front bearing bridge 430 directly to the stator assembly 310. This ensures that the front bearing bridge 430, like the rear bearing bridge 340, is structurally secured to the stator assembly 310 independently of an exterior motor can.

In an embodiment, the clamshell housing 402 includes two clamshells 402a and 402b that come together around the stator assembly 310 to support the motor 300. Clamshell housing 402 may be provided as a substitute for motor can 302 described above. Alternatively, clamshell housing 402 may be a part of a tool housing that receives the motor. In an embodiment, clamshell housing 402 may correspond to, or be a part of, the elongate housing 12 of the power tool 10 previously described with reference to FIG. 1, or the elongate housing 52 of power tool 50 later described with reference to FIGS. 66-68. As such, clamshell housing 402 may be constructed from molded plastic material, though it should be understood that the clamshell housing 402 may be made, in part or fully, of metal. This arrangement allows the elongate housings 12 and 52 to support the motor 300 components directly without utilizing an intermediary motor can 302. This arrangement reduces the overall girth of the elongate housings 12 and 52. Clamshell housing 402 is illustrated here by way of example as having a length corresponding to the length of the motor 300, though it should be understood that clamshell housing 402 may have different shapes or sizes in accordance with shape or size requirements of the power tool.

In an embodiment, clamshell 402a and 402b are arranged to be fastened together around the stator assembly 310, with the inner surfaces of the clamshell assembly 402 being formed around the stator core 312. In an embodiment, the clamshell assembly 402 comes into surface contact with at least a portion of the outer surface of the stator core 312. In an embodiment, an airgap may be maintained between the clamshell assembly 402 and the outer surface of the stator core 312. In an embodiment, a series of supporting pads may be disposed on the inner surfaces of the clamshell assembly 402 to insulate the stator core 312 from the clamshell assembly 402.

In an embodiment, clamshell housing 402 includes a first set of ribs 404 provided on the inner surfaces of the clamshell 402a and 402b, each rib extending along the axial direction for a distance that is smaller than the length of the stator core 312. In an embodiment, the first set of ribs 404 includes one or more rows of ribs 404 provided on the inner surface of each clamshell 402a and 402b. The first set of ribs 404 are received into the axial grooves 315 of the stator core 312 when the clamshell housing 402 is fully assembled around the stator assembly 310, thus rotationally fixing the stator assembly 310 to the clamshell assembly 402. In a further embodiment, the first set of ribs 404 may be shaped and configured to apply a tight press against the axial grooves 315 to further provide radial support for the stator assembly 310.

Figure 61:
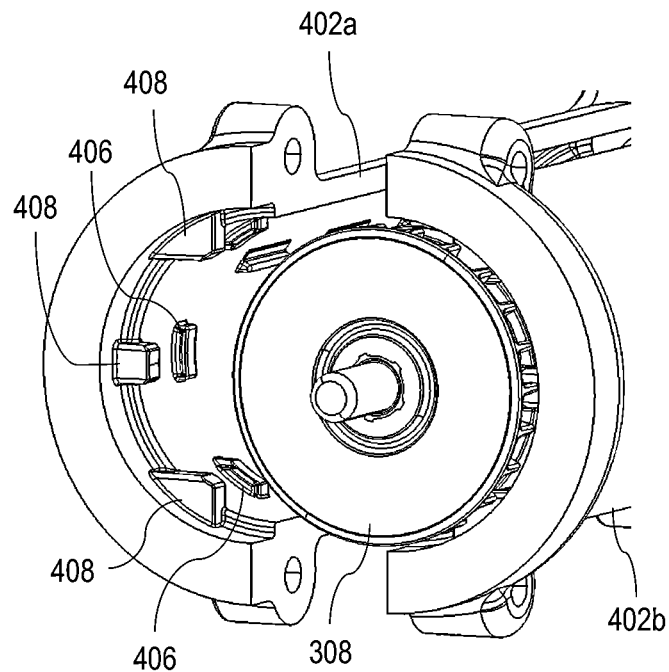
FIG. 61 depicts a partially exploded view of a front end of the clamshell housing and the motor, according to an embodiment.
Figure 62:
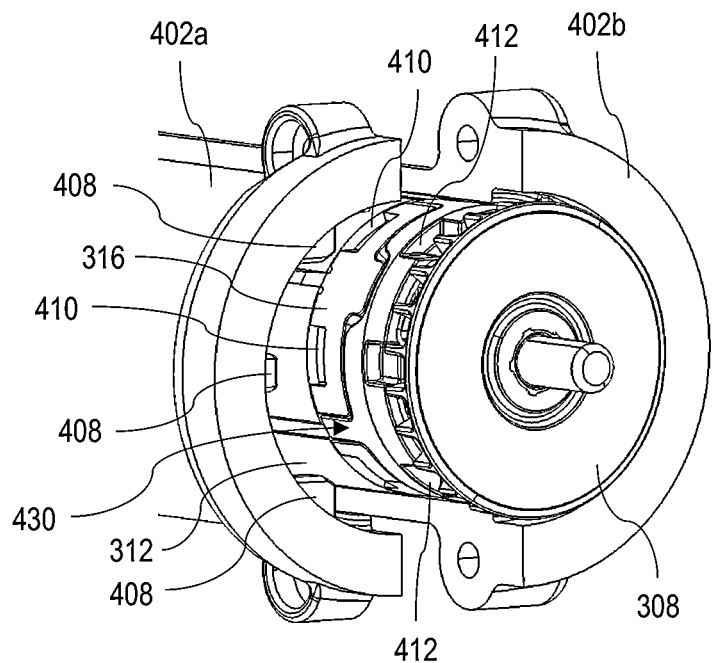
FIG. 62 depicts another partially exploded view of the front end of the clamshell housing and the motor, according to an embodiment.

FIGS. 61 and 62 depict partially exploded views of the front end of the clamshell housing 402 and the motor 300, according to an embodiment. In an embodiment, as shown here and with continued reference to FIG. 58, clamshell housing 402 includes a second set of ribs 406 projecting from the inner surfaces of the clamshell 402a and 402b, and extending along the circumferential direction intersecting a first radial plane radially aligned with the front end insulator 316. In an embodiment, front end insulator 316 includes a series of first exterior pockets 410 formed as recesses it its outer surface in cooperation with the front end of the stator core 312. The second set of ribs 406 are configured and oriented to be fittingly received into the first exterior pockets 410 to axially retain and support the front end insulator 316 relative to the clamshell housing 402. In a further embodiment, where the first set of ribs 404 merely provides rotational support for the stator core 312, the second set of ribs 406 may be shaped and configured to tightly engage the first exterior pockets 410 to additionally provide radial and rotational support for the stator assembly 310.

In an embodiment, with continued reference to FIGS. 58, 61 and 62, clamshell housing 402 further includes a third set of ribs 408 projecting from the inner surfaces of the clamshell 402a and 402b, and extending along the circumferential direction intersecting a second radial plane that is radially forward of the first radial plane and is radially aligned with the front bearing bridge 430. In this example, the third set of ribs 408 are oriented near the front edge of the clamshell housing 402. In an embodiment, front bearing bridge 430 includes a series of second exterior pockets 412 formed as recesses it its outer surface and facing the fan 308. The third set of ribs 408 are configured and oriented to be fittingly received into the second exterior pockets 412 to axially retain and support the front bearing bridge 430 relative to the clamshell housing 402. In a further embodiment, where the first set of ribs 404 merely provides rotational support for the stator core 312, the third set of ribs 408 may be shaped and configured to tightly engage the second exterior pockets 412 to additionally provide radial and rotational support for the stator assembly 310. In an embodiment, this may be in cooperation with the second set of ribs 406 radially and rotationally retaining the front end insulator 316.

Figure 63:
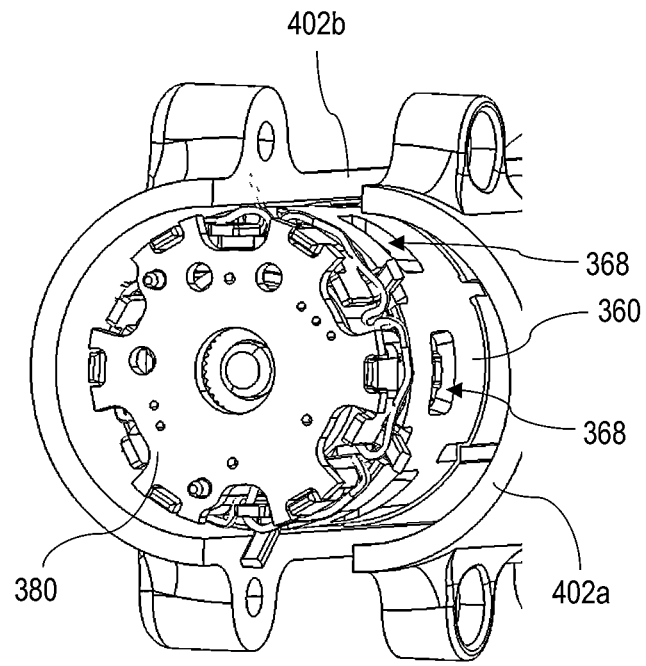
FIG. 63 depicts a partially exploded view of a rear end of the clamshell housing and the motor, according to an embodiment.
Figure 64:
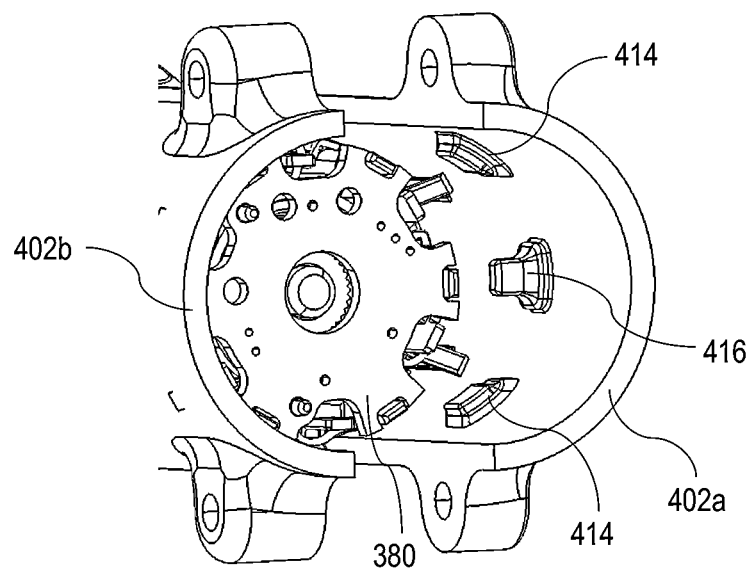
FIG. 64 depicts another partially exploded view of the rear end of the clamshell housing and the motor, according to an embodiment.

FIGS. 63 and 64 partially exploded views of the rear end of the clamshell housing 402 and the motor 300, according to an embodiment. In an embodiment, as shown here and with continued reference to FIG. 59, clamshell housing 402 includes a fourth set of ribs 414 and 416 projecting from the inner surfaces of the clamshell 402a and 402b and intersecting a third radial plane that is radially aligned with the peripheral openings 368 of the routing insulator 360. In an embodiment, ribs 416, at least one of which is provided on each clamshell 402a and 402b, are retaining members that project radially inwardly through the peripheral openings 368 to engage with and provide axial and radial support for the rear bearing bridge 340, as described below. Furthermore, in an embodiment, ribs 414 and outer portions of ribs 416 are configured and oriented to be fittingly received into the peripheral openings 368 to provide axial support for the routing insulator 360 relative to the clamshell housing 402. In a further embodiment, where the first set of ribs 404 merely provides rotational support for the stator core 312, the fourth set of ribs 414 and 416 may be shaped and configured to tightly engage the peripheral openings 368 to additionally provide radial and rotational support for the stator assembly 310. In an embodiment, this may be in cooperation with the second and third sets of ribs 406 and/or 408 radially and rotationally retaining the front end insulator 316 and/or the front bearing bridge 430 respectively.

Figure 65:
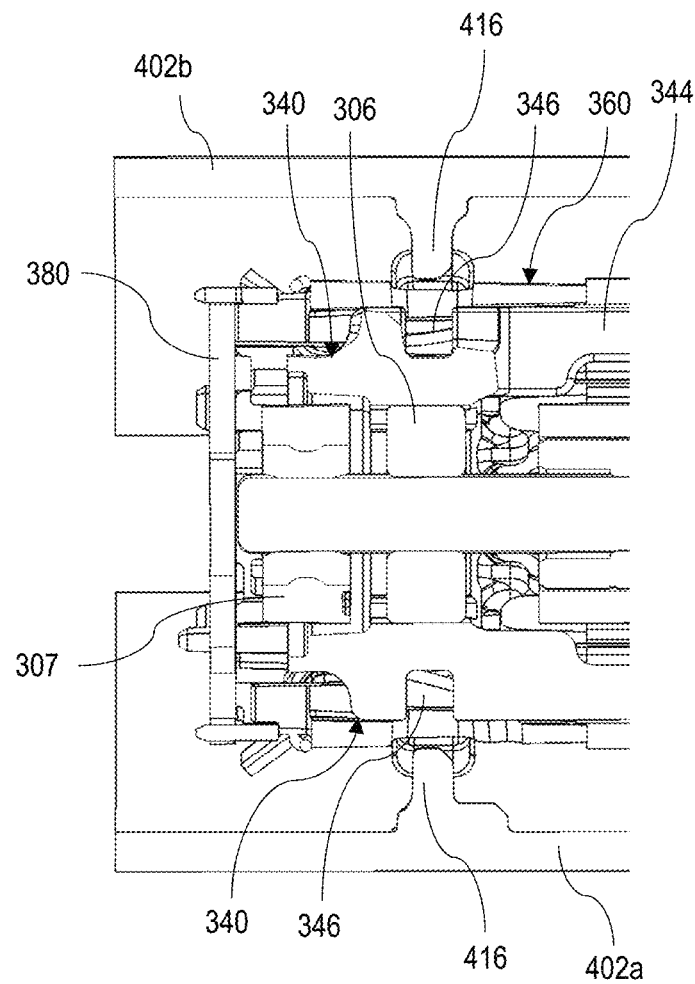
FIG. 65 depicts a partially exploded side cross-sectional view of the rear end of the clamshell housing and the motor, according to an embodiment.

FIG. 65 depicts a partially exploded side cross-sectional view of the rear end of the clamshell housing 402 and the motor 300, according to an embodiment. In an embodiment, the ribs 416 project radially inwardly through the peripheral openings 368 of the routing insulator 360 and their inner tips are fittingly received into corresponding notches 346 of the axial post inserts 344 of the rear bearing bridge 340. In an embodiment, where only two opposing ones of the axial posts inserts 344 include notches 346, ribs 416 are disposed opposite one another on clamshell 402*a* and 402*b*. It should be understood, however, that three or more of the axial post inserts may include notches 346, and the corresponding number or rib 416 may accordingly be provided. Engagement of the inner tips of the ribs 416 with notches 346 allows the clamshell housing 402 to structurally support and retain the rear bearing bridge 340 along the radial and axial directions, even though the routing insulator 360 circumferentially surrounds the rear bearing bridge 340 and is located between the clamshell housing 402 and the rear bearing bridge 340.

In an alternative and/or further embodiment, at least a subset of the retaining insert members 350 may be made of resilient deformable material such as silicone or rubber, with the outer surfaces 358 projecting slightly outwardly relative to the annular body 365 of the routing insulator 360. In this embodiment, as the routing insulator 360 is received within the motor can 302, the retaining insert members 350 compress inwardly against the surface of the motor can 302, thus absorbing any radial stack-up tolerances and improving radial piloting and support of the rear bearing bridge 340 and/or the routing insulator 360 relative to the motor can 302.

Another exemplary power tool 50 including a BLDC motor 500 is described herein, according to an embodiment.

Figure 66:
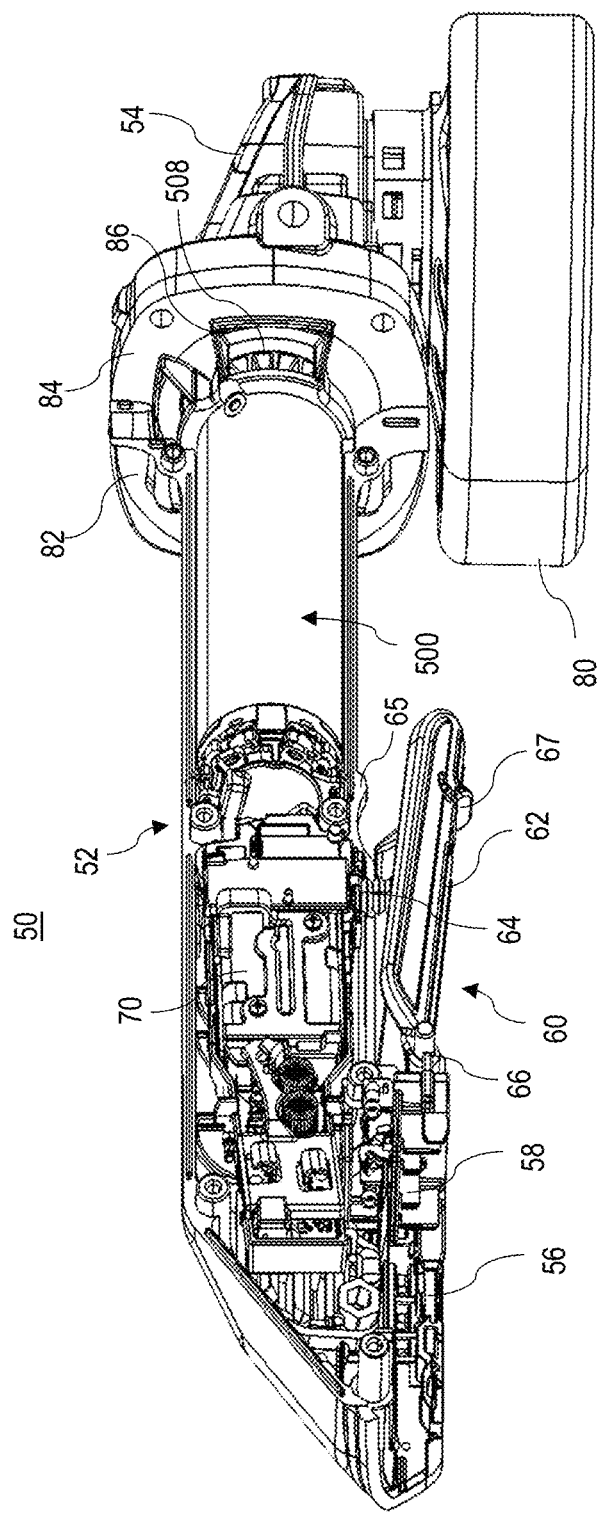
FIG. 66 depicts a perspective view of a power tool including a BLDC motor, according to an alternative embodiment of the invention.
Figure 67:
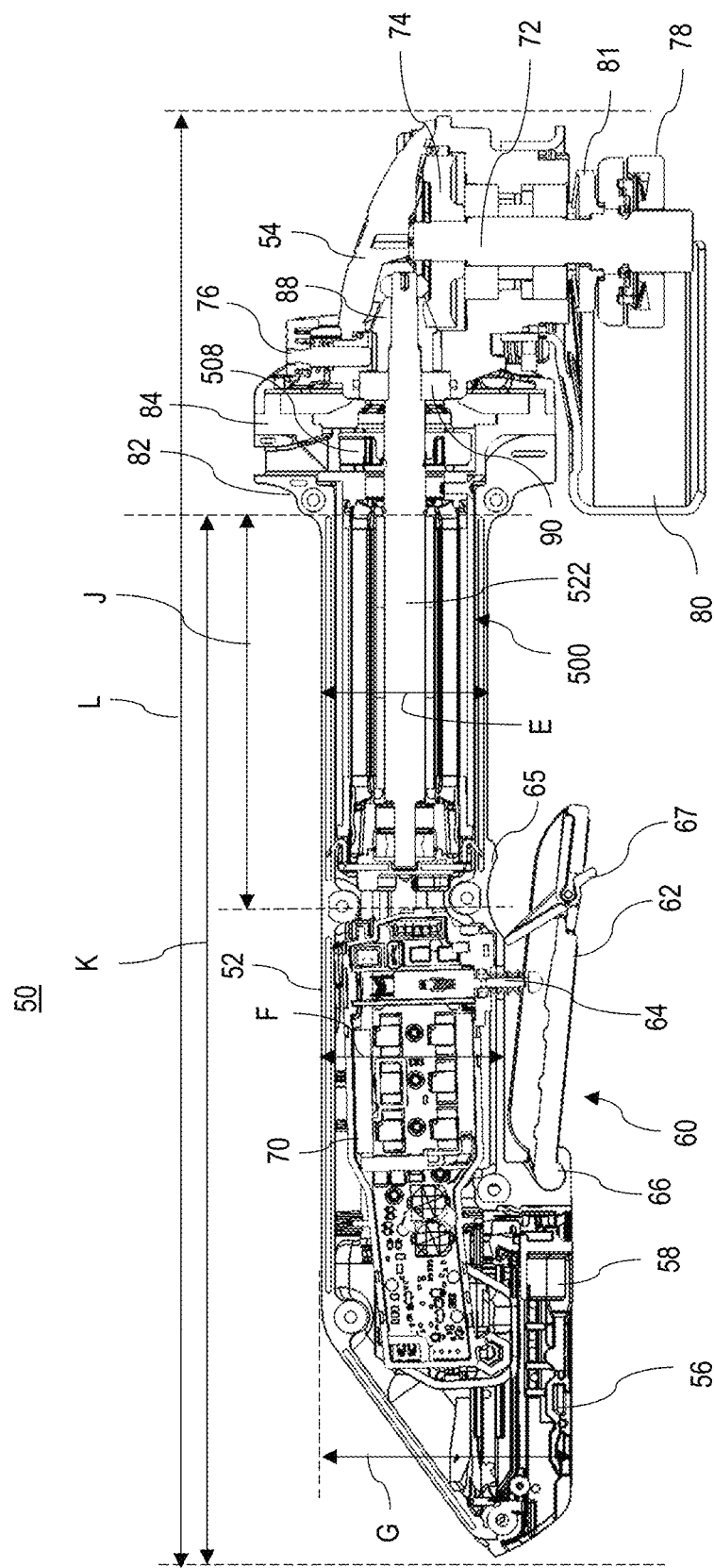
FIG. 67 depicts a cross-sectional view of the power tool, according to an embodiment.
Figure 68:
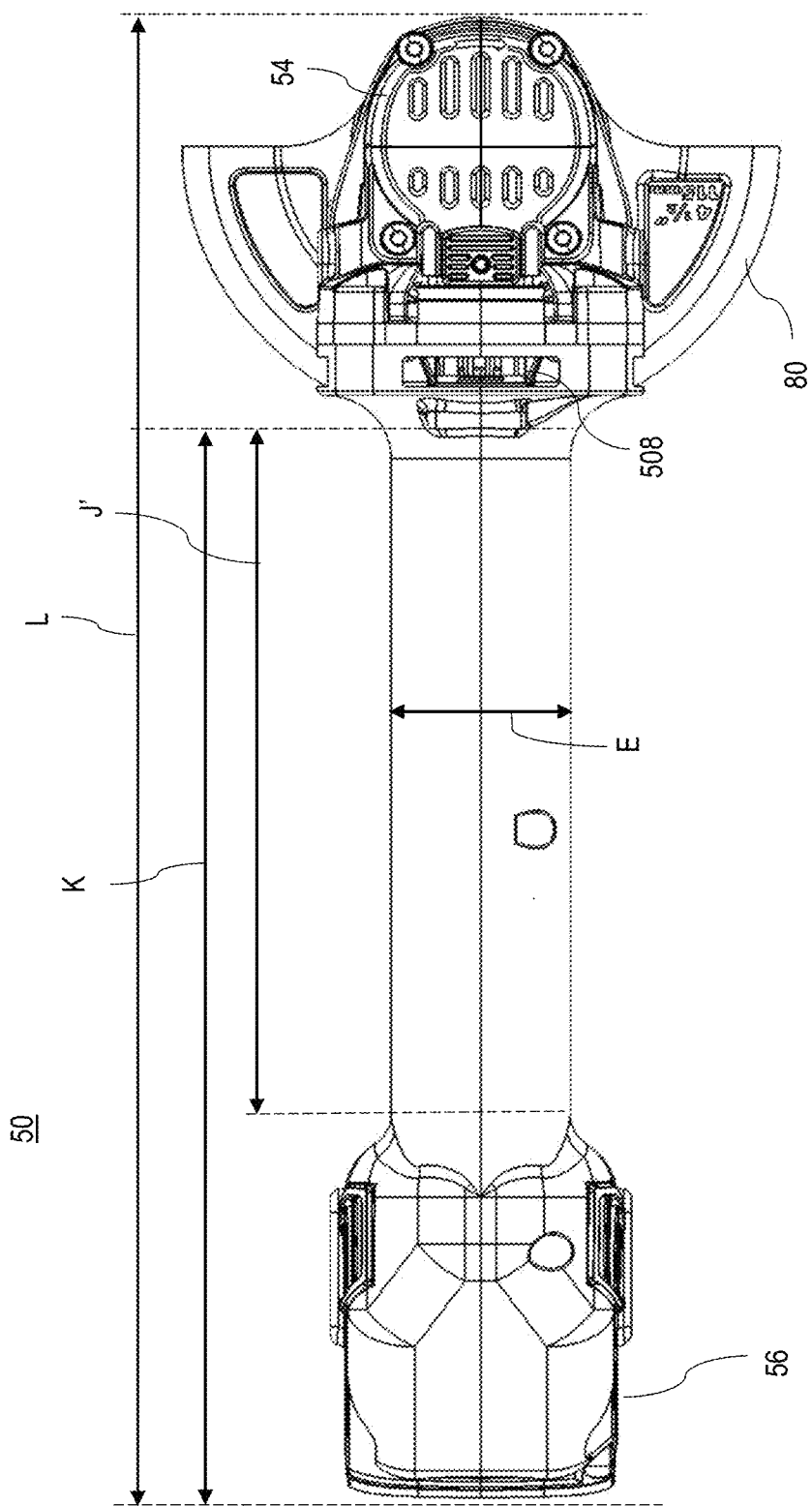
FIG. 68 depicts a top view of the power tool, according to an embodiment.

FIG. 66 depicts a perspective view of power tool 50. FIG. 67 depicts a cross-sectional view of the power tool 50, according to an embodiment. FIG. 68 depicts a top view of the power tool 50, according to an embodiment.

Referring to these figures, in an embodiment, power tool 50 includes elongate housing 52 made of two clamshells, with one clamshell removed in this figure to expose the internal components of the power tool 50 including the motor 500, according to an embodiment. Power tool 50, which is in this example is a grinder, includes many of the same features as power tool 10 described above. Among other features, power tool 50 includes a gear case 54 mounted forward of the housing 52, a battery receptacle 56 formed rear of housing 52, a trigger assembly 60, etc. In an embodiment, motor 500 is substantially similar to motor 300 described above, with key differences described later in this disclosure. In comparison to motor 100 of the first embodiment, motor 500 includes a smaller overall length.

In an embodiment, battery receptacle 56 is configured to receive a removable and rechargeable power tool battery pack therein. The battery pack, not shown in this figure, may be, for example a lithium-ion battery pack having a nominal voltage of 18V. In this embodiment, the receiving axis of the battery pack is parallel to the longitudinal axis of the elongate housing 52. In an embodiment, battery receptacle 56 includes a battery terminal block 58 oriented below the envelope of the elongate housing 52 adjacent the trigger assembly 60.

In an embodiment, trigger assembly 60 is mounted on the housing 52 adjacent the terminal block 58. In an embodiment, the trigger assembly 60 includes a paddle switch 62 engageable by a user and a plunger 64 moveable with the paddle switch 62 into the housing 52. In an embodiment, the paddle switch is pivotable relative to the housing 52 at a pivot point 66 that is adjacent to and axially in-line with the terminal block 58. In an embodiment, paddle switch 62 includes a spring-loaded lock 67 that is engageable by the user on one end and is in sliding contact with a rib 65 of the housing 52 on another end.

In addition, in an embodiment, power tool 50 includes a control module 70, which in this example is disposed within the housing 52 extending from the rear of the motor 500 to above the terminal block 58. In an embodiment, control module 70 includes a programmable controller, such as a microcontroller device, not shown in this figure, mounted on a printed circuit board. The controller includes code that controls supply of electric power to the motor 500 according to various criteria, such as load, speed, and power requirements. In an embodiment, control module 70 may further include a series of power switches, also not shown, configured as a three-phase inverter circuit, controlled by the controller for driving the motor 500. One or more heat sinks may be also be provided to dissipate heat away from the power switches and other components. The controller and the power switches may be mounted on a signal printed circuit board, or on two or more printed circuit boards. Furthermore, in an embodiment, the control module 70 may integrally include an input unit including components that interface with the plunger 64 for ON/OFF and variable-speed control. U.S. Pat. Nos. 9,508,498; 10,541,588; 10,497,524; and US Patent Publication No. 2020/000,8300, all of which are incorporated herein by reference in their entireties, provide various examples of control modules with integrated power components and integrated input units that may be utilized.

In an embodiment, control module 70 may be constructed according to the teachings of U.S. application Ser. No. 17/587,003 filed Jan. 28, 2022, which is also incorporated herein by reference, to reduce the overall girth required by the power module 70, allowing at least a front part of the control module 70 to fit within a greppable area of the elongate housing 52. In an embodiment, the output terminals of the control module 70 project out of a front wall of the housing rather than a top surface of the circuit board, providing for a more compact and robust design suitable for a smaller diameter power tool.

In an embodiment, the power tool 50 is an angle grinder by way of example, though it should be understood that the principles described herein may be utilized in various other power tools such as a cutout tool, a polisher, a wrench, a drill, an impact driver, a hammer drill, a circular saw, a reciprocating saw, a band saw, a nailer, etc.

In an embodiment, the gear case 54 receives a rotor shaft 522 that is rotatable with the motor 500. The gear case 54 supports an output spindle 72 driven by the rotor shaft 422. In an embodiment, the output spindle 72 may be oriented perpendicularly to the rotor shaft 322 and engage a pinion 88 mounted at the end of the rotor shaft 522 via one or more gears 74. In an embodiment, the gear case 54 further includes structural support for a pinion bearing 90 disposed near the end of the shaft 522 to support the pinion 88.

In an embodiment, the gear case 54 may additionally include a spindle lock 76 engageable by a user to prevent rotation of the rotor shaft 422 or the output spindle 72 while the user is mounting a grinding or cutting wheel onto the output spindle. In an embodiment, the gear case 54 may also include a retention flange 78 configured to apply a biasing force to the grinding or cutting wheel for increased security, as described in U.S. patent application Ser. No. 17/412,448 filed on Aug. 26, 2021, which is incorporated herein by reference in its entirety. In an embodiment a guard 80 may be mounted on a collar portion 81 of the gear case 54 around the grinding or cutting accessory.

In an embodiment, a front end 82 of the elongate housing 52 includes a larger diameter than the rest of the elongate housing 52 and is configured to mate with the gear case 54.

In an embodiment, front end 82 houses a motor adaptor 84 that is configured to similarly mate with the gear case 54, thus structurally securing the motor 500 to the end of the gear case 54. Motor adaptor 84 includes a recessed inner region arranged to receive a motor fan 508 coupled to the motor 500. In an embodiment, front end 82 of the housing 52 and the motor adaptor 84 cooperatively form one or more air exhaust openings 86 around the fan 508. Further, as the fan 508 generates an airflow through the motor 500 along the axial direction, the motor adaptor 84 forms a baffle to expel the airflow radially through the exhaust openings 86.

In an embodiment, the power tool 50 is designed as a body-grip power tool with the housing 52 being sized to fit into a hand grip of a user with relative ease in the area around the motor 500. As such, in an embodiment, the housing 52 has a maximum diameter E of approximately 35 to 45 mm, preferably approximately 37 to 44 mm, more preferably at most 42 mm, and thus a circumference of at most 138 mm, preferably at most approximately 132 mm, around most of the length of the motor 500. In an embodiment, this maximum diameter E extends along length J of the housing 52 (not including the rib 65 provided below the housing 52) when viewed from the side of the tool 50. Length J of the housing 52, as measured from the frontal end 82 to a location between the motor 500 and the control module 70, is approximately 60 mm to 110 mm, preferably approximately 80 mm to 100 mm, preferably at least approximately 90 mm.

In an embodiment, when viewed from the top of the tool 50, as shown in FIG. 68, the maximum diameter E extends along length J' of the housing 52, encompassing most of the length of the motor 500 (at least substantially the steel laminations portions of the motor 500) as well as a significant part of the control module 70. In an embodiment, length J' of the housing is approximately 150 mm to 210 mm, preferably approximately 160 mm to 200 mm, preferably approximately 170 mm to 190 mm.

In an embodiment, referring back to FIG. 67, the housing 52 has a width F of approximately 38 to 47 mm, preferably approximately 40 to 45 mm, more preferably at most 44 mm, around significant portion of the control module 70. At a rear of the housing 52, including the battery receptacle 56, the housing 52 has a width G of approximately 54 to 68 mm, preferably approximately 56 to 64 mm, more preferably at most 60 mm.

In an embodiment, the total length K of the housing 52, as measured from the front end 82 to the very end of the battery receptacle 56, is approximately 220 mm to 280 mm, preferably approximately 230 mm to 270 mm, more preferably approximately 240 mm to 260 mm. In an embodiment, the total length L of the power tool 50, as measured from the front of the gear case 54 to the very end of the battery receptacle 56, is approximately 320 mm to 380 mm, preferably approximately 330 mm to 370 mm, more preferably approximately 340 mm to 360 mm.

In an embodiment, the grip portion of the power tool 50, as defined by length J' of the housing having a diameter E as defined above, is at least 40%, preferably at least 44%, preferably at least 48%, of the total length L of the power tool.

It should be understood that in power tool examples where the battery receptacle has a perpendicular or angular orientation, the ratio of the grip portion J' of the power tool 50 to its total length L may be greater than or equal to approximately 50%, preferably greater than or equal to approximately 55%, preferably greater than or equal to approximately 57%.

As stated, motor 500 includes the main construction principles described above with reference to motor 300. While motor 300 represents a generic version of the construction, motor 500 is customized for use with a power tool having an elongated housing, such as an angle grinder. Details of motor 500 are described herein with particular focus on differences between motors 500 and 300. To the extent that the two motors share the same features, the same reference numerals are utilized.

Figure 69:
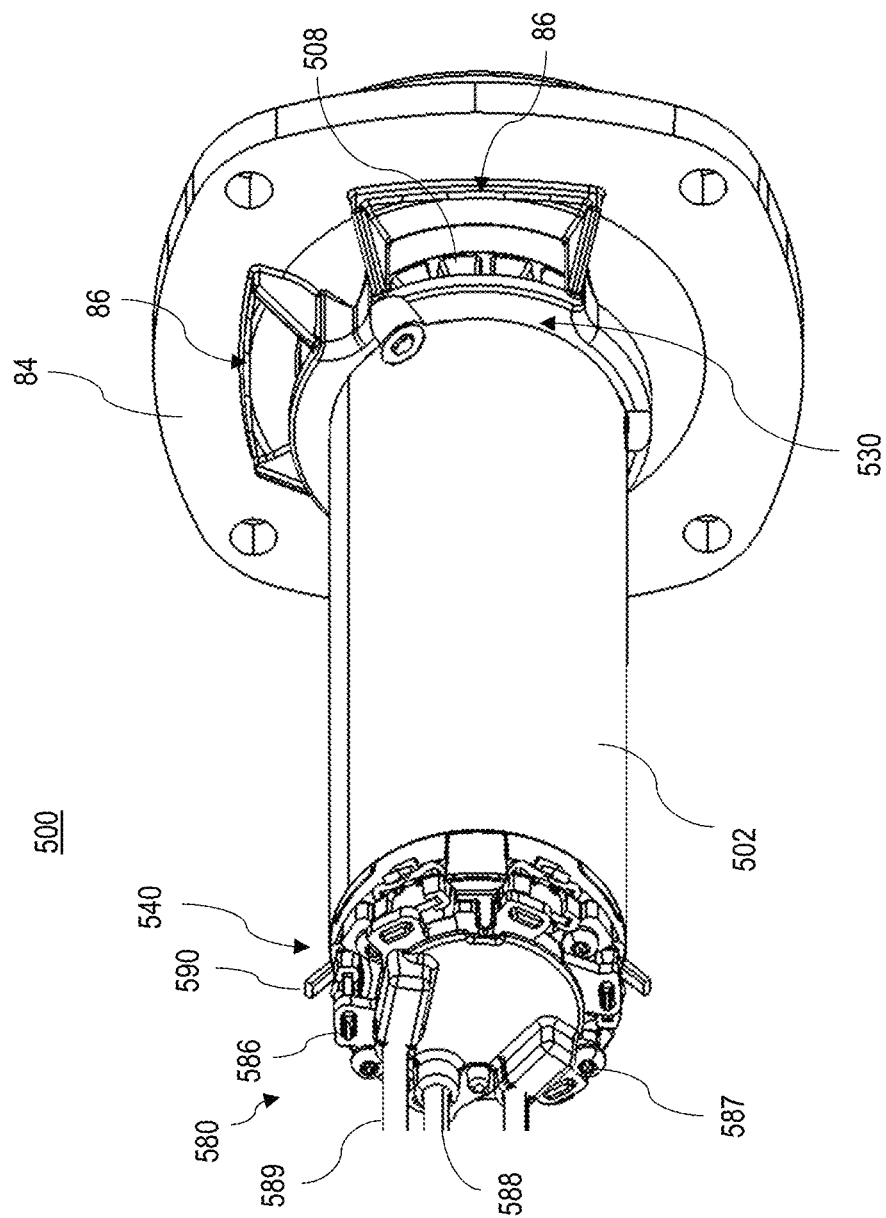
FIG. 69 depicts a perspective view of the BLDC motor, according to an embodiment.
Figure 70:
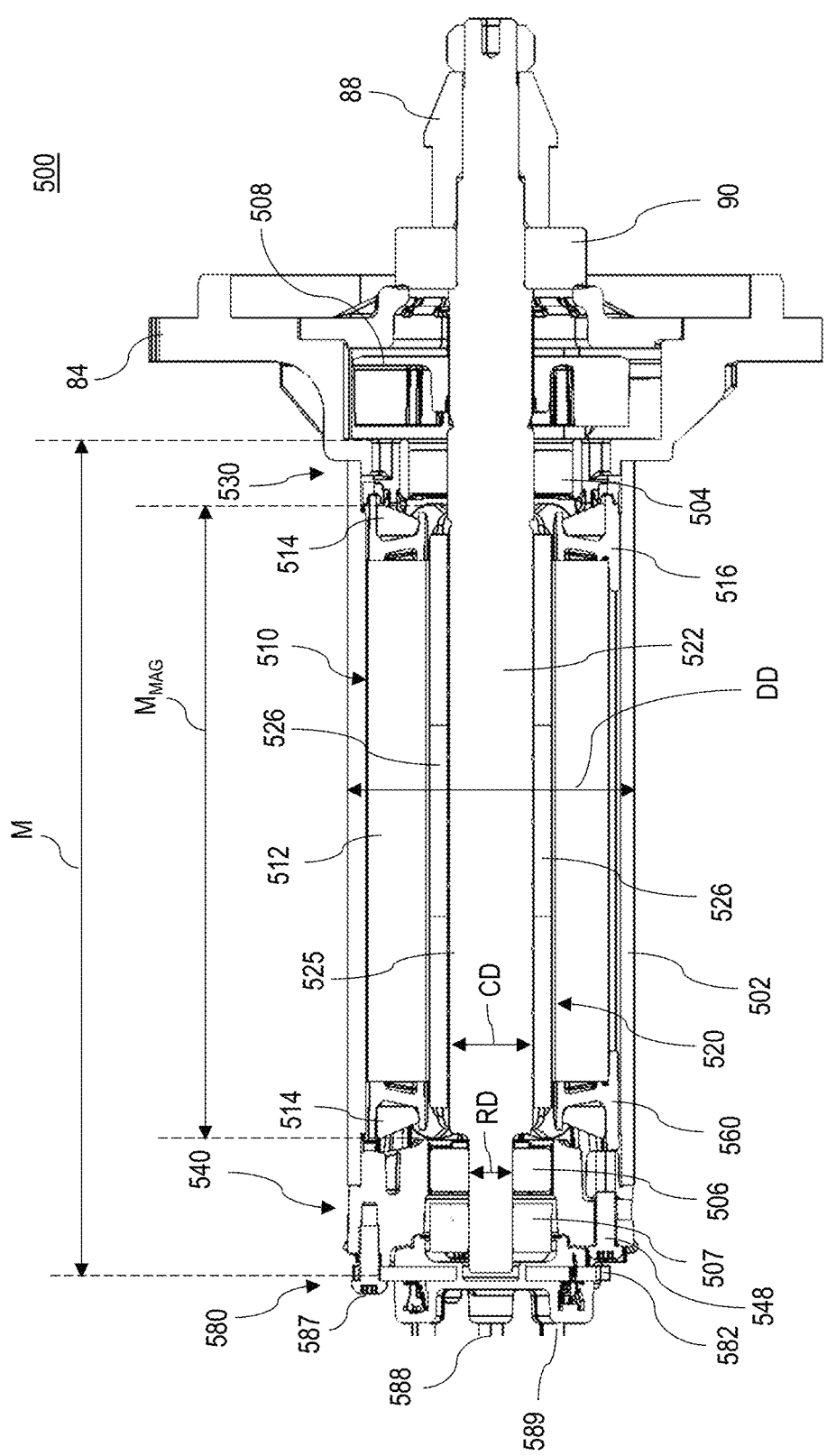
FIG. 70 depicts a side cross-sectional view of the BLDC motor, according to an embodiment.
Figure 71:
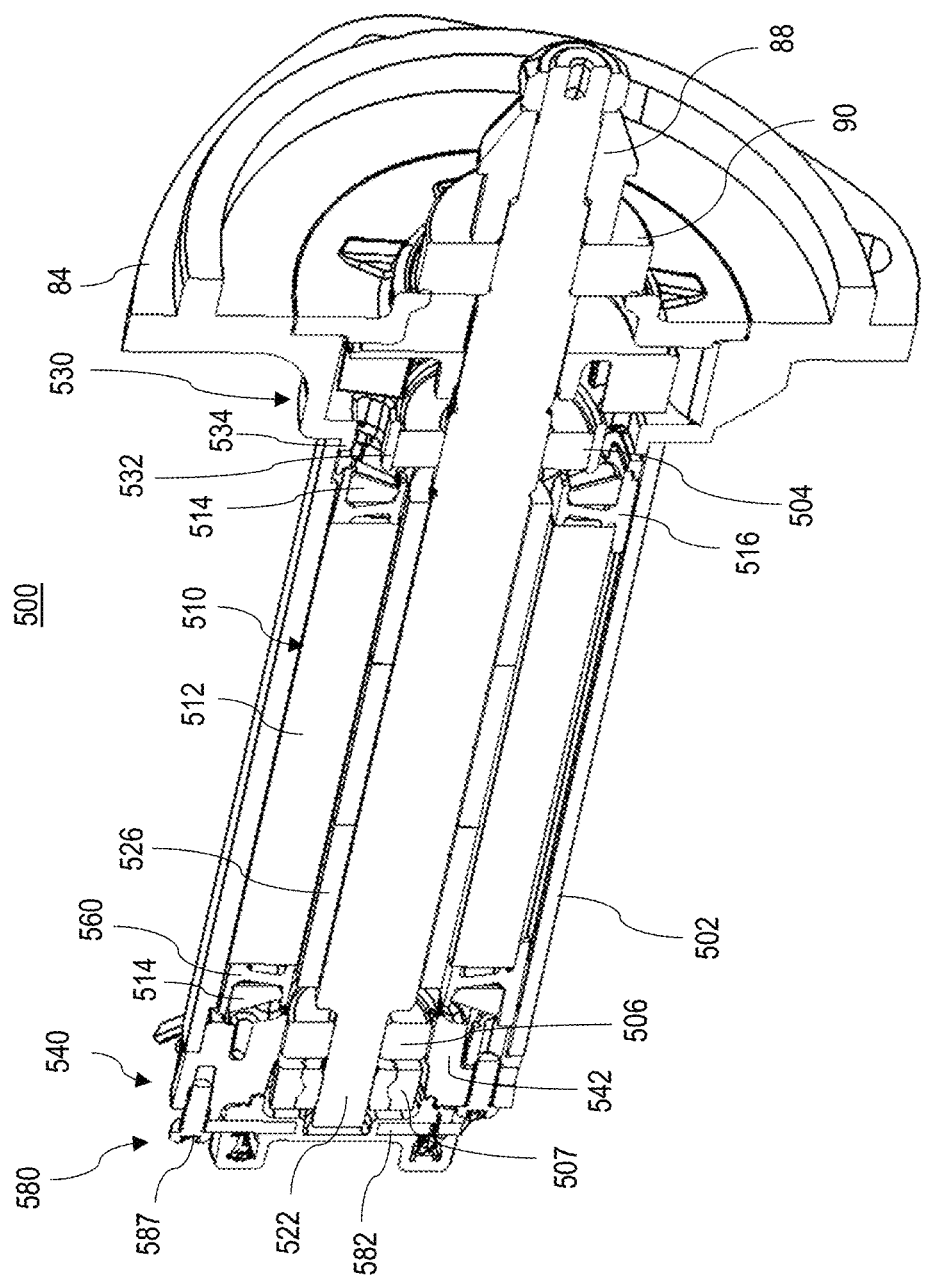
FIG. 71 depicts a perspective cross-sectional view of the BLDC motor, according to an embodiment.

FIG. 69 depicts a perspective view of the BLDC motor 500, according to an embodiment. FIG. 70 depicts a side cross-sectional view of the BLDC motor 500, according to an embodiment. FIG. 71 depicts a perspective cross-sectional view of the BLDC motor 500, according to an embodiment.

According to an embodiment, motor 500 includes a motor can 502 having a substantially cylindrical body. Motor 500 further includes a stator assembly 510 having a stator core 512, stator windings 514, and a front end insulator 516, as described above. These features are substantially as described above are therefore not described here further. In an embodiment, other features and components of the motor 500, including the rotor assembly 520, rotor shaft 522, front bearing bridge 530 for supporting a front bearing 504 of the rotor shaft 522, rear bearing bridge 540 for supporting a rear rotor bearing 506 of the rotor shaft 522, routing insulator 560, and circuit board assembly 580, include modifications and/or improvements and are described below in detail as alternative embodiments.

Figure 72:
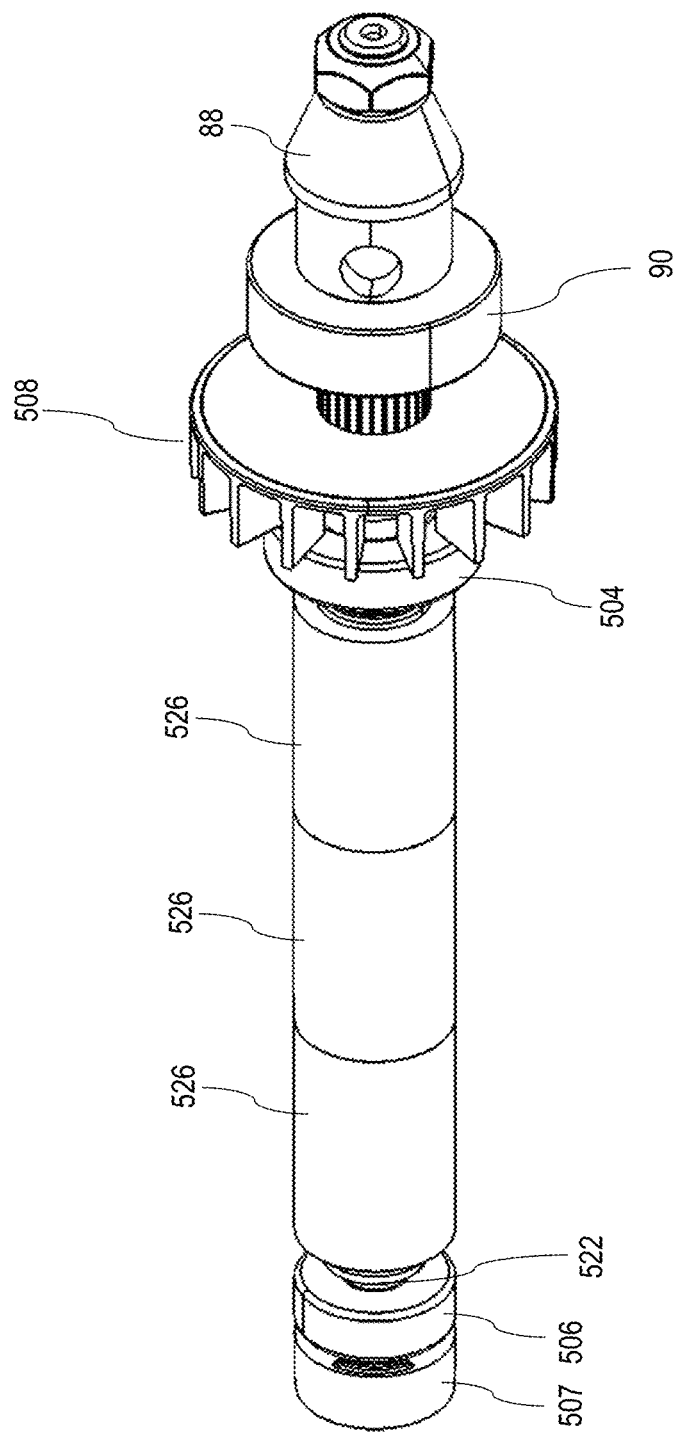
FIG. 72 depicts a perspective view of the rotor assembly of the BLDC motor, according to an embodiment.

FIG. 72 depicts a perspective view of the rotor assembly 520, according to an embodiment. As shown here, and with continued reference to FIGS. 69-71, in an embodiment, rotor shaft 522 includes a stepped non-uniform construction. In this embodiment, the diameter of the rotor shaft 522 varies from a rear end thereof, where the diameter RD of the rotor shaft 522 is sized to be received within the inner race of the rear bearing 504 and a sense magnet ring 507, to a core portion 525, where the diameter CD of the rotor shaft 522 increases to approximately greater than or equal to double the diameter RD. In an embodiment, permanent magnet rings 526 are mounted directly on the core portion 525 of the rotor shaft 522, thus eliminating the need for an intermediary rotor core (e.g., rotor core segments 324 in the previous embodiment) disposed between the rotor shaft 522 and the permanent magnet rings 526. This arrangement also reduces the overall diameter of the rotor assembly. In an embodiment, each permanent magnet ring 526 may be secured to the core portion 525 of the rotor shaft 522 via adhesive and end alignment members as previously described.

In an embodiment, the diameter of the rotor shaft 322 may be maintained at approximate equal to or slightly smaller than CD at the mounting location of front bearing 504. In an embodiment, the front bearing 504 has a larger outer diameter than the rear bearing 506 and the permanent magnet rings 526.

In an embodiment, the diameter of the rotor shaft 522 decreases gradually and/or in a step-wise fashion forward of the front bearing 504 along the mounting location of the fan 508, the mounting location of the pinion bearing 90, and the mounting location of the pinion 88.

Figure 73:
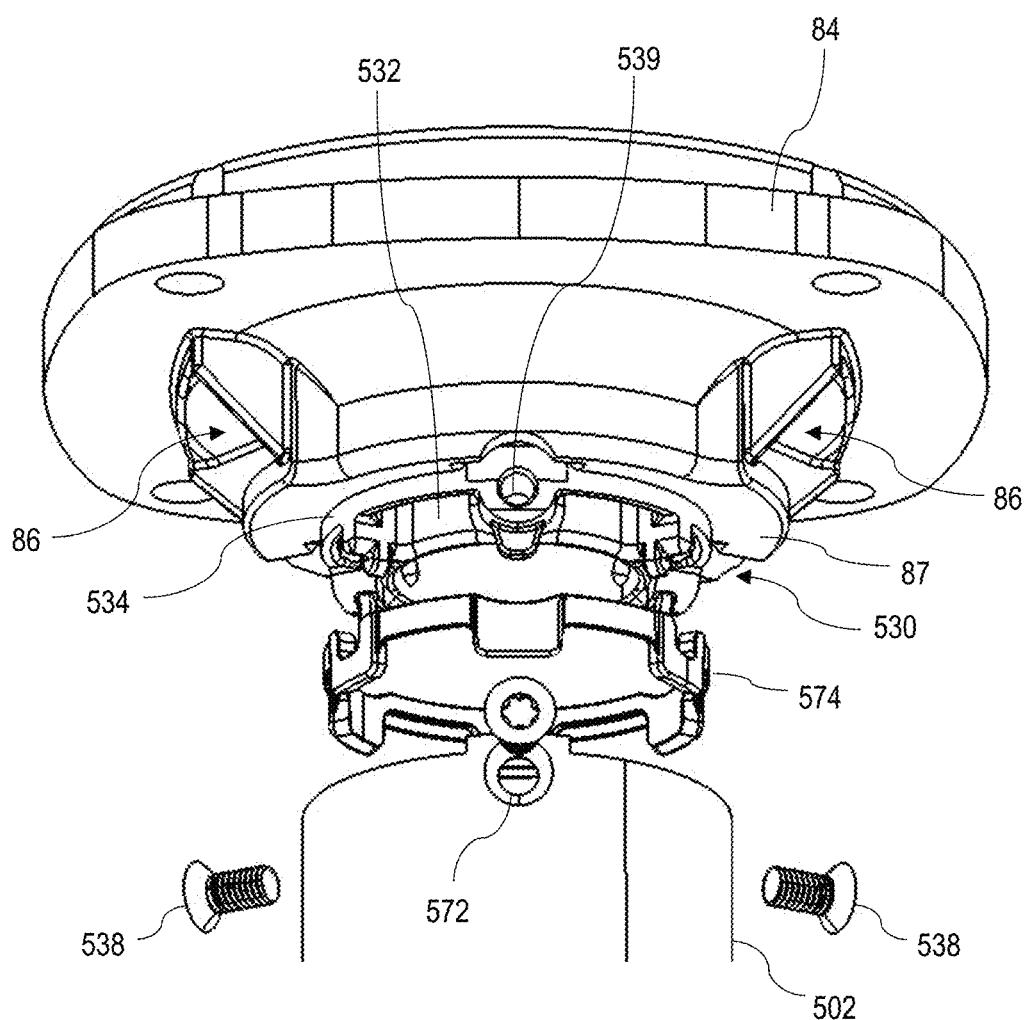
FIG. 73 depicts a partial exploded view of a front end of the motor can and a motor adaptor, according to an embodiment.

FIG. 73 depicts a partial exploded view of the front end of the motor can 502 and the motor adaptor 84, according to an embodiment. As shown here, and with continued reference to FIGS. 69-71, in an embodiment, front bearing bridge 530 includes many of the same features as front bearing bridge 330 previously described. These features include a main cylindrical body 532 forming a bearing pocket for securely receiving an outer race of the front bearing 504, and an outer ring 534 that is fittingly received inside the front end of the motor cap 502 to radially pilot and structurally support the front bearing bridge 530. In an embodiment, the outer ring 534 further includes a series of fastening receptacles 539 facing radially outwardly, and the motor can 502 includes a series of corresponding side openings 572 through which fasteners 538 are received radially into the fastening receptacles 539 to secure the motor can 502 to the front bearing bridge 530. In an embodiment, a compression ring 574 is disposed inside the motor can 502 between the front end of the front end insulator 516 and the rear end of the front bearing bridge 530 to absorb stack-up tolerances, as previously described.

In an embodiment, unlike the previously-discussed front bearing bridge 330, which is provided as a discrete component, front bearing bridge 530 is formed integrally with the motor adaptor 84 as a single component. In an embodiment, a base portion 87 of the motor adaptor 84 is integrally coupled to the outer ring 534 of the front bearing bridge 530, with the exhaust openings 86 formed forward of the front bearing bridge 530. This arrangement is particularly suitable for use in a power tool having a longitudinal body and a gear case, such as a grinder, providing a structure that secures and supports the front bearing bridge 530 to both the gear case 54 of the power tool 50 and to the motor can 502.

Figure 74:
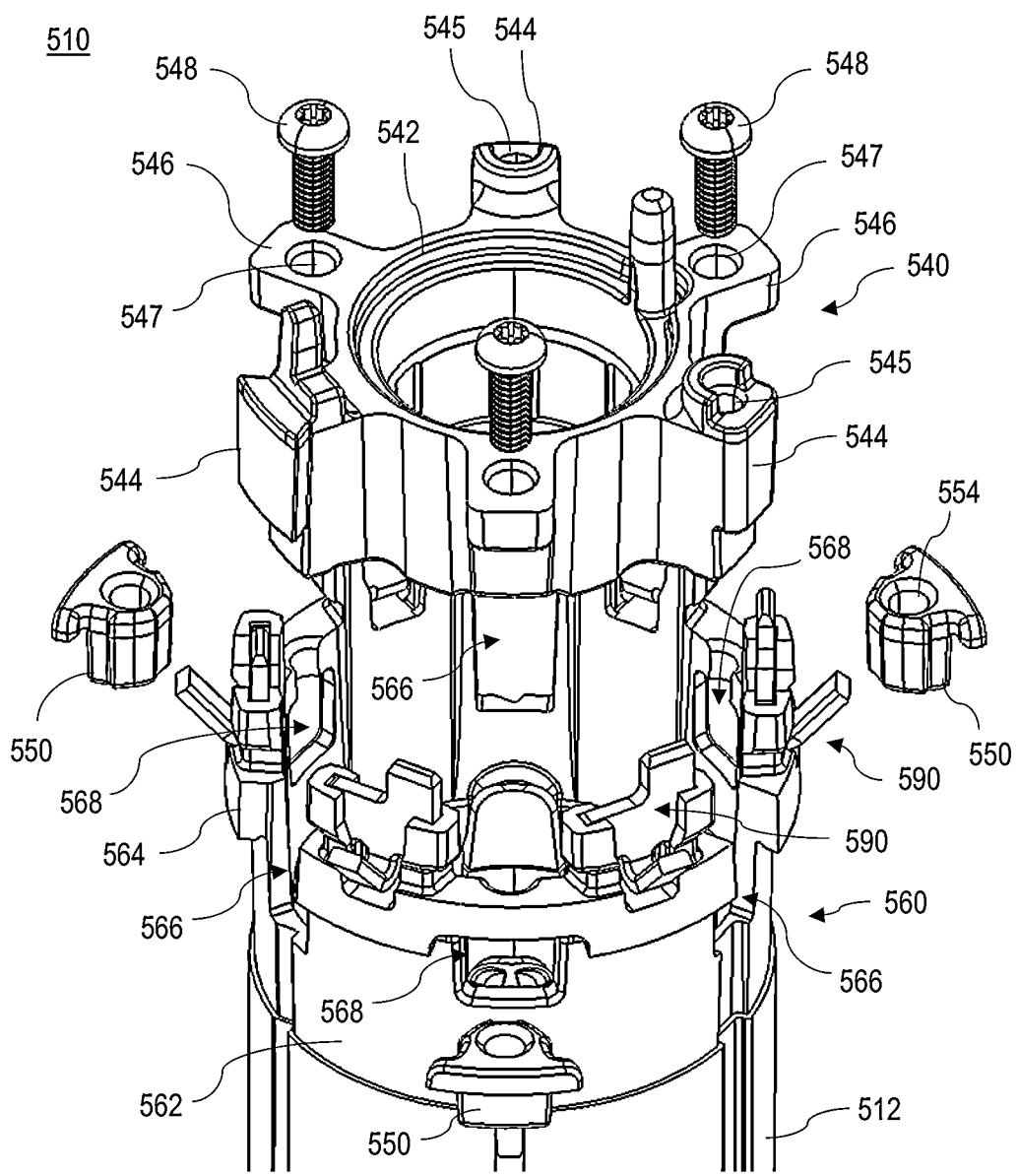
FIG. 74 depicts a partial exploded view of a rear end of a stator assembly of the BLDC motor including a rear bearing bridge, according to an embodiment.
Figure 75:
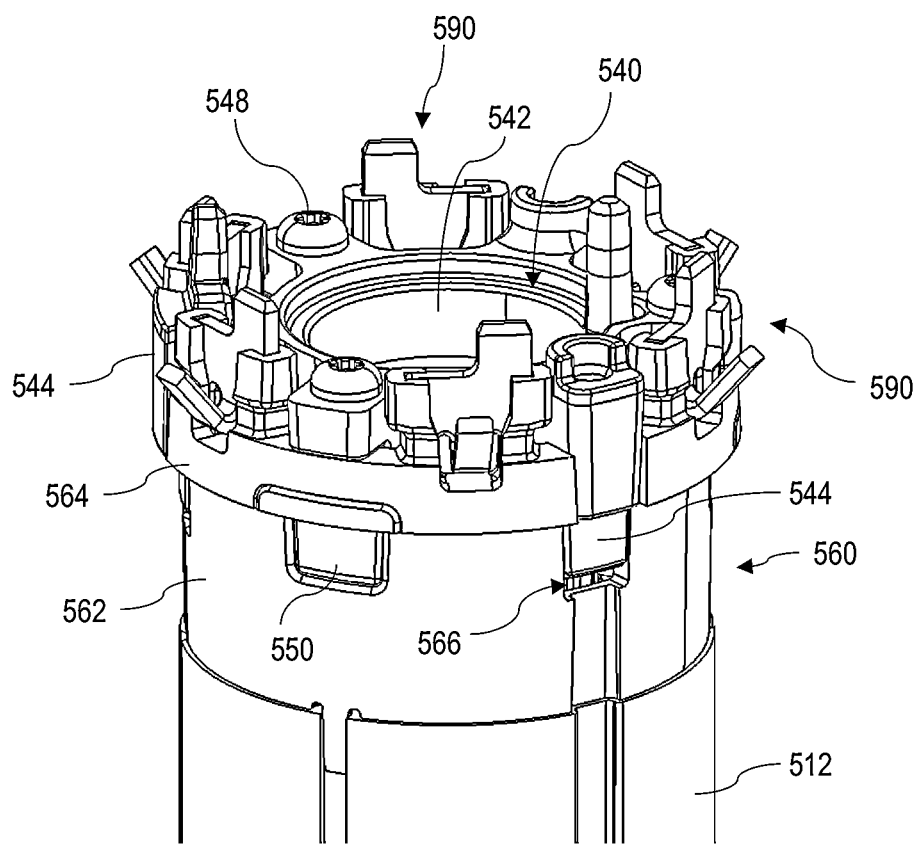
FIG. 75 depicts a perspective view of the rear end of the rear bearing bridge mounted onto the stator assembly, according to an embodiment.
Figure 76:
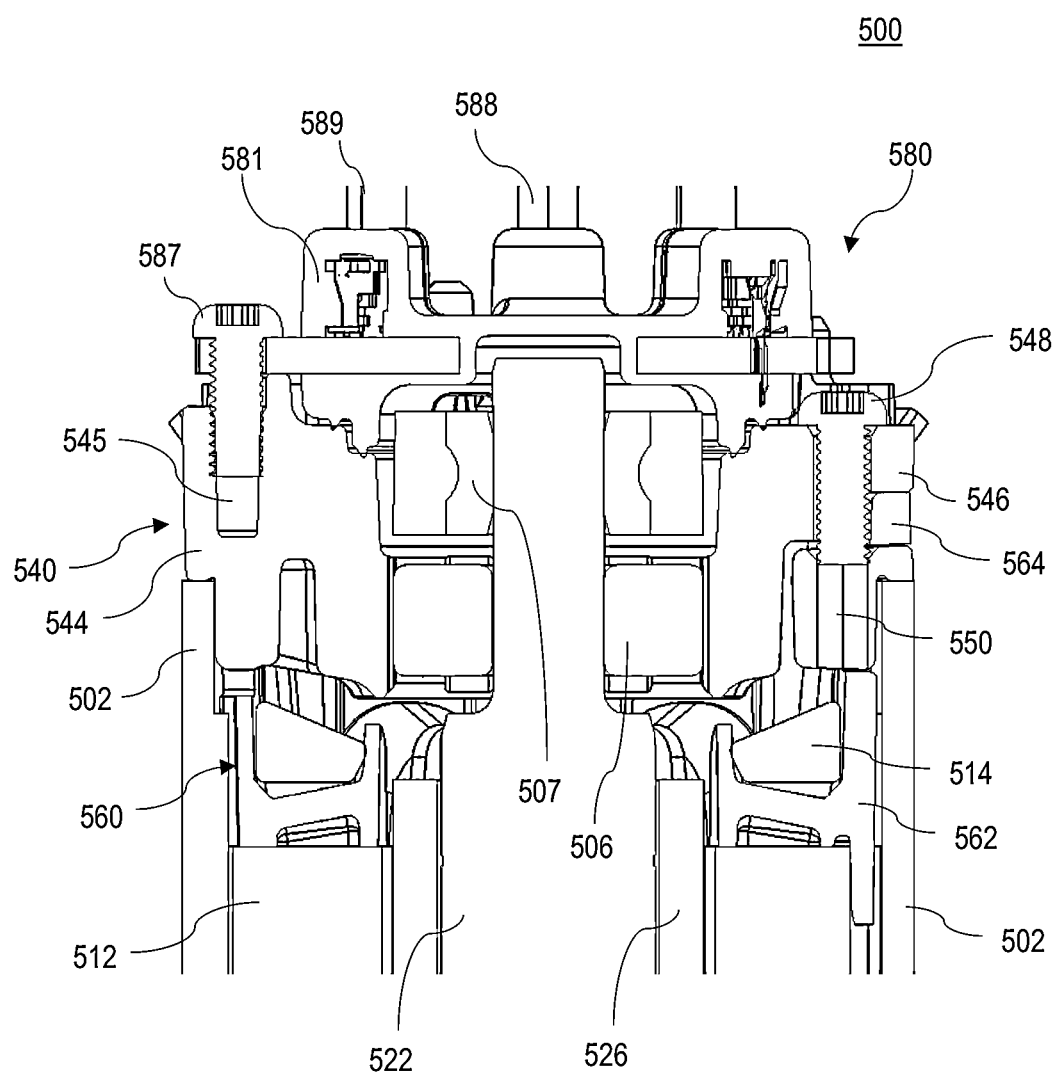
FIG. 76 depicts a zoomed-in cross-sectional view of the rear end of the motor assembly, according to an embodiment.

FIG. 74 depicts a partial exploded view of the rear end of stator assembly 510 including the rear bearing bridge 540, according to an embodiment. FIG. 75 depicts a perspective view of the rear end of the rear bearing bridge 540 mounted onto the stator assembly 510, according to an embodiment. FIG. 76 depicts a zoomed-in cross-sectional view of the rear end of the motor assembly 500, according to an embodiment. The routing insulator 560, rear bearing bridge 540, and circuit board assembly 580 are described herein with reference to these figures and with continued reference to FIGS. 69-71.

In an embodiment, routing insulator 560 is provided with similar structure as routing insulators 160 and 360 previously described for fundamentally the same purpose of providing electrically insulator the stator core 512 from the stator windings 514 at the rear end of the motor 500 and providing a support structure for the rear bearing bridge 540. Further, in an embodiment, routing insulator 560 supports a series of stator terminals 590 projecting along the axial direction away from the stator assembly 510 for coupling to the circuit board assembly 580. In an embodiment, configuration of the stator terminals 590 and their mounting to the routing insulator 560 may be in accordance with any of the embodiments previously described in this disclosure.

In an embodiment, routing insulator 560 includes a main cylindrical body 562 having approximately an outer diameter that is approximately equal to or slightly smaller than the outer diameter of the stator core 512 arranged to be received inside the rear opening of the motor can 502, and an annular lip 564 having approximately the same outer diameter as the motor can 502 and arranged to rest in contact with the rear end of the motor can 502.

In an embodiment, routing insulator 560 additionally includes a series of peripheral openings 568 formed through the main cylindrical body 562. Retaining insert members 550 are received radially into peripheral openings 568 during the assembly process and prior to insertion of the main cylindrical body 562 into the motor can 502. In an embodiment, each retaining insert member 550 includes a fastening receptacle 554 that extends along the axial direction of the motor 500. After insertion of the main cylindrical body 562 into the motor can 502, the retaining insert members 550 are securely held inside the peripheral openings 568 against the inner surface of the motor can 502. In this position, the fastening receptacle 554 are positioned radially inward of the annular lip 564 and are therefore accessible along the axial direction.

In an embodiment, the routing insulator 560 further includes a series of side cut-out regions 566 that extend between adjacent stator terminals 590 through the annular lip 564 to the rear end of the routing insulator 560. In an embodiment, cut-out regions 566 and peripheral openings 568 are alternatingly disposed.

In an embodiment, rear bearing bridge 540 includes a cylindrical body 542 forming a bearing pocket for securely receiving an outer race of the rear bearing 506. In an embodiment, the sense magnet 507 is positioned within the cylindrical body 542 with an airgap in between so it is not in physical contact with the rear bearing bridge 540.

In an embodiment, rear bearing bridge 540 further includes a series of side protrusions 544 extending radially outwardly from the outer surface of the cylindrical body 542. The rear bearing bridge 540 is received within the body of the routing insulator 560 to position the rear bearing 506 and the sense magnet 507 substantially radially inward of the routing insulator 560. The side protrusions 544 pilot and support the rear bearing bridge 540 to routing insulator 560, with at least outer walls of the side protrusions 544 being slidingly and securely received within cut-out regions 566. In this manner, the rear bearing bridge 540 is structurally supported and piloted to the routing insulator 560 along the radial and circumferential directions. In an embodiment, the outer wall of each side protrusion 544 includes a stepped profile to form a substantially flush outer body with the outer surfaces of the cylindrical body 542 and the annular lip 564 of the routing insulator 540. This allows the front portions of the outer walls of the side protrusion 544 to also be supported in contact with the motor can 502 to radially support and pilot the rear bearing bridge 540 relative to the motor can 502.

In an embodiment, rear bearing bridge 540 further includes a series of side arms 546 extending radially outwardly from a rear end of the cylindrical body 542. In an embodiment, side protrusions 544 and side arms 546 are alternatingly disposed around the cylindrical body 542. In an embodiment, side arms 546 are oriented to rest on the rear end of the annular lip 564 of the routing insulator 560 between pairs of adjacent stator terminals 590. Further, in an embodiment, side arms 546 include through-holes 547 located radially inward of the annular lip 564 and axially in-line with the fastening receptacles 554 of the retaining insert members 550. A series of fasteners 548 are axially received through the through-holes 547 and fastened into the fastening receptacles 554. In this manner, the rear bearing bridge 540 is structurally supported and piloted to the routing insulator 560 along the axial direction.

In an embodiment, rear bearing bridge 540 further includes a series of fastening receptacles 545 formed through one or more of the side protrusions 544 along the axial direction. Fastening receptacles 545 are provided for securing the circuit board assembly 580 to the routing insulator 540.

In an embodiment, circuit board assembly 580 includes many of the same features as the previously-described circuit board assembly 380, including a circuit board 582 accommodating magnetic sensors and traces for interconnecting the stator terminals 590, peripheral slots 586 for receiving the stator terminals 590, power wires 589 for supplying electric power to the motor 500, and a series of signal wires 588 for communication between a microcontroller and the magnetic sensors. In an embodiment, circuit board assembly 580 also includes an overmold structure 581 formed around at least the rear surface of the circuit board 582. In an embodiment, circuit board assembly 580 is secured to the fastening receptacles 545 of the routing insulator 540 via fasteners 587.

Various embodiments of this invention described herein provide a brushless motor assembly suitable for use in a gripping handle of a power tool. The tables provided below highlights some of the power and size advantage of the motor assembly.

Table 1 below outlines various size and power output parameters of six exemplary motors A-F constructed according to the teachings above, according to exemplary embodiments. The six motors here include the same stator diameter of 30 mm, but different stator stack lengths (30 mm, 48 mm, and 60 mm) and different permanent magnet grades (42H v. 56M). The magnet grades are used by way of example to show the effect of using higher grade magnets in the motor. In an embodiment, the ring-magnet design may utilize a 42H magnet grade, and the surface-mount magnet design may utilize a 56H magnet grade.

larly, motors D-F can produce a maximum power output of 550 to 875 watts and continuous (long duration) power output of 400 to 690 watts depending on the stator stack size. This represents approximately a 10% improvement in maximum power output and 2% to 5% increase in continuous power output due to use of higher grade magnets. In an embodiment, motors A-F operate at an efficiency (i.e., power output/power output) of greater than equal to 74%.

In an embodiment, motors A-F produce a significant higher power output and efficiency per unit of motor diameter, motor girth, and power tool girth. In an embodiment, motors A-F, when using a 20V max battery pack as described above, produce a maximum power output to stator diameter ratio of at least 16.7 W/mm, which increases with larger stator stack length and higher magnet grade. Similarly, motors A-F produce a maximum power output to tool diameter ratio of at least 13.9 W/mm, and a maximum power output to tool grip circumference of at least 4.5 W/mm.

Furthermore, in an embodiment, motors A-F yield a significant improvement in the motor size (Km) constant as compared to conventional motors. As understood by those skilled in the art, the Km constant is a parameter for determining the efficiency and capacity of a motor. The Km constant is calculated as a function of the torque constant Kt

TABLE 1

|  | Motor A | Motor B | Motor C | Motor D | Motor E | Motor F |
| --- | --- | --- | --- | --- | --- | --- |
| Stator Size (OD mm) | 30 | 30 | 30 | 30 | 30 | 30 |
| Stator Stack Length (mm) | 30 | 48 | 60 | 30 | 48 | 60 |
| Motor Magnetic Length ($M_{MAG}$) (mm) | 43 | 61 | 73 | 43 | 61 | 73 |
| Magnet Grade | 42H | 42H | 42H | 56M | 56M | 56M |
| Line-to-Line Motor Impedance (Ohm)-R | 0.045 | 0.026 | 0.020 | 0.037 | 0.022 | 0.015 |
| Battery Nominal Voltage (V) | 20 | 20 | 20 | 20 | 20 | 20 |
| Battery Impedance (mOhm) | 62 | 62 | 62 | 62 | 62 | 62 |
| Peak Power output (W)-$P_P$ | 500 | 700 | 800 | 550 | 760 | 875 |
| Continuous Power output (W)-$P_C$ | 375 | 550 | 675 | 400 | 570 | 690 |
| Peak Efficiency (%) | 74% | 76.2% | 76.4% | 73.5% | 75.2% | 74.7% |
| Kt (at 50 A) = Torque per Amp (Nmm/A) | 5.68 | 5.63 | 5.22 | 5.66 | 5.39 | 4.86 |
| Km = Kt/$\sqrt{R}$ (Nmm/$\sqrt{W}$) | 26.73 | 34.65 | 37.97 | 28.83 | 36.60 | 39.23 |
| Peak Power/Stator Diameter (W/mm) | 16.7 | 23.3 | 26.7 | 18.3 | 25.3 | 29.2 |
| Km/Stator Diameter (Nmm/$\sqrt{W}$)/mm | 0.89 | 1.16 | 1.27 | 0.96 | 1.22 | 1.31 |

In these examples, a cross-sectional area of motors A-F, not including the motor can 302, is approximately 707 mm^2. A circumference of the motors A-F, not including the motor can 302, is approximately 94.2 mm. In a canned motor design, the motor can 302 includes a diameter of approximately 33 mm and a motor can circumference of approximately 103.6 mm. Using the canned motor design, the power tool has a grip diameter of approximately 36 mm to 40 mm, preferably smaller than or equal to approximately 42 mm, and a grip circumference of approximately to 113 mm to 127 mm, preferably smaller than or equal to approximately 132 mm. In a clamshell motor design, the clamshell 402, which makes up the grip portion of the tool housing, includes a diameter of approximately 35 mm and a grip circumference of approximately 110 mm, preferably a diameter of less than or equal to 38 mm and a grip circumference of less than or equal to approximately 120 mm.

In an embodiment, using a 20V max power tool battery pack having a nominal voltage of approximately 18V, a battery capacity of approximately 5 amperes-per-hour, and a battery impedance of approximately 62 mOhms, motors A-C are capable of producing a maximum power output of 500 to 800 watts and continuous (long duration) power output of 375 to 675 watts depending on the stator stack size. Simiand the resistance of the motor R, Km=Kt/$\sqrt{R}$ ((Nmm/A)/$\sqrt{Ohm}$), or Km=Kt*I/P (Nmm/$\sqrt{W}$), where torque constant Kt is the torque produced divided by motor current, R is the line-to-line impedance of the motor, and P is the power in watts (W). Thus, the Km constant represents the capability of the motor to produce power normalized by resistance of the motor. Both the Km and Kt constants, and in particular ratios of the Km and Kt constants to motor size parameters including motor diameter and motor girth, were seen to significantly improve over conventional power tool motors. In an embodiment, motors A-F include a motor constant (Km) to stator diameter of 0.89 to 1.31 (Nmm/$\sqrt{W}$)/mm. Similarly, motors A-F produce a motor constant to tool diameter ratio of at least 0.74 (Nmm/$\sqrt{W}$)/mm, and a motor constant to tool grip circumference of at least 0.24 (Nmm/$\sqrt{W}$)/mm.

As previously discussed, motor 300 includes a sense magnet ring 307 that magnetically interacts with Hall sensors mounted on the circuit board 382. Table 2 below summarizes, for a motor according to this configuration, the motor length M (see FIG. 27), as defined from a rear end of the circuit board 382 to the front end of the front bearing bridge 330; a non-magnetic length of the motor, as the part of the motor outside the magnetic length MMAG; and the motor volume V.

TABLE 2

| MOTOR WITH SENSE MAGNET | Motor A | Motor B | Motor C | Motor D | Motor E | Motor F |
|---|---|---|---|---|---|---|
| Motor Length (M) (mm) | 67.05 | 85.25 | 97.15 | 67.05 | 85.25 | 97.15 |
| Non-Magnetic Length M-$M_{MAG}$ (mm) | 24 | 24 | 24 | 24 | 24 | 24 |
| Km/M Ratio (Nmm/√W)/mm | 0.40 | 0.41 | 0.39 | 0.43 | 0.43 | 0.40 |
| Peak Power/M Ratio (W/mm) | 7.5 | 8.2 | 8.2 | 8.2 | 8.9 | 9.0 |
| Motor Volume (V) (mm$^3$) | 47,395 | 60,260 | 68,671 | 47,395 | 60,260 | 68,671 |
| Km/V ((Nmm/√W)/mm$^3$) | 0.00056 | 0.00058 | 0.00055 | 0.00061 | 0.00061 | 0.00057 |
| Peak Power/V Ratio (W/mm$^3$) | 0.0105 | 0.0116 | 0.0116 | 0.0116 | 0.0126 | 0.0127 |

In an embodiment, it is possible for motor 300 to be configured without the sense magnet ring 307. This may be done in a, for example, a sensorless motor control implementation, where the rotational position of the motor is detected via the controller by monitoring the back-EMF of the motor in a trapezoidal control scheme, or the motor current in a field-orientated control scheme. Alternatively, motor 300 may be configured to allow direct sensing of the rotor magnets 326 by the Hall sensors, thus eliminating the need for the sense magnet ring 307. In either configuration, the length of the rear bearing bridge 340 and the routing insulator 360 may be shortened by approximately 10 to 12 mm. Table 3 below summarizes, for a motor according to this configuration, the motor length M', the non-magnetic length of the motor, and the motor volume V'.

TABLE 3

| MOTOR WITHOUT SENSE MAGNET | Motor A | Motor B | Motor C | Motor D | Motor E | Motor F |
|---|---|---|---|---|---|---|
| Motor Length (M') (mm) | 55.8 | 74 | 85.9 | 55.8 | 74 | 85.9 |
| Non-Magnetic Length M'-$M_{MAG}$ (mm) | 13 | 13 | 13 | 13 | 13 | 13 |
| Km/M' (Nmm/√W)/mm | 0.48 | 0.47 | 0.44 | 0.52 | 0.49 | 0.46 |
| Peak Power/M' (W/mm) | 9.0 | 9.5 | 9.3 | 9.9 | 10.3 | 10.2 |
| Motor Volume (V') (mm$^3$) | 39,443 | 52,308 | 60,719 | 39,443 | 52,308 | 60,719 |
| Km/V' ((Nmm/√W)/mm$^3$) | 0.00068 | 0.00066 | 0.00063 | 0.00073 | 0.00070 | 0.00065 |
| Peak Power/V' Ratio (W/mm$^3$) | 0.0127 | 0.0134 | 0.0132 | 0.0139 | 0.0145 | 0.0144 |

In an embodiment, as shown in Tables 2 and 3, a ratio of the maximum power output to the motor length is in the range of approximately 7.5 to 10.2 W/mm, and a ratio of the maximum power output to the volume of the motor is approximately 0.0105 to 0.0145 W/mm$^3$. In an embodiment, a ratio of the motor constant Km to the motor length is in the range of approximately 0.39 to 0.52 (Nmm/√W)/mm, and a ratio of the motor constant Km to the volume of the motor is approximately 0.00055 to 0.00070 (Nmm/√W)/mm$^3$.

Table 4 below outlines various size and power output parameters of six exemplary motors G-I constructed according to the teachings of this disclosure, according to exemplary embodiments. The three motors here are provided with a larger diameter than motors A-F discussed above. The three motors include the same stator diameter of 32 mm and the same magnet grade (56M), but different stator stack lengths (25 mm, 40 mm, and 60 mm). Furthermore, motors G-I are tested using two separate battery packs—a 20V max 62 mOhm battery pack (first three rows), and 20V max lower impedance 18 mOhm battery pack (second three rows), to illustrate the effects of the impedance of the battery pack on output power of the motor.

TABLE 4

| | Motor G | Motor H | Motor I | Motor G | Motor H | Motor I |
|---|---|---|---|---|---|---|
| Stator Size (OD mm) | 32 | 32 | 32 | 32 | 32 | 32 |
| Stator Stack Length (mm) | 25 | 40 | 60 | 25 | 40 | 60 |
| Motor Magnetic Length ($M_{MAG}$) (mm) | 38 | 53 | 73 | 38 | 53 | 73 |
| Magnet Grade | 56M | 56M | 56M | 56M | 56M | 56M |
| Motor Impedance (line-line) | 0.034 | 0.019 | 0.012 | 0.034 | 0.019 | 0.012 |
| Battery Nominal Voltage (V) | 20 | 20 | 20 | 20 | 20 | 20 |
| Battery Impedance (mOhm) | 62 | 62 | 62 | 18 | 18 | 18 |
| Peak Power output (W)-$P_P$ | 560 | 780 | 950 | 800 | 1200 | 1550 |
| Continuous Power output (W)-$P_C$ | 400 | 585 | 730 | 415 | 640 | 830 |
| Peak Efficiency (%) | 74.1% | 75.8% | 76% | 73.8% | 75.6% | 76% |
| Kt (at 50 A) = Torque per Amp (Nmm/A) | 5.7 | 5.5 | 5.0 | 5.7 | 5.5 | 5.0 |
| Km = Kt/√R (Nmm/√W) | 31 | 40 | 46 | 31 | 40 | 46 |
| Peak Power/Stator Diameter (W/mm) | 17.5 | 24.4 | 29.7 | 25.0 | 37.5 | 48.4 |
| Km/Stator Diameter (Nmm/√W)/mm | 0.97 | 1.25 | 1.44 | 0.97 | 1.25 | 1.44 |

In these examples, a cross-sectional area of motors G-I, not including the motor can 302, is approximately 804 mm^2. A circumference of the motors G-I, not including the motor can 302, is approximately 100.5 mm. In a canned motor design, the motor can 302 includes a diameter of approximately 35 mm and a motor can circumference of approximately 110 mm. Using the canned motor design, the power tool has a grip diameter of approximately 38 mm to 42 mm, preferably smaller than or equal to approximately 44 mm, and a grip circumference of approximately to 120 mm to 132 mm, preferably smaller than or equal to approximately 138 mm. In a clamshell motor design, the clamshell 402, which makes up the grip portion of the tool housing, includes a diameter of approximately 37 mm and a grip circumference of approximately 116 mm.

In an embodiment, using a 20V max power tool battery pack having a nominal voltage of approximately 18V, a battery capacity of approximately 5 amperes-per-hour, and a battery impedance of approximately 62 mOhms, motors G-I are capable of producing a maximum power output of 560 to 950 watts and continuous (long duration) power output of 400 to 730 watts depending on the stator stack size. When using a higher impedance battery pack, motors G-I can produce a maximum power output of 800 to 1550 watts and continuous (long duration) power output of 415 to 830 watts depending on the stator stack size. In an embodiment, motors G-I operate at an efficiency (i.e., power output/power output) of greater than equal to 74%.

In an embodiment, motors G-I produce a maximum power output to stator diameter ratio of at least 17.5 W/mm, which increases with larger stator stack length and higher magnet grade. Similarly, motors G-I produce a maximum power output to tool diameter ratio of at least 15.1 W/mm, and a maximum power output to tool grip circumference of at least 4.8 W/mm.

Furthermore, in an embodiment, motors G-I yield a significant improvement in the motor size (Km) constant as compared to conventional motors. In an embodiment, motors G-I include a motor constant (Km) to stator diameter of 0.97 to 1.44 (Nmm/√W)/mm. Similarly, motors A-F produce a motor constant to tool diameter ratio of at least 0.83 (Nmm/√W)/mm, and a motor constant to tool grip circumference of at least 0.26 (Nmm/√W)/mm.

Table 5 below summarizes the motor length M, a non-magnetic length of the motor, and the motor volume V, for motors G-I configured to include a sense magnet ring 307.

TABLE 5

| MOTOR WITH SENSE MAGNET | Motor G | Motor H | Motor I | Motor G | Motor H | Motor I |
|---|---|---|---|---|---|---|
| Motor Length (M) (mm) | 65.6 | 80.65 | 100.6 | 65.6 | 80.65 | 100.6 |
| Non-Magnetic Length M-$M_{MAG}$ (mm) | 27.6 | 27.6 | 27.6 | 27.6 | 27.6 | 27.6 |
| Km/M Ratio (Nmm/√W)/mm | 0.47 | 0.50 | 0.46 | 0.47 | 0.50 | 0.46 |
| Peak Power/M Ratio (W/mm) | 8.5 | 9.7 | 9.4 | 12.2 | 14.9 | 15.4 |
| Motor Volume (V) (mm³) | 52,759 | 64,863 | 80,907 | 52,759 | 64,863 | 80,907 |
| Km/V ((Nmm/√W)/mm³) | 0.00059 | 0.00062 | 0.00057 | 0.00059 | 0.00062 | 0.00057 |
| Peak Power/V Ratio (W/mm³) | 0.0106 | 0.0120 | 0.0117 | 0.0152 | 0.0185 | 0.0192 |

Table 6 below summarizes the motor length M, a non-magnetic length of the motor, and the motor volume V, for motors G-I configured without a sense magnet ring 307.

TABLE 6

| MOTOR WITHOUT SENSE MAGNET | Motor G | Motor H | Motor I | Motor G | Motor H | Motor I |
|---|---|---|---|---|---|---|
| Motor Length (M') (mm) | 53.5 | 68.55 | 88.5 | 53.5 | 68.55 | 88.5 |
| Non-Magnetic Length M'-$M_{MAG}$ (mm) | 15.5 | 15.5 | 15.5 | 15.5 | 15.5 | 15.5 |
| Km/M' (Nmm/√W)/mm | 0.58 | 0.59 | 0.52 | 0.58 | 0.59 | 0.52 |
| Peak Power/M' (W/mm) | 10.5 | 11.4 | 10.7 | 15.0 | 17.5 | 17.5 |
| Motor Volume (V') (mm³) | 43,027 | 55,131 | 71,176 | 43,027 | 55,131 | 71,176 |
| Km/V' ((Nmm/√W)/mm³) | 0.00072 | 0.00073 | 0.00065 | 0.00072 | 0.00073 | 0.00065 |
| Peak Power/V' Ratio (W/mm³) | 0.0130 | 0.0141 | 0.0133 | 0.0186 | 0.0218 | 0.0218 |

In an embodiment, as shown in Tables 5 and 6, a ratio of the maximum power output to the motor length is in the range of approximately 8.5 to 17.5 W/mm, and a ratio of the maximum power output to the volume of the motor is approximately 0.0106 to 0.0218 W/mm$^3$. In an embodiment, a ratio of the motor constant Km to the motor length is in the range of approximately 0.46 to 0.59 (Nmm/$\sqrt{W}$)/mm, and a ratio of the motor constant Km to the volume of the motor is approximately 0.00059 to 0.00073 (Nmm/$\sqrt{W}$)/mm$^3$.

While the examples above are made for a 30 mm and a 32 mm stator diameter, it should be understood that a stator diameter of up to 34 mm is within the scope of this disclosure.

Two alternative embodiments of a circuit board and its connectivity to the stator windings is described herein with reference to FIGS. 77-80. While the embodiments described above include stator terminals supported by the routing insulator to facilitate connections between the magnet wire and the circuit boards, the embodiments described below utilize direct electrical connections between the circuit board and the magnet wire.

Figure 77:
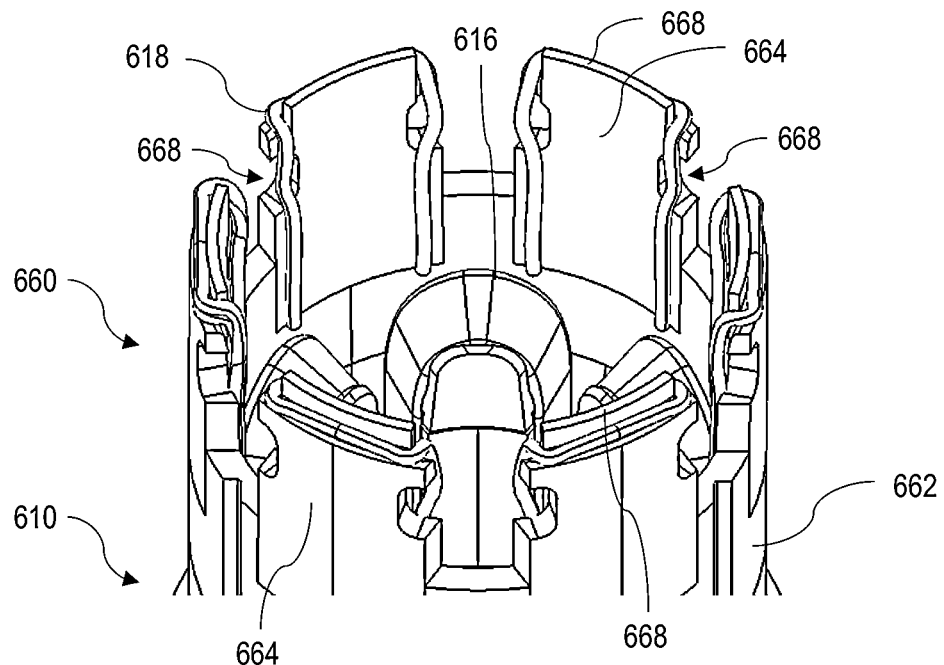
FIG. 77 depicts a perspective view of a routing insulator disposed at the end of the stator assembly, according to an alternative embodiment.

FIG. 77 depicts a perspective view of a routing insulator 660 disposed at the end of the stator assembly 610, according to an embodiment.

As shown in these figures, in an embodiment, routing insulator 660 includes a main cylindrical body 662 and a series of arms 664 extending axially from the main body 662 between stator windings 616 of the stator assembly 610. Cross-over portions 618 of the magnet wire forming the stator windings 616 are routed along the sides of the arms 664 and guided along an outer surface of an upper portion 666 of the arms 664. In an embodiment, each arm 664 includes two side recesses 668 formed along its axial edges proximate the upper portion 666.

Figure 78:
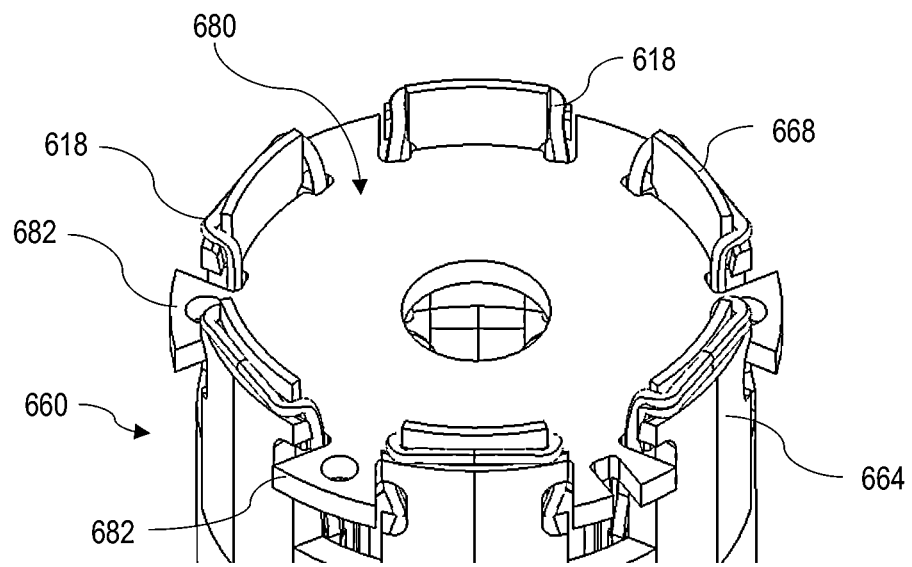
FIG. 78 depicts a perspective view of a circuit board mounted on the routing insulator, according to an embodiment.

FIG. 78 depicts a perspective view of a circuit board 680 mounted on the routing insulator 660, according to an embodiment.

In an embodiment, the circuit board 680 includes a series of peripheral projections 682 sized to be received into gaps between the arms 664 and are snap-fit into the side recesses 668 of the arms 664. Cross-over portions 618 of the magnet wire comes into direct contact with the circuit board 680 at or near the points of contact between the peripheral projections 682 and the recesses 668. The circuit board 680 includes proper conductive traces that make electrical connections with the cross-over portions 618 at the points of contact. This arrangement allows the circuit board 680 to facilitate interconnections between the stator windings 616 using direct connections to the magnet wire and without a need for resistance welding connections using intermediary stator terminals.

Figure 79:
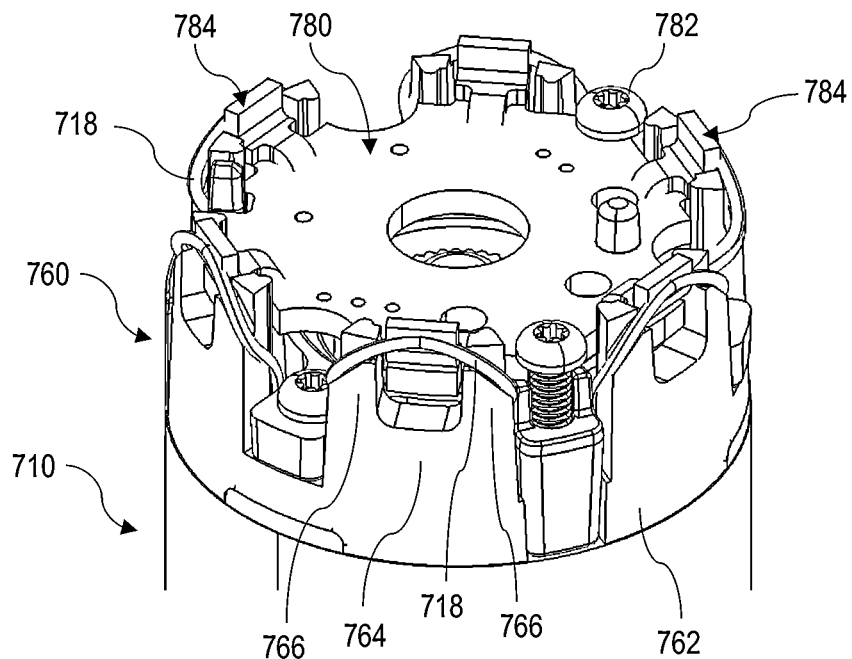
FIG. 79 depicts a perspective view of a circuit board mounted on a routing insulator of a stator assembly, according to an alternative embodiment.
Figure 80:
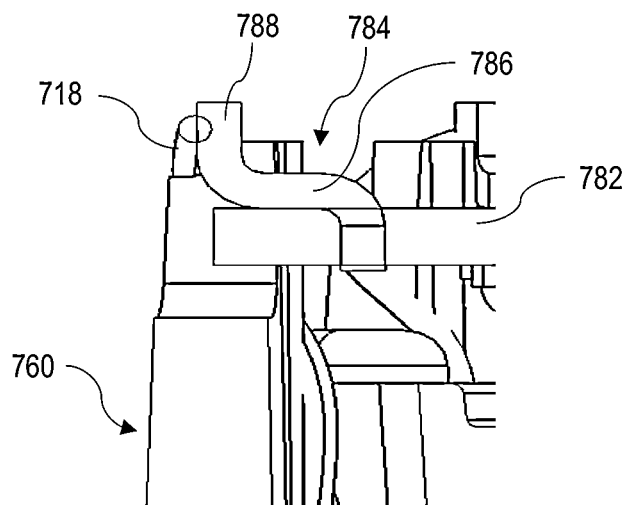
FIG. 80 depicts a partial cross-sectional view of the circuit board and the routing insulator, according to an embodiment.

FIG. 79 depicts a perspective view of a circuit board 780 mounted on a routing insulator 760 of a stator assembly 710, according to an alternative embodiment. FIG. 80 depicts a partial cross-sectional view of the circuit board 780 and the routing insulator 760, according to an embodiment.

As shown in these figures, in an embodiment, routing insulator 760 includes a main cylindrical body 762 and a series of arms 764 extending axially from the main body 762 between stator windings (not shown) of the stator assembly 710. Each arm 764 includes two axial posts 766 extending from its rear end. Cross-over portions 718 of the magnet wire forming the stator windings 616 are routed partially along the sides of the arms 764 and guided in contact with the axial posts 766 and through the gaps formed on each arm 764 between the axial posts 766.

In an embodiment, circuit board 780 is mounted on the routing insulator 760 in contact with the axial posts 766 and secured to the routing insulator 760 via a series of fasteners 782. The circuit board 780 is oriented so a plane formed by the circuit board 782 intersects the gaps formed between the axial posts 766 of the arms 764. In an embodiment, a series of conductive tabs 784 are mounted on the circuit board 780 near its outer edge. Each conductive tab 784 includes a first portion 786 that is mounted on the circuit board 780 and in electrical contact with a conductive trace of the circuit board 780, and a second portion 788 that extends approximately perpendicularly from the first portion 786 and is received inside the gap formed between the axial posts 766 of the arms 764. The cross-over portions 718 of the magnet wire are electrically coupled, e.g., via soldering, ultrasonic welding, or other known metal-to-metal bonding technique, to the second portions 788 of the conductive tabs 784 within each gap. This arrangement allows the circuit board 780 to facilitate interconnections between the stator windings using direct connections to the magnet wire and without a need for intermediary stator terminals.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power tool comprising:
a housing including a grip portion having a grip circumference of smaller than or equal to approximately 132 mm;
a battery receptacle formed on the housing and configured to receive a battery pack having a nominal voltage of approximately 18 volts and an impedance of approximately 62 mOhms; and
a brushless direct-current (BLDC) motor at least partially disposed within the grip portion of the housing and configured to output a maximum power output in the range of approximately 450 to 950 watts when powered by the battery pack and a continuous power output in the range of approximately 400 to 730 watts over a discharge cycle of the battery pack, the motor comprising:
a stator including a stator core and a plurality of stator windings, wherein the stator core has an outer diameter that is smaller than or equal to approximately 34 mm; and
a rotor rotatably received within the stator and including a rotor shaft extending along a longitudinal axis and a plurality of permanent magnet rings mounted sequentially oriented along the longitudinal axis and surrounding the rotor shaft, each permanent magnet including a plurality of magnetic poles.

2. The power tool of claim 1, wherein the rotor includes an outer diameter in the range of approximately 13 mm to 16 mm and a length that is at least 1.4 times greater than the outer diameter.

3. The power tool of claim 1, wherein the rotor further comprises a plurality of rotor core segments securely mounted in series on the rotor shaft, the plurality of permanent magnet rings being respectively mounted on the plurality of rotor core segments.

4. The power tool of claim 3, wherein each rotor core segment is provided with at least two annular alignment members comprising flexible material mounted proximate two ends of the rotor core segment between the rotor core segment and the corresponding permanent magnet ring.

5. The power tool of claim 3, wherein each rotor core segment includes a plurality of annular grooves, wherein an adhesive material is disposed within the plurality of annular grooves for retention of the corresponding permanent magnet ring.

6. The power tool of claim 1, wherein the plurality of permanent magnet rings is securely mounted directly on the rotor shaft.

7. The power tool of claim 1, wherein the rotor shaft includes a stepped construction including a first portion surrounded by the plurality of permanent magnet rings and having a first diameter, and a second portion not surrounded by the plurality of permanent magnet rings and having a second diameter, wherein the first diameter is greater than the second diameter.

8. The power tool of claim 7, wherein the motor further comprises a rotor bearing mounted on the second portion of the rotor shaft, and a circuit board electrically coupled to the plurality of stator windings and including a plurality of conductive traces facilitating interconnections between the plurality of stator windings, wherein the rotor bearing is located between the plurality of permanent magnet rings and the circuit board along the longitudinal axis.

9. The power tool of claim 8, wherein the motor further comprises a front bearing mounted on the rotor shaft forward of the rotor assembly.

10. A power tool comprising:
a housing including a grip portion having a grip circumference of smaller than or equal to approximately 132 mm;
a battery receptacle formed on the housing and configured to receive a battery pack having a nominal voltage of approximately 18 volts and a battery capacity of approximately 5 ampere-hours; and
a brushless direct-current (BLDC) motor at least partially disposed within the grip portion of the housing and configured to output a maximum power output of 450 to 950 watts when powered by the battery pack and a continuous power output of at least 400 watts over a discharge cycle of the battery pack, the motor comprising:
a stator including a stator core having a non-segmented construction and a plurality of stator windings, wherein the stator core has an axial length in the range of approximately 25 mm to 60 mm; and
a rotor rotatably received within the stator and including a rotor shaft extending along a longitudinal axis and a plurality of permanent magnet rings mounted sequentially oriented along the longitudinal axis and surrounding the rotor shaft, each permanent magnet including a plurality of magnetic poles.

11. The power tool of claim 10, wherein the rotor includes an outer diameter in the range of approximately 13 mm to 16 mm and a length that is at least 1.4 times greater than the outer diameter.

12. The power tool of claim 10, wherein the rotor further comprises a plurality of rotor core segments securely mounted in series on the rotor shaft, the plurality of permanent magnet rings being respectively mounted on the plurality of rotor core segments.

\* \* \* \* \*